(12) United States Patent
Yamaguchi

(10) Patent No.: US 6,881,535 B2
(45) Date of Patent: Apr. 19, 2005

(54) METHOD FOR PRODUCING LIQUID CRYSTAL DISPLAY APPARATUS

(75) Inventor: Hirotaka Yamaguchi, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 311 days.

(21) Appl. No.: 10/173,923

(22) Filed: Jun. 19, 2002

(65) Prior Publication Data

US 2003/0017422 A1 Jan. 23, 2003

(30) Foreign Application Priority Data

Jul. 3, 2001 (JP) ........................................ 2001-201850

(51) Int. Cl.[7] .......................................... G02F 1/1335
(52) U.S. Cl. ........................ 430/321; 430/316; 430/319; 430/330
(58) Field of Search ................................ 430/316, 319, 430/321, 330; 349/113, 114

(56) References Cited

U.S. PATENT DOCUMENTS 4,354,897 A * 10/1982 Nakajima .................. 438/704
4,519,678 A 5/1985 Komatsubara et al.
5,204,765 A * 4/1993 Mitsui et al. ............... 349/113

FOREIGN PATENT DOCUMENTS

| JP | 08-160462 | 6/1996 |
| JP | 10-319422 | 12/1998 |
| JP | 2002-131517 A * | 5/2002 |

* cited by examiner

Primary Examiner—John A. McPherson
(74) Attorney, Agent, or Firm—Young & Thompson

(57) ABSTRACT

To provide a liquid crystal display apparatus exhibiting optimum display performance despite reduction in the number of PR(photolithography) processes, and a method for producing the apparatus. A method for producing a liquid crystal display apparatus having a first substrate including a thin film transistor and a reflector on an insulating substrate. An etching mask is formed on a metal layer formed on the insulating substrate and, using this etching mask, the metal layer is etched to form a constituent portion of the thin film transistor and protrusions. Only the etching mask is caused to reflow to cover exposed surface portions of the constituent portion of the thin film transistor and protrusions and near-by surface portions of the insulating substrate with the etching mask as the insulating substrate is partially exposed. Using the etching mask, recesses are formed in an exposed area of the insulating substrate. A reflector is formed on the protrusions and recesses.

16 Claims, 82 Drawing Sheets

FIG. 4
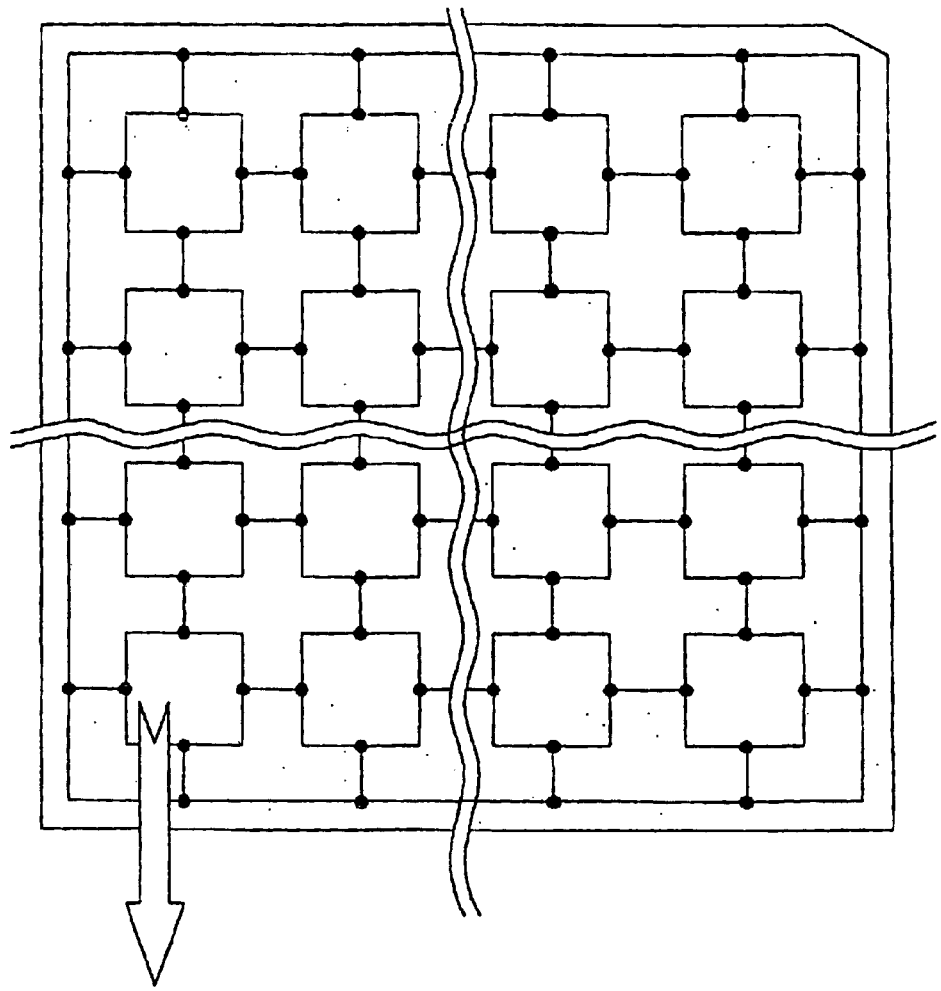
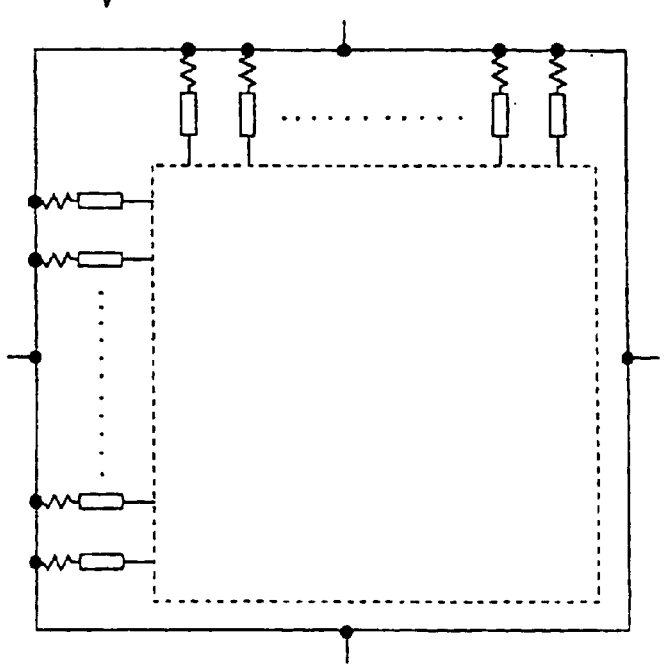

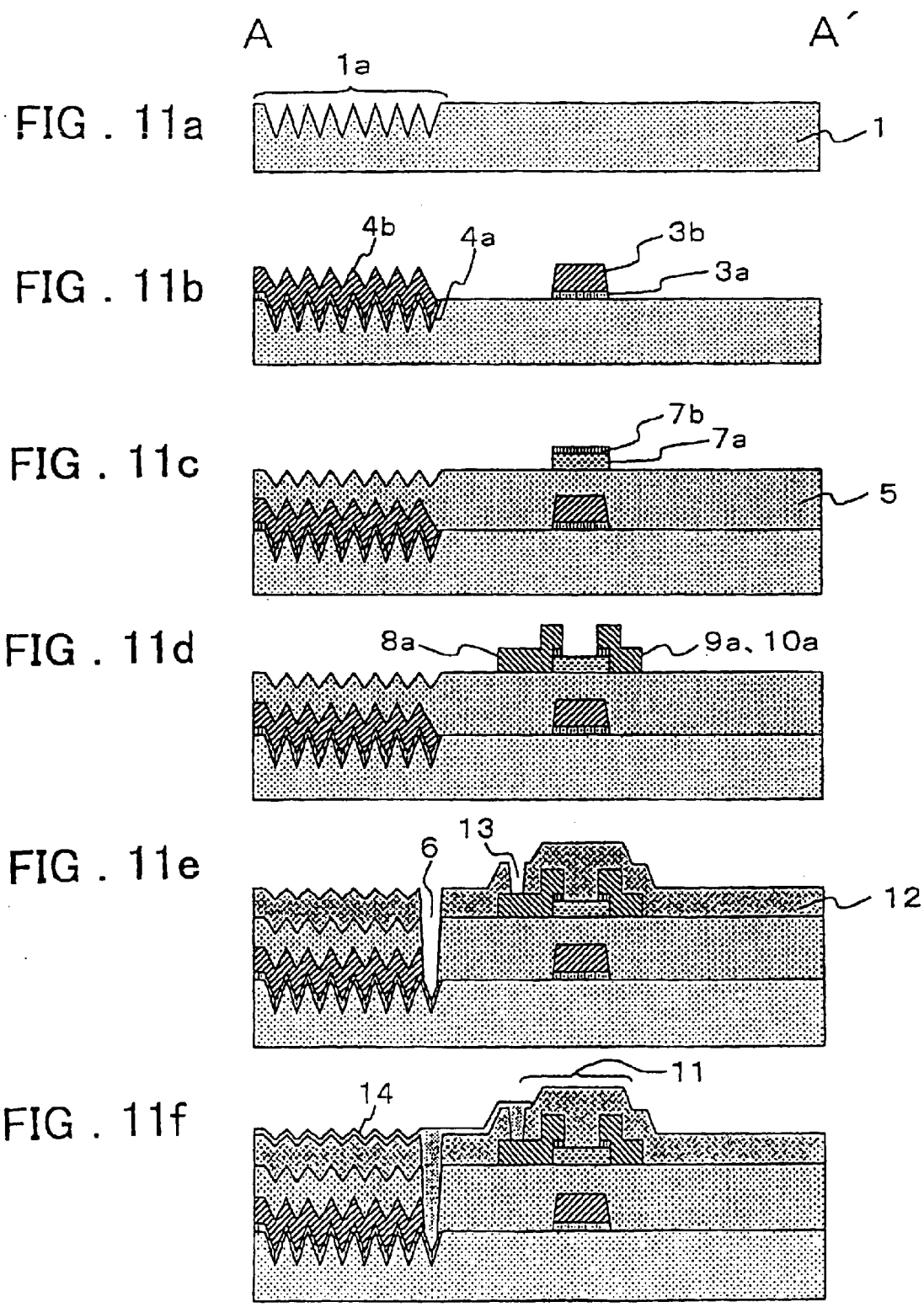

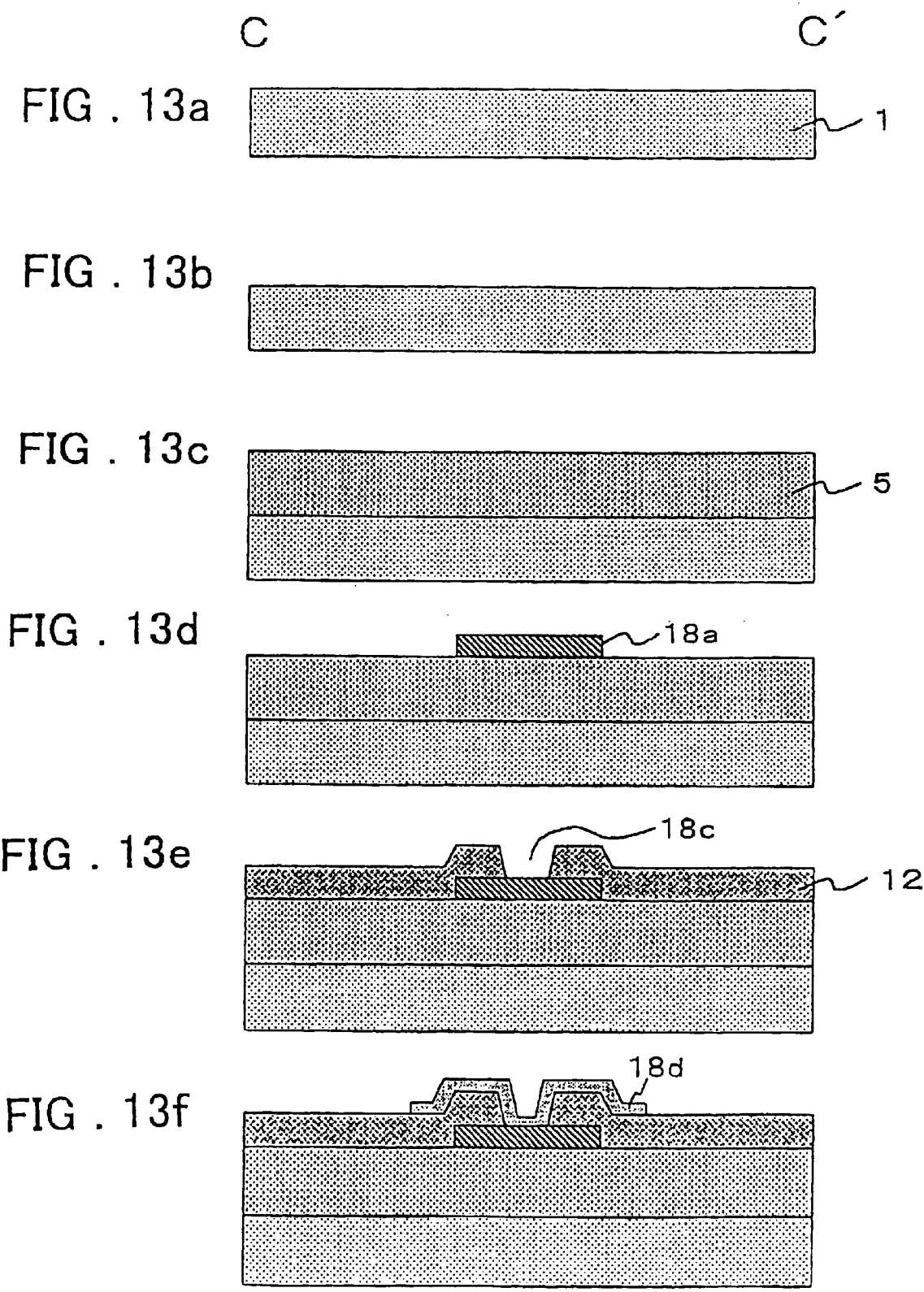

D          D'

C                C'

D                D'

C  C'

C                    C'

A          A'

A　　　　　　　　　　　　　A′

B  B'

C  C'

D D'

E   E'

E　　　　　　　　　　　　　　　　E′

METHOD FOR PRODUCING LIQUID CRYSTAL DISPLAY APPARATUS

FIELD OF THE INVENTION

This invention relates to a method for producing a liquid crystal display apparatus having a reflection type panel or a half-transmitting type panel. More particularly, it relates to a method for producing a liquid crystal display apparatus having an optimum display function with simplified processes.

BACKGROUND OF THE INVENTION

A liquid crystal display apparatus, employing active devices, such as thin-film transistors, features a thin thickness and a light weight, and is exploited as a high picture quality flat panel display. With the liquid crystal display apparatus, it is being contemplated to simplify the manufacturing process for realization of low production cost.

The liquid crystal display apparatus is being used as a display unit for a mobile terminal. The liquid crystal display apparatus used currently is predominantly a reflection type or semi-transmitting type liquid crystal display apparatus.

Of these, the reflection type liquid crystal display apparatus is designed so that a reflector provided within the apparatus reflects the light incident from outside. Reflected light is used as a display light source to render unnecessary backlight as a light source (see FIG. 3). As a result, the reflection type liquid crystal display apparatus lends itself more efficaciously to low power consumption, thinner thickness and lighter weight than the transmission type liquid crystal display apparatus.

On the other hand, the semi-transmission type liquid crystal display apparatus is designed to make efficacious display even on the occasion of the weak extraneous light. To this end, reflection display is made by exploiting reflected light, obtained on reflection of extraneous light by a reflector, at the same time as transmission display is made by exploiting backlight transmitted through an aperture (see 4c in FIG. 2) provided in a portion of the reflector.

The basic structure of a liquid crystal display apparatus is made up by a liquid crystal of the TN (twisted nematic) system, a monolithic polarization plate system, an STN (super-twisted nematic) system, a GH (guest-host) system, a PDLC (polymer dispersion) system or a cholesteric system, a switching device, a reflector provided inside or outside the liquid crystal cell, and a transparent electrode.

A reflector, which is used as a pixel electrode, contributes to enhancement of the intensity of light scattered in an orientation perpendicular to a display picture surface with respect to the incident light entered with a large incident angle. With this reflector, a brighter display may be produced. By covering a passivation film, having a roughness formed on a surface, with a reflection film, to provide a reflection surface with a roughness, an optimum reflection characteristic may be achieved. As for a typical conventional method for forming a rough surface on a reflector, see for example the JP Patent Kokai JP-A-10-319422.

A transparent electrode of ITO (indium tin oxide), used as a pixel electrode, may be formed as an uppermost layer, by layer separation from a drain layer, in order to improve the definition and aperture ratio of a display picture in a semi-transmission type liquid crystal display apparatus. The transparent electrode may also be formed on a surface of the reflector in order to prevent hillocks from being produced on the surface of the reflector formed of metal including Al.

The transparent electrode may also be used in a opening provided in the reflector in the semi-transmission type liquid crystal display apparatus, adapted for transmitting the backlight therethrough, so that the transparent electrode will operate as pixel electrodes. The transparent electrode is also sometimes used as wiring for electrically interconnecting a drain bus line and a drain electrode isolated therefrom.

In general, an active matrix substrate of a TN system is made up by a scanning line (termed a gate wiring or gate bus line) and a data line (termed a drain wiring or drain bus line), extending with orthogonal angles to each other, a reflector or a transparent electrode, formed in an area defined by these wirings, and thin-film transistors (TFTs) provided in the vicinity of the intersections of the gate and drain wirings. The active matrix substrate also includes a channel protection film on the TFT surface for guaranteeing the performance. On the TFTs, a reflector or a transparent electrode of this active matrix substrate, there is formed an orientation film for orienting the liquid crystal in a preset direction. The liquid crystal is sealed in a space defined by the active matrix substrate and by a counter substrate carrying another orientation film, a common electrode (transparent electrode) and a color filter, to complete the liquid crystal display apparatus.

By way of illustrating a conventional method for producing the liquid crystal display apparatus, the invention described in the JP Patent Kokai JP-A-10-319422 is now explained. FIGS. 81a–81d and FIGS. 82e–82g are cross-sectional views for schematically illustrating the processes for producing an active matrix substrate for a certain conventional reflection type liquid crystal display apparatus.

Referring first to FIG. 81a, in preparing an active matrix substrate, a gate electrode layer of, for example, Cr, is deposited on a transparent insulating substrate 101. Then, using a first mask, an exposed part of Cr is etched to form a gate bus line 102 and a gate electrode 103.

A gate insulating film 105, formed of $SiN_x$, an a-Si (amorphous silicon) film 107a and a n+ type a-Si film 107b, which is to become an ohmic contact layer, are deposited in this order, as shown in FIG. 81b. Then, using a second mask, unneeded portions of the a-Si film 107a and the n+ type a-Si film 107b are selectively etched to form an island.

Then, referring to FIG. 81c, source/drain electrode layer of, for example, Cr, is then deposited and, using a third mask, unneeded portions of the source/drain electrode layer are selectively etched, for forming an opening in a channel area of the a-Si film 107a and a preset wiring pattern, to form a source electrode 108, which is to become a signal line, a drain electrode 109 and a drain bus line 110.

Then, using the source electrode 108 and the drain electrode 109 as an etching mask, the $n^+$ type a-Si film 107b is etched to form an ohmic contact layer.

Then, referring to FIG. 81d, an organic insulating film 112 of, for example, polyimide, is deposited on the entire substrate surface. Then, using a fourth mask, a contact hole 113 for exposing a portion of the source electrode 108 and a contact hole 117c for exposing a portion of the gate bus line 102 are formed.

Then, referring to FIG. 82e, a portion of the organic insulating film 112 is selectively removed, using a fifth mask, and a rough portion 112b is formed, by heat treatment.

Referring to FIG. 82f, a layer of metal, such as Al, is deposited on the entire substrate surface and, using a sixth photo mask, the metal layer is selectively etched to form a reflector 104b. This forms a reflector having a rough surface. The reflector 104b is electrically connected to the source electrode 108 through the contact hole 113.

Finally, a transparent electrode layer of, for example, ITO (indium tin oxide) is deposited on the entire surface of the transparent insulating substrate 101, as shown in 82g. Then, using a seventh photomask, a preset portion of the transparent electrode layer is removed to form a drain terminal 117d connecting to the drain bus line 102 through the contact hole 117c and a hillock inhibiting film 152, adapted for inhibiting generation of hillocks in the reflector 104 to complete the manufacture of the active matrix substrate. The hillock inhibiting film may also be a transparent electrode.

In the above-described active matrix substrate, the reflector which is to become the pixel electrode and the transparent electrode are not provided on the same layer as the source/drain electrode layer, but are insulated and separated from each other by an organic insulating film. Consequently, for insulation and separation of the transparent electrode layer and the drain electrode layer, these do not have to be separated from each other in the transverse direction relative to the normal line direction of the active matrix substrate, so that these can be extremely close to or overlapped with each other. As a result, the black matrix for shielding the uncontrolled backlight light rays, leaking from an interstice produced when the transparent electrode layer and the drain electrode layer are separated from each other in the transverse direction, can be rendered small and hence the aperture ratio can be meritoriously increased. For this reason, the transparent electrode layer and the drain electrode layer are insulated and separated from each other by an organic insulating film.

SUMMARY OF THE DISCLOSURE

In order to produce a liquid crystal display apparatus that is able to make bright high-quality display by using the conventional production method, it is necessary to form high performance transistors and high performance reflectors on one and the same insulating substrate, with the result that a large number of deposition processes, photolithography processes and etching processes are required.

In the conventional method for manufacturing the active matrix substrate, shown in FIGS. 81 and 82, there are required seven photolithography (PR) processes, namely, a PR process for forming a gate bus wiring and a gate electrode, a PR process for forming a contact layer and a semiconductor layer, a PR process for forming a source electrode, a drain electrode and a source/bus wiring, a PR process for forming the contact hole in the organic insulating film, a PR process for forming the rough surface of the organic insulating film, a PR process for forming the reflective plate and a PR process for forming the transparent electrode. These PR processes lead to increased production cost of the apparatus and hence to a high unit cost.

In light of the above, it has been desired to lower production cost through reduction in the number of PR steps and to realize high brightness and high quality display performance to enable the high brightness liquid crystal display apparatus at a low cost.

Accordingly, it is an object of the present invention to provide a liquid crystal display apparatus and a method for producing it, in which an optimum display performance of the liquid crystal display apparatus may be demonstrated even though the number of PR processes is diminished.

The above and other objects of the invention are satisfied, at least in part, in accordance with a first aspect of the present invention, by providing a method for producing a liquid crystal display apparatus having a first substrate including a thin film transistor and a reflector on an insulating substrate, a second substrate having a transparent electrode and mounted facing the first substrate, and a liquid crystal layer placed between the first substrate and the second substrate, in which the method includes a first step of forming an etching mask, patterned to a preset shape, on at least one of a metal layer, an insulating layer and a semiconductor layer, formed on the insulating substrate, a second step of etching at least one of the metal layer, insulating layer and the semiconductor layer, using the etching mask, to expose a portion of the insulating substrate and to form a constituent portion of the thin film transistor and a plurality of protrusions being separated from the constituent portion, a third step of causing only the etching mask to reflow to cover exposed part of the constituent portion of the thin film transistor and near-by surface portions of the insulating substrate with the etching mask and to cover exposed surfaces of the protrusions and near-by surface portions of the insulating substrate, while exposing surface portions of the insulating substrate between neighboring protrusions, a fourth step of etching said insulating substrate, following said third step, using said etching mask, to form one or more recesses in exposed areas of said insulating substrate, and a fifth step of selectively forming a reflector having a rough surface on a rough surface formed at least by said protrusions and recesses.

In the method for producing the liquid crystal display apparatus in accordance with the present invention, in case a metal layer and an insulation layer are formed in this order on the insulating substrate, it is preferred to etch the insulating layer in the second step, using the etching mask, to expose portions of the metal layer, and to stop the contact hole by the etching mask by reflow of the etching mask in the third step. When the insulating substrate is a glass substrate and the etching liquid is HF, and the metal layer is exposed from the contact hole, there is a risk of HF permeating through the metal layer to etch the underlying glass substrate.

The method for producing a liquid crystal display apparatus in accordance with the present invention, desirably includes a sixth step following the fourth step and previous to the fifth step, with the sixth step forming another insulating layer having a rough surface on the rough surface at least formed by the protrusions and recesses. It is because this step renders it possible to adjust the rounding of the irregularities when the surface roughness of the rough surface formed by the protrusions and recesses is excessive, that is when the rough surface is square-shaped.

In accordance with a second aspect of the present invention, there is provided a method for producing a liquid crystal display apparatus having a first substrate including a thin film transistor and a reflector on an insulating substrate, a second substrate having a transparent electrode and mounted facing the first substrate, and a liquid crystal layer placed between the first substrate and the second substrate, in which the method includes a first step of forming a metal layer on the insulating substrate, and subsequently etching the metal layer using a first etching mask to expose a portion of the insulating substrate and to form a gate electrode, a second step of causing only the etching mask to reflow to cover the exposed surface of the gate insulating electrode and near-by surface portions of the insulating substrate with the etching mask and to cover the exposed surface portions of the protrusions and near-by surface portions of the insulating substrate with the etching mask, a third step of etching the insulating substrate using the etching mask to form one or more recesses in an exposed area of the insulating substrate and a fourth step of selectively forming a reflector having a rough surface on the rough surface of the insulating layer.

In accordance with a third aspect of the present invention, there is provided a method for producing a liquid crystal display apparatus having a first substrate including a thin film transistor and a reflector on an insulating substrate, a second substrate having a transparent electrode and mounted facing the first substrate, and a liquid crystal layer placed between the first substrate and the second substrate, in which the method includes a first step of etching the metal layer, using a first etching mask, following the formation of a metal layer on the insulating substrate, to expose a portion of the insulating substrate and to form a gate electrode, a second step of forming an insulating layer on the insulating substrate including the gate electrode and subsequently etching the insulating layer, using a second etching mask, to expose portions of the insulating substrate while forming a gate insulating film and a plurality of protrusions separated from the gate insulating films, a third step of causing only the etching mask to reflow to cover exposed portions of the gate insulating films and near-by surface portions of the insulating substrate with the etching mask and to cover exposed surfaces of the protrusions and near-by surface portions of the insulating substrate, while exposing the surface portions of the insulating substrate between neighboring protrusions, a fourth step of etching the insulating substrate, following the third step, using the etching mask, to form one or more recesses in exposed areas of the insulating substrate and a fifth step of selectively forming a reflector having a rough surface on the rough surface formed at least by the protrusions and recesses.

In the method for producing a liquid crystal display apparatus, in accordance with the present invention, a sixth step of forming a semiconductor layer on the insulating layer and of subsequently etching the semiconductor layer, using a third etching mask, to form an island above the gate electrode, is preferably provided following formation of the insulating layer and prior to using the second etching mask in the second step.

In the method for producing a liquid crystal display apparatus, in accordance with the present invention, the reflector formed in the second step is directly arranged on the rough surface formed by the protrusions and recesses. It is because surface roughness of the rough surface formed by the protrusions and recesses can be prevented from being decreased.

In the method for producing a liquid crystal display apparatus, in accordance with the present invention, the reflector is of a laminated structure comprised of a lower Cr layer and an upper Al/Nd layer. The source electrode and the drain electrode of the laminated structure are selectively formed when the reflector is formed in the fifth step. A contact hole for partially exposing the Cr layer of the source electrode is formed in an other insulation layer formed on the insulating layer comprised of the reflector, source electrode and the drain electrode, and in the Al/Nd layer, after forming the other insulating layer. A transparent electrode layer electrically connecting to the source electrode through the contact hole is selectively formed on the other insulating layer. It is because optimum electrical conductivity may be maintained between the source electrode and the transparent electrode layer, such as ITO, as hillocks are prevented from being produced on the surface of the Al/Nd layer in the reflector.

In accordance with a fourth aspect of the present invention, there is provided a method for producing a liquid crystal display apparatus having a first substrate including a thin film transistor and a reflector on an insulating substrate, a second substrate having a transparent electrode and mounted facing the first substrate, and a liquid crystal layer placed between the first substrate and the second substrate, in which the method includes a first step of forming a first metal layer on the insulating substrate and subsequently etching the first metal layer, using a first etching mask, to expose a portion of the insulating substrate and to form a gate electrode, a second step of forming a first insulating layer and a semiconductor layer in this order on the insulating substrate including the gate electrode and of subsequently etching the semiconductor layer using a second etching mask to form an island above the gate electrode, a third step of forming a second metal layer on the first insulating layer including the island and of subsequently etching the second metal layer using a third etching mask to form the source electrode and the drain electrode, a fourth step of forming a second insulating layer on the first insulating layer including the source electrode and the drain electrode and of subsequently etching the second insulating layer and the first insulating layer, using a fourth etching mask, to expose a portion of the insulating substrate and to form a plurality of protrusions, a fifth step of causing only the fourth etching mask to reflow following the fourth step to cover exposed surface portions of the first and second insulating layers and near-by surface portions of the insulating substrate with the fourth etching mask and to cover exposed surface portions of the protrusions and near-by surface portions of the insulating substrate with the fourth etching mask while exposing surface portions of the insulating substrate lying between neighboring protrusions, a sixth step of etching the insulating substrate, using the fourth etching mask, following the fifth step, to selectively form one or more recesses in an exposed area of the insulating substrate, and a seventh step of selectively forming a reflector which has a rough surface on the rough surface formed at least by the protrusions and recesses.

In accordance with a fifth aspect of the present invention, there is provided a method for producing a liquid crystal display apparatus having a first substrate including a thin film transistor and a reflector on a predominantly planar insulating substrate, a second substrate having a transparent electrode and mounted facing the first substrate, and a liquid crystal layer placed between the first substrate and the second substrate, in which the method includes a first step of etching the planar insulating substrate, using a first etching mask, to selectively form a rough surface in a preset area of the insulating substrate, and a second step of etching the metal layer, using a second etching mask, for selectively forming a gate electrode on a planar area of the insulating substrate, and for selectively forming a reflector having a rough surface overlying a rough surface of the insulating substrate in register herewith and in isolation from the gate electrode.

In accordance with a sixth aspect of the present invention, there is provided a method for producing a liquid crystal display apparatus having a first substrate including a thin film transistor and a reflector on an insulating substrate, a second substrate having a transparent electrode and mounted facing the first substrate, and a liquid crystal layer placed between the first substrate and the second substrate, in which the method includes a first step of forming a first metal layer on the insulating substrate and subsequently etching the first metal layer using a first etching mask, to expose a portion of the insulating substrate, and to form a gate electrode, a plurality of protrusions separated therefrom, and a wiring isolated from the gate electrode and the protrusions, a second step of causing only the first etching mask to reflow to cover exposed surfaces of the gate electrode and the wiring and near-by surface portions of the insulating substrate with the first etching mask and to cover exposed surfaces of the protrusions and near-by surface portions of the insulating substrate with the first etching mask, a third step of etching the insulating substrate, using the first etching mask, after the second step, to form one or more recesses in the exposed area of the insulating substrate, a fourth step of etching the semiconductor layer, using a second etching mask, after forming a first insulating film and a semiconductor layer on the insulating substrate, including the gate electrode, the protrusions and the wiring, to form an island above the gate electrode, a fifth step of etching the first insulating layer, using a third etching mask, to expose a portion of the wiring to form a first contact hole, a sixth step of etching a second metal layer, using a fourth etching mask, after forming the second metal layer on the first insulating layer, including the island, to form a source electrode, a drain electrode and a reflector, to electrically connect the source electrode through the first contact hole with the wiring, a seventh step of forming, after forming a second insulating layer on the first insulating layer including the source electrode, drain electrode and the reflector, a second contact hole in the second insulating layer and in the first insulating layer, using a fifth etching mask, for exposing a portion of the wiring, and an eighth step of selectively forming a transparent electrode layer on the second insulating layer for electrically connecting to the wiring through the second contact hole. It is because it is possible to prevent the electrical field applied to the liquid crystal from being reduced when the transparent electrode is in the uppermost layer, and because the source electrode and the transparent electrode can be electrically interconnected through ha wiring to prevent shorting across the drain electrode and the transparent electrode.

In accordance with a seventh aspect of the present invention, there is provided a method for producing a liquid crystal display apparatus having a first substrate including a thin film transistor and a reflector on an insulating substrate, a second substrate having a transparent electrode and mounted facing the first substrate, and a liquid crystal layer placed between the first substrate and the second substrate, in which the method includes a first step of forming a first metal layer on the insulating substrate and subsequently etching the first metal layer, using a first etching mask, to expose a portion of the insulating substrate, and to form a gate electrode and a wiring separated from the gate electrode, a second step of forming a first insulating layer and a semiconductor layer in this order on the insulating substrate including the gate electrode and the wiring, and subsequently etching the semiconductor layer, using a second etching mask, to form an island above the gate electrode, a third step of etching the first insulating layer, using a third etching mask, to form a first contact hole which exposes a portion of the wiring, of exposing a portion of the insulating substrate and of forming a plurality of protrusions, a fourth step of causing only the third etching mask to reflow to cover the exposed surface portions of the first insulating layer and near-by surface portions of the insulating substrate with the third etching mask, to stop up the first contact hole with the third etching mask and to cover the exposed surface portions of the protrusions and near-by surface portions of the insulating substrate with the third etching mask while exposing surface portions of the insulating substrate located between neighboring protrusions and nearby surface portions of the insulating substrate, a fifth step of etching the insulating substrate, after the fourth step, using the third etching mask, to form one or more recesses in an exposed area of the insulating substrate, a sixth step of forming a second metal layer on the first insulating layer including the island, on the protrusions and on the recesses, and subsequently etching the second metal layer, using a fourth etching mask, to form a source electrode, a drain electrode and a reflector, to connect the source electrode electrically to the wiring through the first contact hole, a seventh step of forming a second insulating layer on the first insulating layer including the source electrode, drain electrode and the reflector, and subsequently forming a second contact hole, which exposes a portion of the wiring to the second insulating layer and the first insulating layer, using a fifth etching mask, and an eighth step of selectively forming a transparent electrode layer on sad second insulating layer for electrically connecting to the wiring through the second contact hole.

In the method for producing a liquid crystal display apparatus, the etching mask is preferably a photoresist.

In the method for producing a liquid crystal display apparatus, the reflector has an opening in a preset area in its rough surface.

Still other objects and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 4 is a plan view schematically showing the structure of the active matrix substrate in the liquid crystal display apparatus according to the first embodiment of the present invention.

FIGS. 11a–11f are cross-sectional views along line A–A' schematically showing the production process of the active matrix substrate in the liquid crystal display apparatus according to the first embodiment of the present invention.

FIGS. 13a–13f are cross-sectional views along line C–C' schematically showing the production process of the active matrix substrate in the liquid crystal display apparatus according to the first embodiment of the present invention.

PREFERRED EMBODIMENTS OF THE INVENTION

Figure 23A:
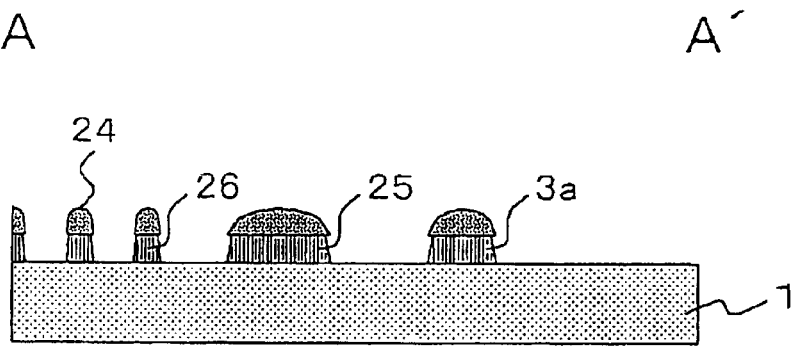
FIGS. 23a–23d are first cross-sectional views along line A–A' schematically showing the production process of the active matrix substrate in the liquid crystal display apparatus according to the second embodiment of the present invention.
Figure 23B:
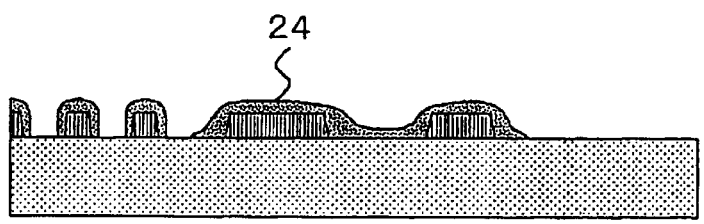
Figure 23C:
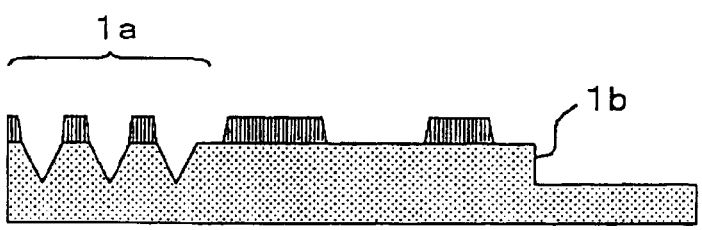
Figure 23D:
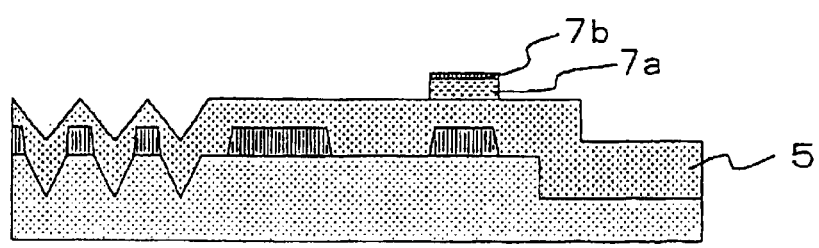
Figure 24E:
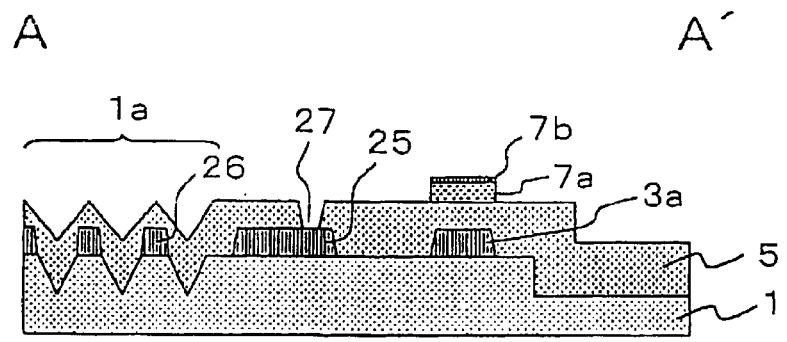
FIGS. 24e–24h second cross-sectional views along line A–A' schematically showing the production process of the active matrix substrate in the liquid crystal display apparatus according to the second embodiment of the present invention.
Figure 24F:
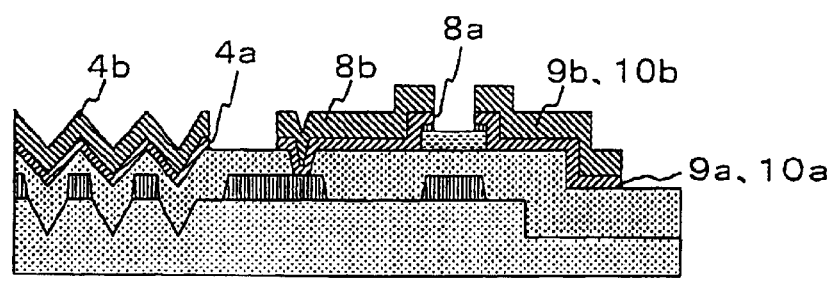
Figure 24G:
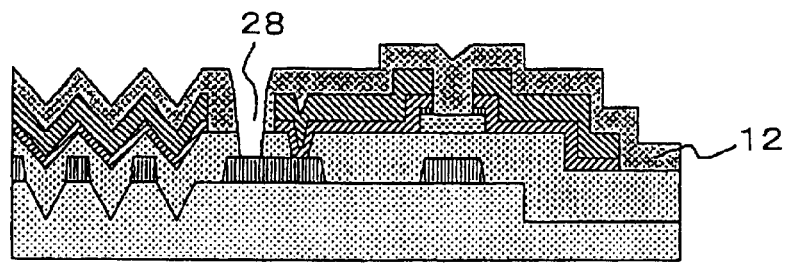
Figure 24H:
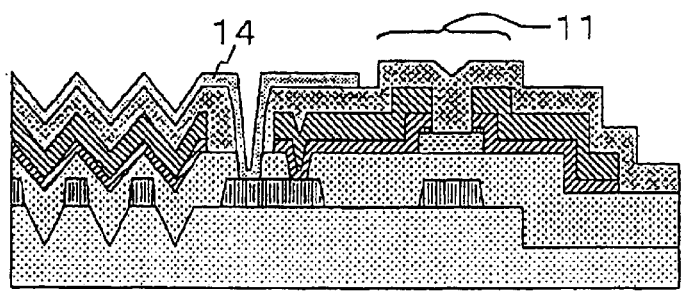
Figure 25A:
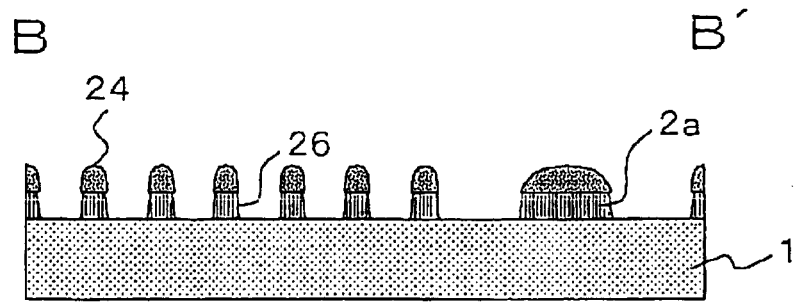
FIGS. 25a–25d are first cross-sectional views along line B–B' schematically showing the production process of the active matrix substrate in the liquid crystal display apparatus according to the second embodiment of the present invention.
Figure 25B:
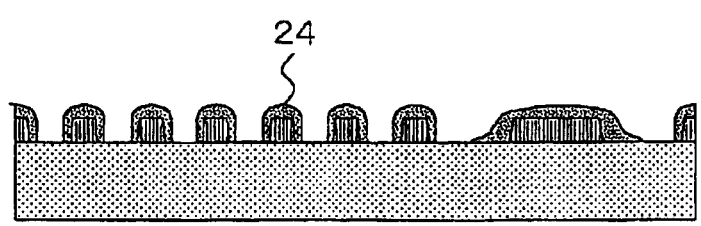
Figure 25C:
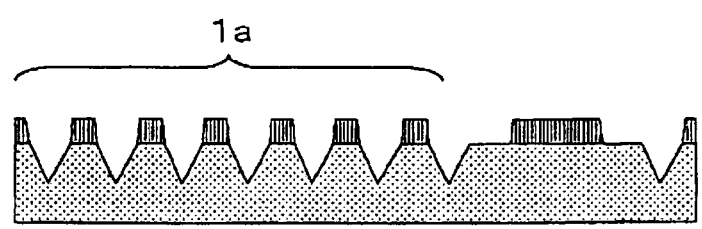
Figure 25D:
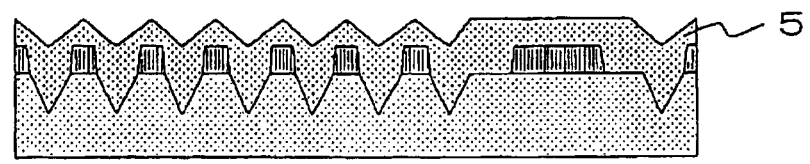
Figure 26E:
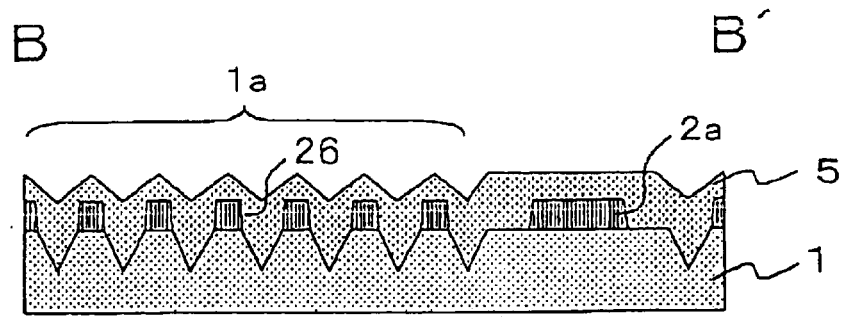
FIGS. 26e–26h are second cross-sectional views along line B–B' schematically showing the production process of the active matrix substrate in the liquid crystal display apparatus according to the second embodiment of the present invention.
Figure 26F:
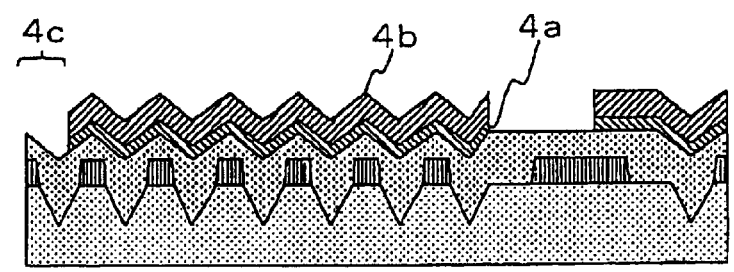
Figure 26G:
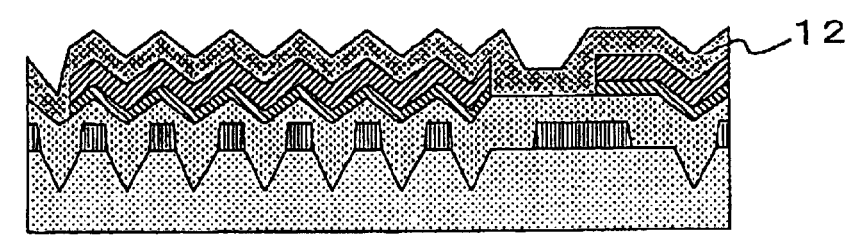
Figure 26H:
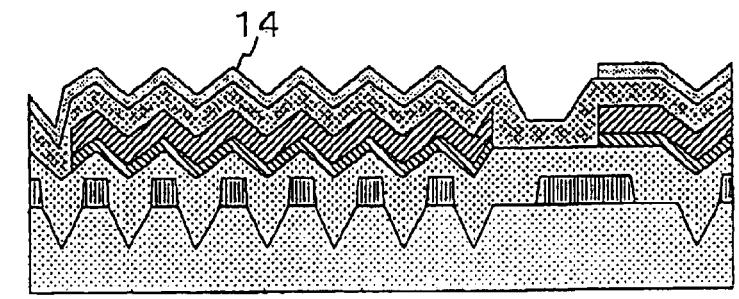
Figure 27A:
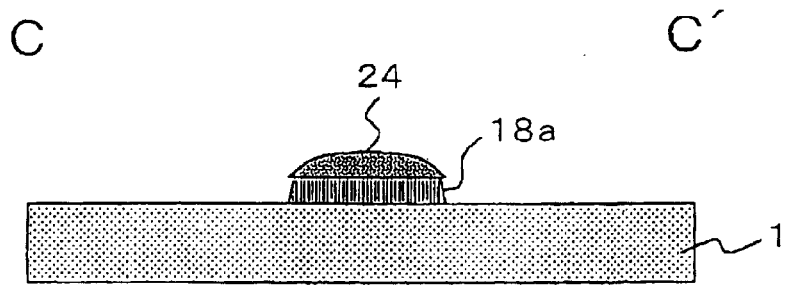
FIGS. 27a–27d are first cross-sectional views along line C–C' schematically showing the production process of the active matrix substrate in the liquid crystal display apparatus according to the second embodiment of the present invention.
Figure 27B:
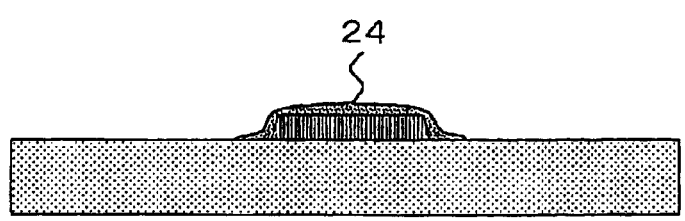
Figure 27C:
Figure 27D:
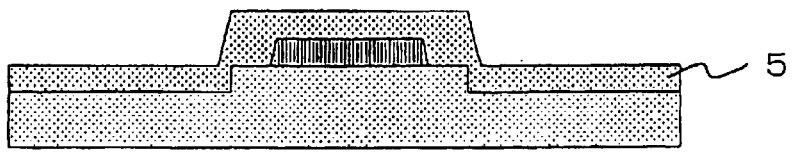
Figure 28E:
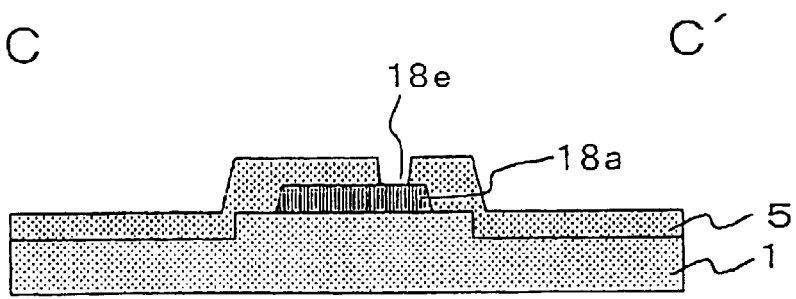
FIGS. 28e–28h are second cross-sectional views along line C–C' schematically showing the production process of the active matrix substrate in the liquid crystal display apparatus according to the second embodiment of the present invention.
Figure 28F:
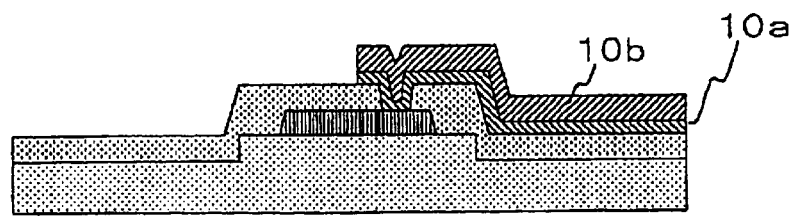
Figure 28G:
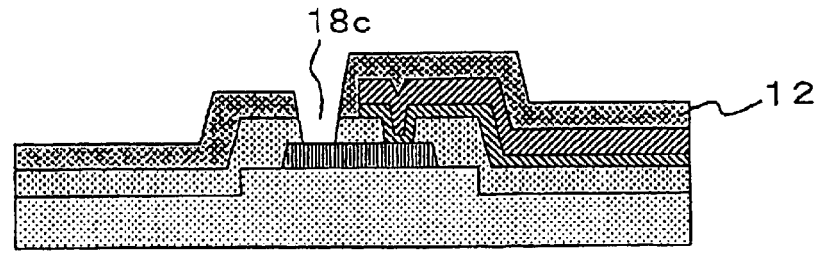
Figure 28H:
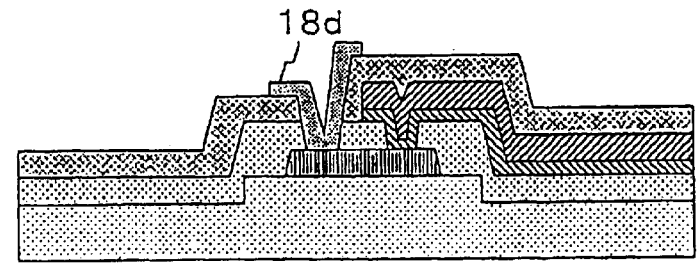
Figure 29A:
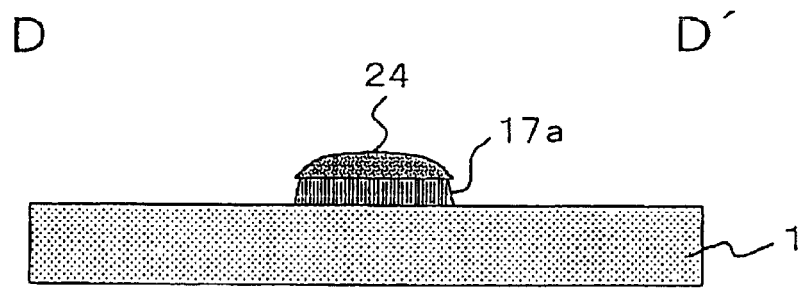
FIGS. 29a–29d are first cross-sectional view along line D–D' schematically showing the production process of the active matrix substrate in the liquid crystal display apparatus according to the second embodiment of the present invention.
Figure 29B:
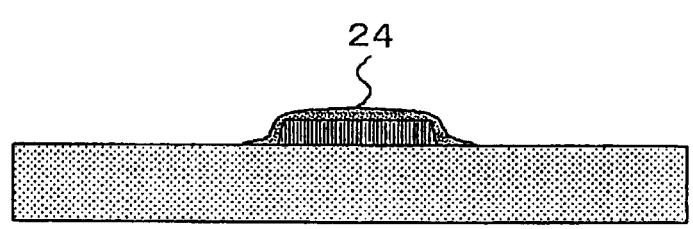
Figure 29C:
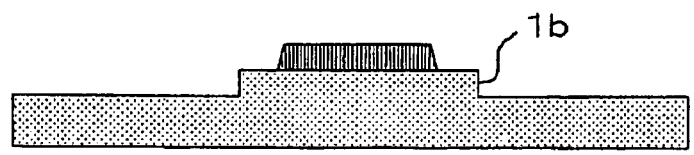
Figure 29D:
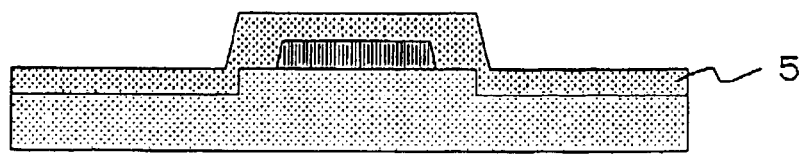
Figure 30E:
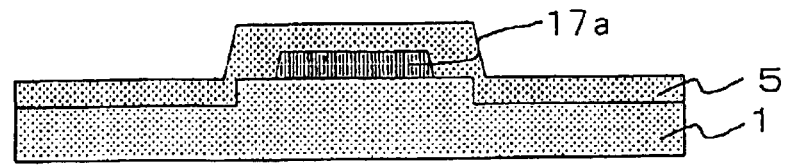
FIGS. 30e–30h are second cross-sectional views along line D–D' schematically showing the production process of the active matrix substrate in the liquid crystal display apparatus according to the second embodiment of the present invention.
Figure 30F:
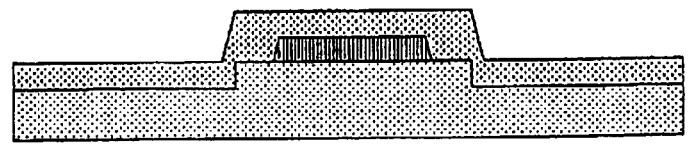
Figure 30G:
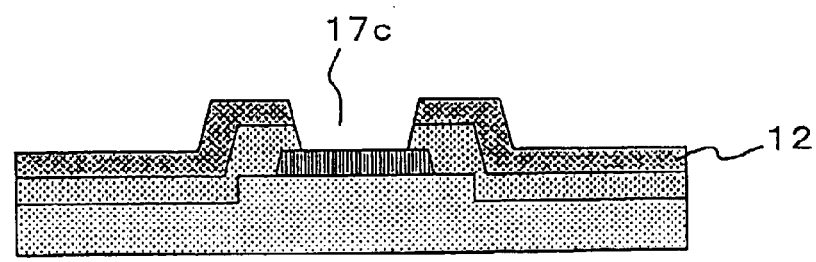
Figure 30H:
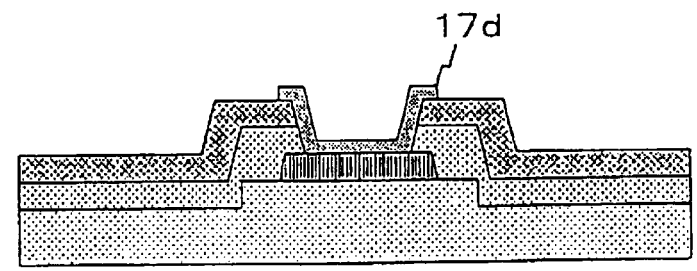
Figure 31A:
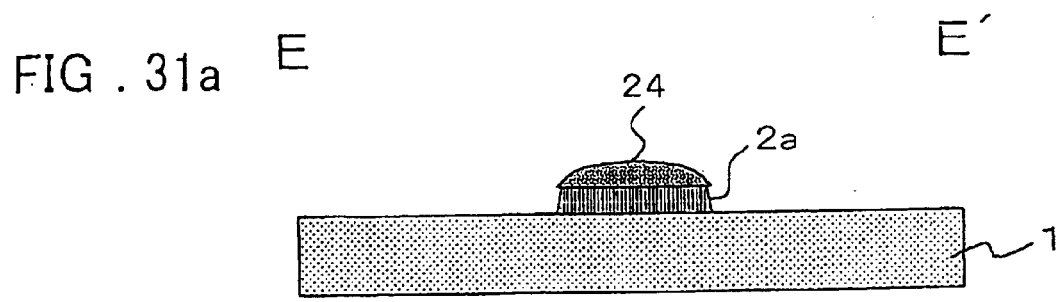
FIGS. 31a–31d are first cross-sectional views along line E–E' schematically showing the production process of the active matrix substrate in the liquid crystal display apparatus according to the second embodiment of the present invention.
Figure 31B:
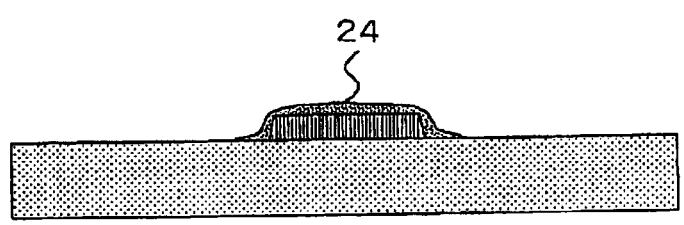
Figure 31C:
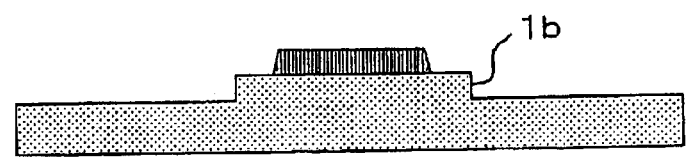
Figure 31D:
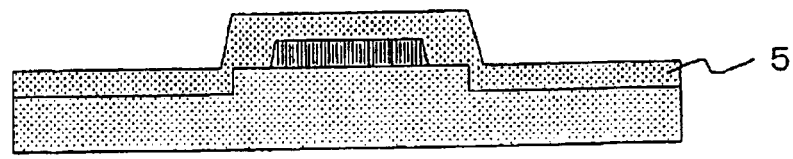
Figure 32E:
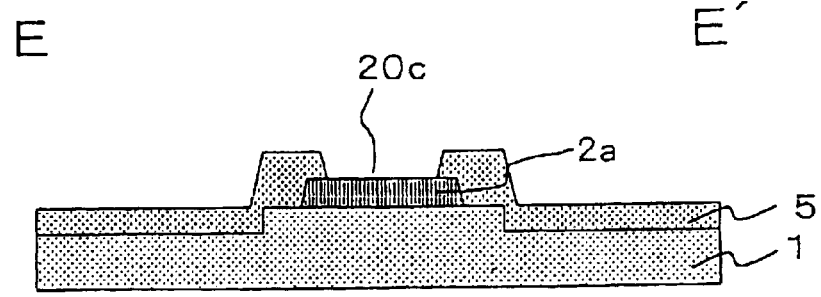
FIGS. 32e–32h are second cross-sectional views along line E–E' schematically showing the production process of the active matrix substrate in the liquid crystal display apparatus according to the second embodiment of the present invention.
Figure 32F:
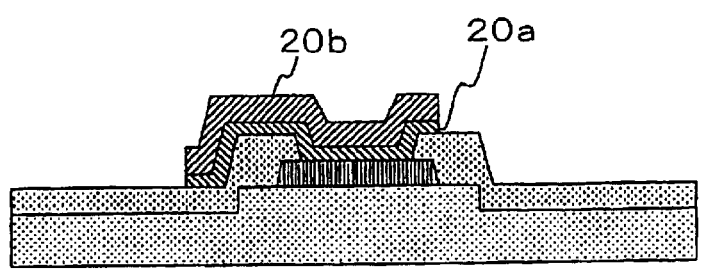
Figure 32G:
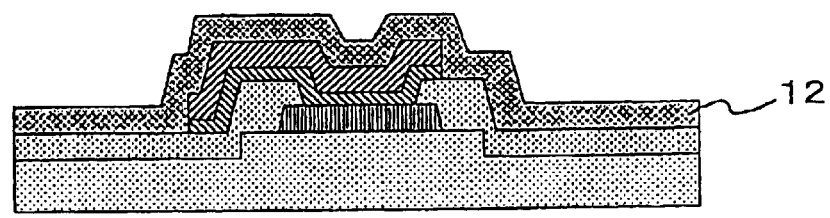
Figure 32H:
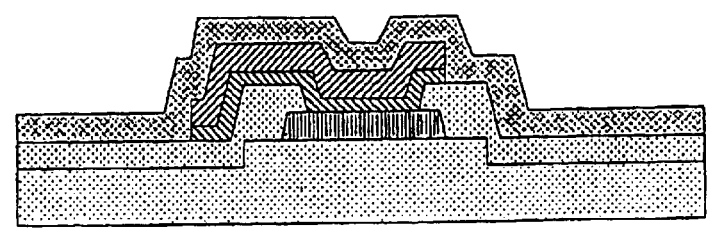
Figure 33:
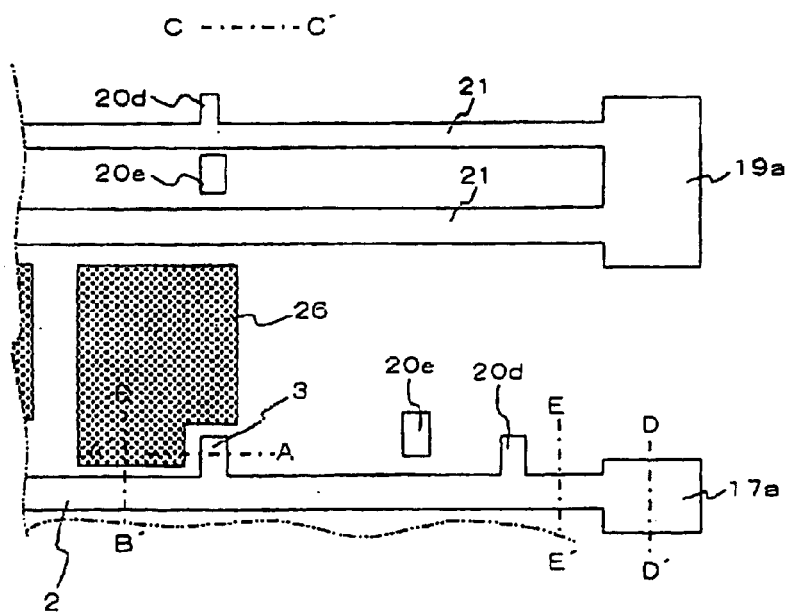
FIG. 33 is a first plan view schematically showing the production process of the active matrix substrate in the liquid crystal display apparatus according to a third embodiment of the present invention.
Figure 34:
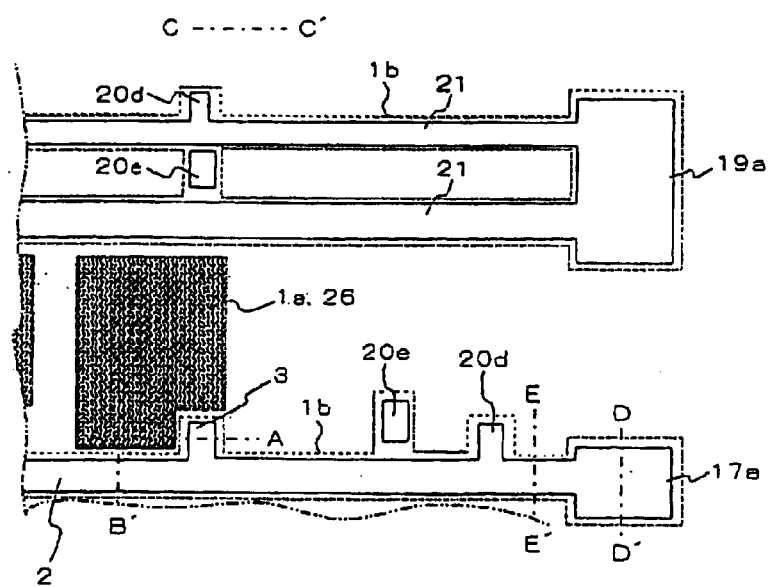
FIG. 34 is a second plan view schematically showing the production process of the active matrix substrate in the liquid crystal display apparatus according to the third embodiment of the present invention.
Figure 35:
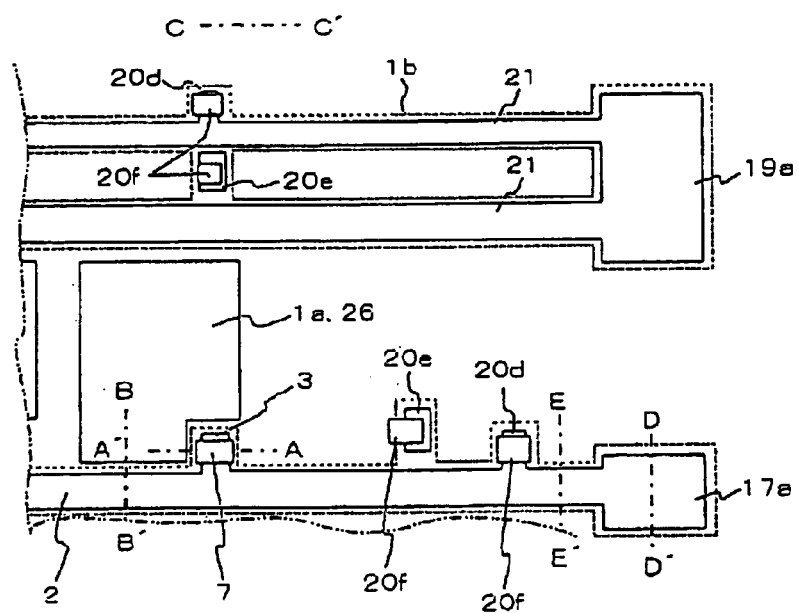
FIG. 35 is a third plan view schematically showing the production process of the active matrix substrate in the liquid crystal display apparatus according to the third embodiment of the present invention.
Figure 36:
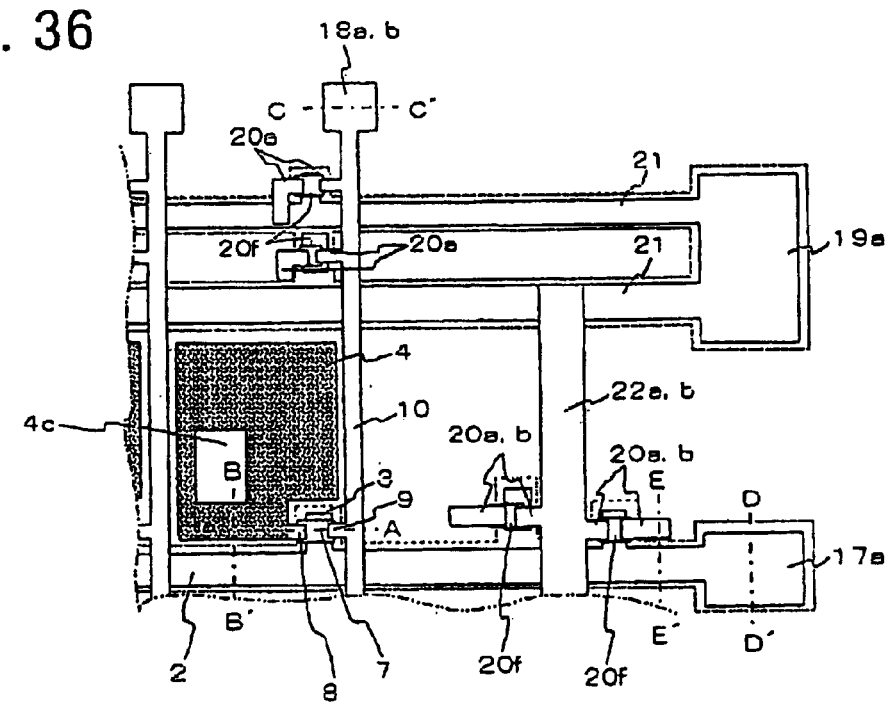
FIG. 36 is a fourth plan view schematically showing the production process of the active matrix substrate in the liquid crystal display apparatus according to the third embodiment of the present invention.
Figure 37:
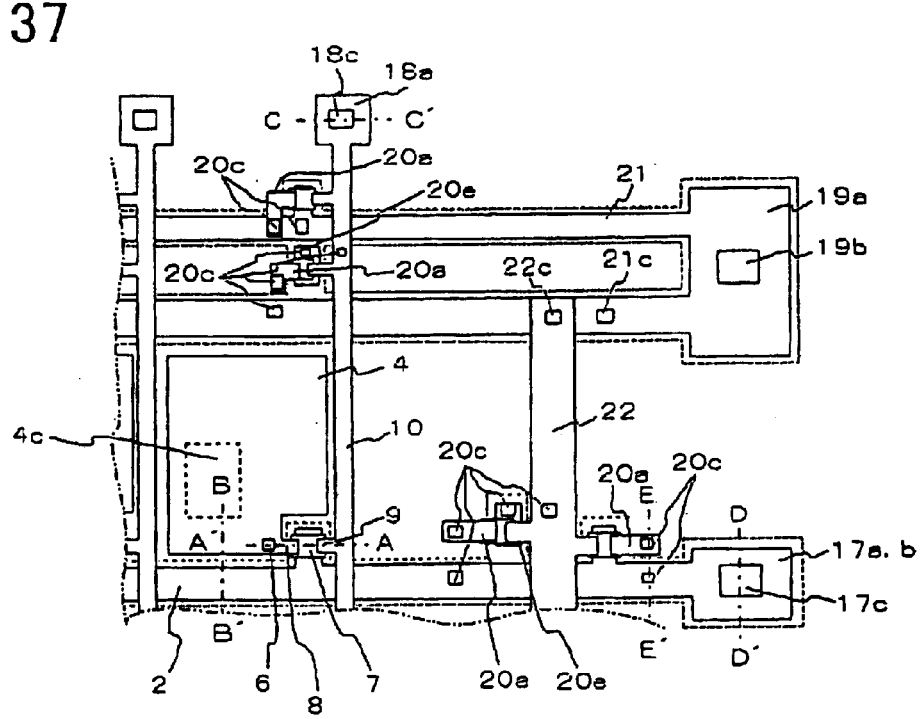
FIG. 37 is a fifth plan view schematically showing the production process of the active matrix substrate in the liquid crystal display apparatus according to the third embodiment of the present invention.

Preferred embodiments of the present invention will now be described in the below. According to the present invention, a method for producing a liquid crystal display apparatus having a first substrate including a thin film transistor and a reflector on an insulating substrate, a second substrate having a transparent electrode and mounted facing the first substrate, and a liquid crystal layer placed between the first substrate and the second substrate includes a first step of forming an etching mask (24 of FIG. 23), patterned to a preset shape, on at least one of a metal layer (3a, 25, and 26 of FIG. 23), an insulating layer and a semiconductor layer, formed on the insulating substrate (1 of FIG. 23), a second step (FIG. 23a) of etching at least one of the metal layer, insulating layer and the semiconductor layer, using the etching mask, to expose a portion of the insulating substrate under forming constituent portion (3a of FIG. 23) of the thin film transistor and a plurality of protrusions (26 of FIG. 23) being separated from the constituent portion, a third step (FIG. 23b) of causing only the etching mask to reflow to cover exposed portions of the constituent portion of the thin film transistor and near-by surface portions of the insulating substrate with the etching mask and to reflow to only cover exposed surfaces of the protrusions and near-by surface portions of the insulating substrate, leaving exposed surface portions of the insulating substrate between neighboring protrusions, a fourth step (FIG. 23c) of etching the insulating substrate, following the third step, using the etching mask, to form one or more recesses (1a and 1b of FIG. 23c) in exposed areas of the insulating substrate, and a fifth step (FIG. 24f) of selectively forming a reflector (4a and 4b of FIG. 24) having a rough surface on a rough surface formed at least by the protrusions and recesses. Thus, with the use of a sole etching mask, the constituent portion of the thin film transistor, such as a gate electrode or a gate insulating film, may be formed at the same time as a rough surface presenting pronounced inundation are produced.

For illustrating the above described various aspects of the present invention, certain embodiments of the invention are now explained in detail with reference to the drawings.

Figure 1:
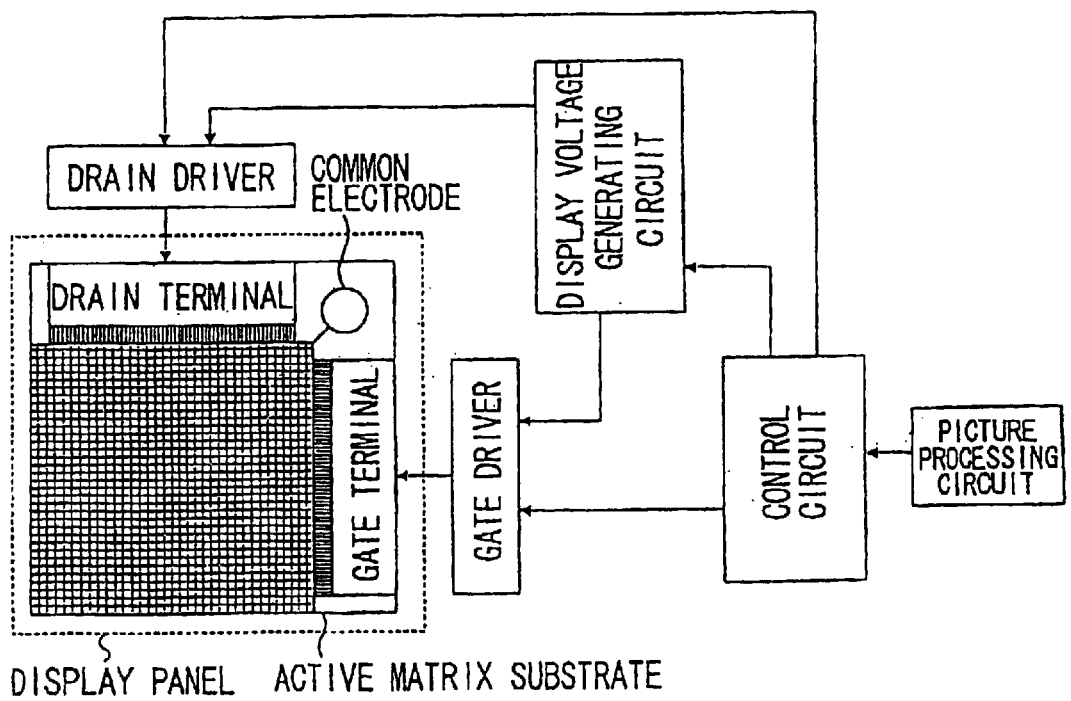
FIG. 1 is a block diagram schematically showing the structure of a liquid crystal display apparatus according to a first embodiment of the present invention.
Figure 2:
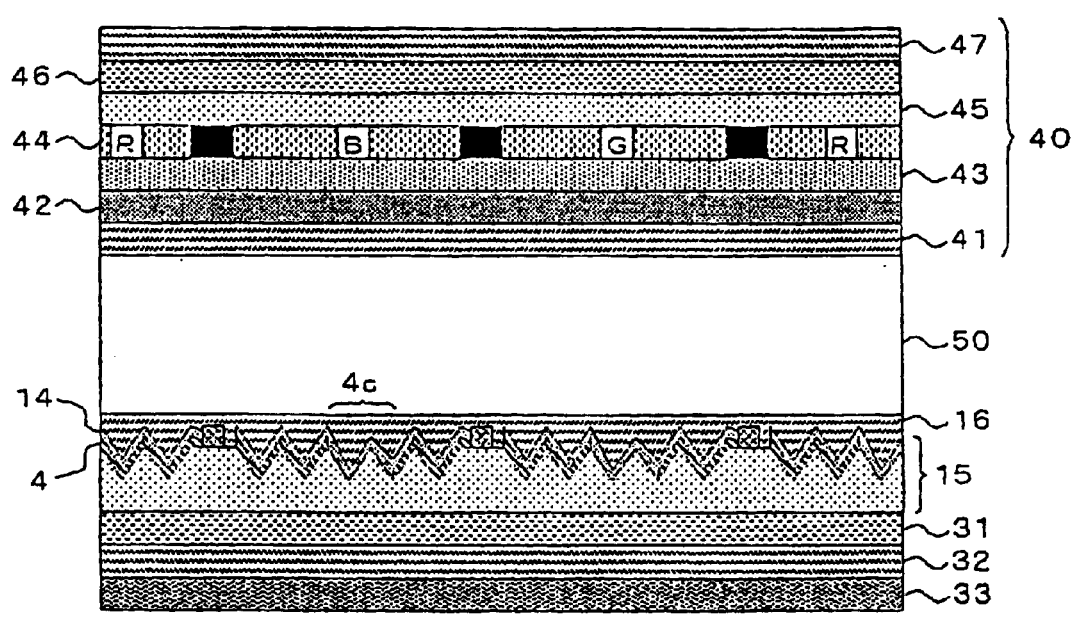
FIG. 2 is a partial cross-sectional view schematically showing the structure of a display unit in a semi-transmission type liquid crystal display apparatus according to the first embodiment of the present invention.
Figure 3:
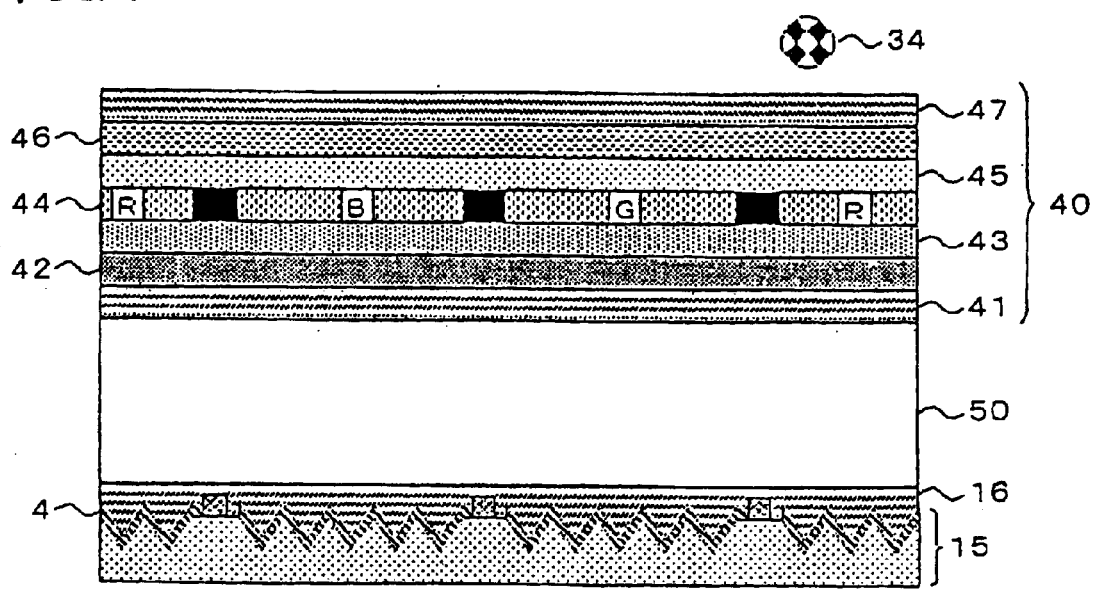
FIG. 3 is a partial cross-sectional view schematically showing the structure of a display unit in a reflection type liquid crystal display apparatus according to the first embodiment of the present invention.
Figure 5:
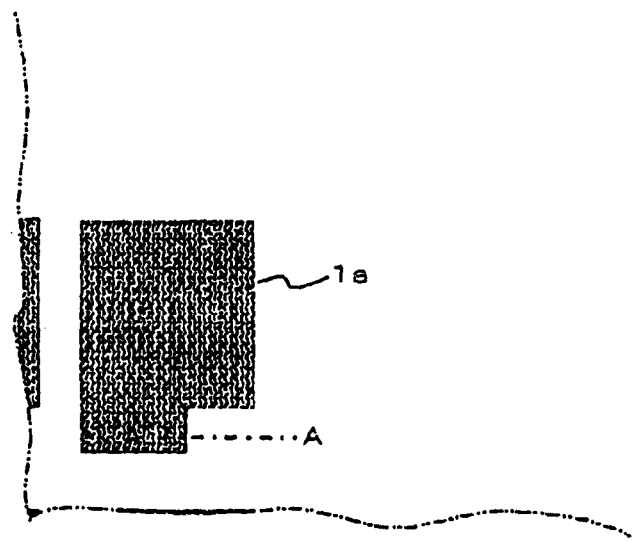
FIG. 5 is a first plan view schematically showing the production process of the active matrix substrate in the liquid crystal display apparatus according to the first embodiment of the present invention.
Figure 6:
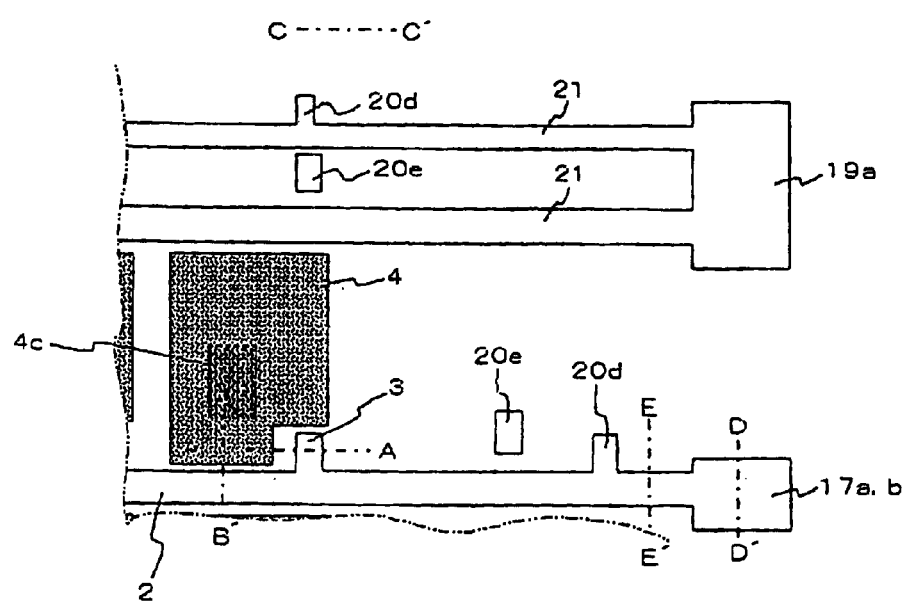
FIG. 6 is a second plan view schematically showing the production process of the active matrix substrate in the liquid crystal display apparatus according to the first embodiment of the present invention.

FIG. 1 is a block diagram schematically illustrating the structure of the liquid crystal display apparatus according to the first embodiment of the present invention. FIG. 2 is a partial cross-sectional view schematically illustrating the structure of a display unit in the semi-transmission type liquid crystal display apparatus according to the first embodiment of the present invention. FIG. 3 is a partial cross-sectional view schematically illustrating the structure of a display unit in the reflection type liquid crystal display apparatus according to the first embodiment of the present invention. FIG. 4 is a plan view schematically illustrating the structure of an active matrix in the liquid crystal display apparatus according to the first embodiment of the present invention. FIGS. 5 to 10 are plan views schematically illustrating the production process for the active matrix substrate in the liquid crystal display apparatus according to the first embodiment of the present invention. FIG. 11a to FIG. 15f are cross-sectional views schematically illustrating the production process for the active matrix substrate in the liquid crystal display apparatus according to the first embodiment of the present invention, taken along lines A–A', B–B', C–C', D–D' and E–E', respectively.

Referring to FIG. 1, the liquid crystal display apparatus includes a picture processing circuit, a control circuit, and a display voltage generating circuit, a drain driver(termed also as a data driver), a gate driver(termed also as a scanning line driver) and a display panel.

The picture processing circuit executes pre-set calculations, based on the picture information, and sends the calculated picture processing signals to the control circuit.

The control circuit performs fine position adjustment, such as alignment of the drain driver and the gate driver, based on the picture processing signals, as received, while controlling the voltage generated in a display voltage generating circuit.

The display voltage generating circuit sends a preset voltage to each of the common terminals in the drain driver, gate driver and in the display panel, under the control from the control circuit.

Moreover, the drain driver drives the drain bus lines on the active matrix substrate in the display panel, through the drain terminal, under control from the control circuit.

The gate driver drives the gate bus lines on the active matrix substrate in the display panel through the gate terminal under control from the control circuit.

As for the module mounting on the display panel, known techniques such as TCP (tape carrier package), COG (chip on glass) or COF (chip on flexible printed circuit board) are used.

Referring to FIG. 2, the display panel comprises, in the case of the semi-transmission type liquid crystal display apparatus, an orientation film 16 on the entire surface towards a transparent electrode 14 of an active matrix substrate 15 which includes a reflector 4 provided with an opening 4c. The display panel also comprises, on the entire surface towards the insulating substrate of the active matrix substrate 15, a phase difference plate 31, a polarization plate 32 and a backlight 33, in this order, looking from the side insulating substrate. A liquid crystal layer 50 is interposed between an orientation film 41 provided on an opposite side substrate 40 and an orientation film 16 provided on the active matrix substrate 15. The opposite side substrate 40 comprises the orientation film 41, an opposite side transparent common electrode 42, a resin protective film 43, a color filter 44, an opposite side transparent insulating substrate 45, a phase difference plate 46 and a polarization plate 47, stacked in this order from the side liquid crystal layer.

Referring to FIG. 3, showing a reflection type liquid crystal display apparatus, there is provided no backlight on the side insulating substrate of the active matrix substrate 15 provided with the reflector 4 not having the opening. The arrangement of the orientation film 16, liquid crystal layer 50 and the opposite side substrate 40 is not changed from that in the case of the semi-transmission type liquid crystal display apparatus.

Referring to FIG. 4, the active matrix substrate 15 includes a driving element for each pixel or dot in the matrix, and drives the liquid crystal by switching the driving elements.

Figure 10:
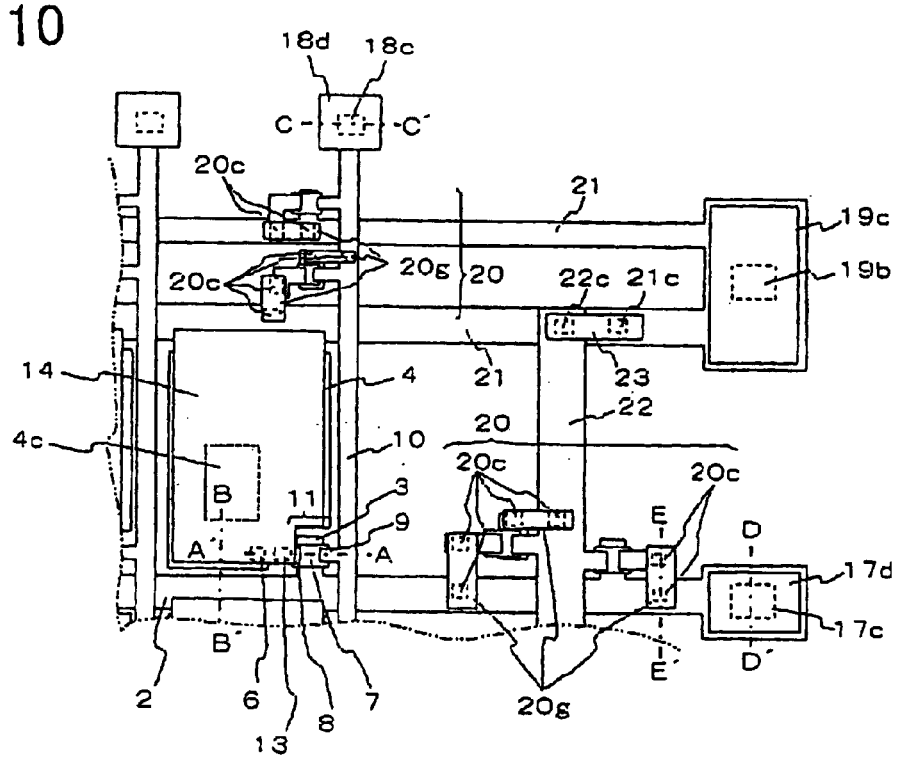
FIG. 10 is a sixth plan view schematically showing the production process of the active matrix substrate in the liquid crystal display apparatus according to the first embodiment of the present invention.
Figure 12A:
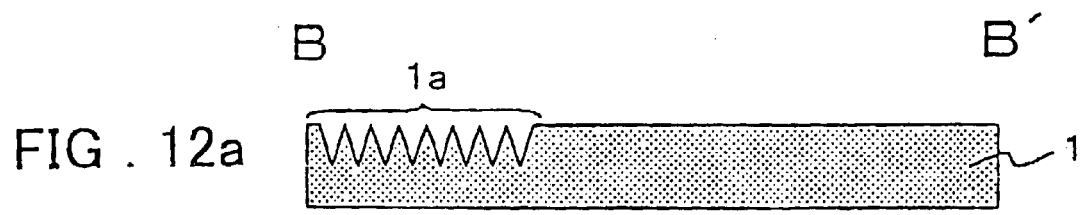
FIGS. 12a–12f are views along line B–B' schematically showing the production process of the active matrix substrate in the liquid crystal display apparatus according to the first embodiment of the present invention.
Figure 12B:
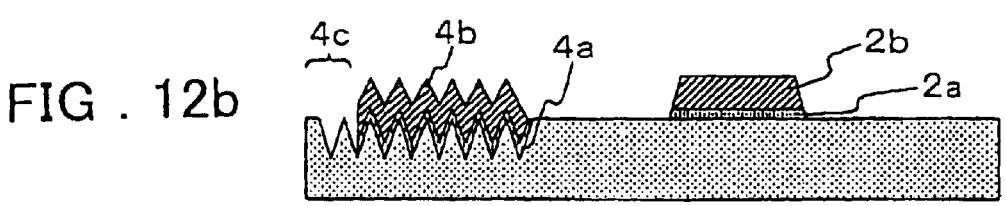
Figure 12C:
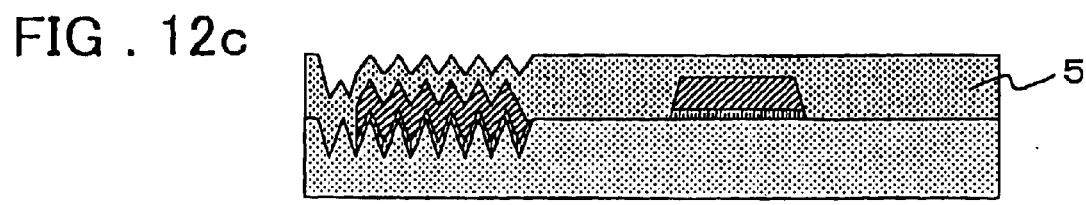
Figure 12D:
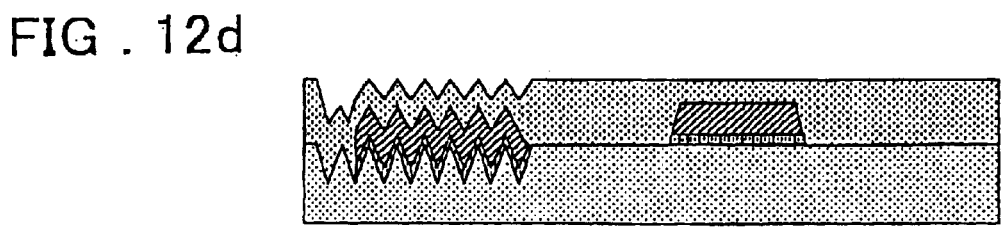
Figure 12E:
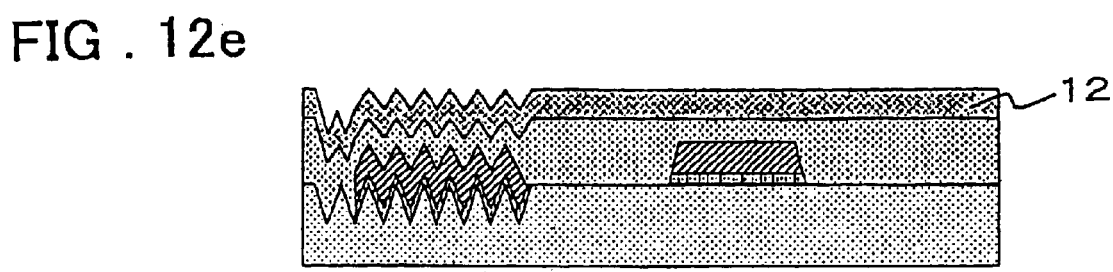
Figure 12F:
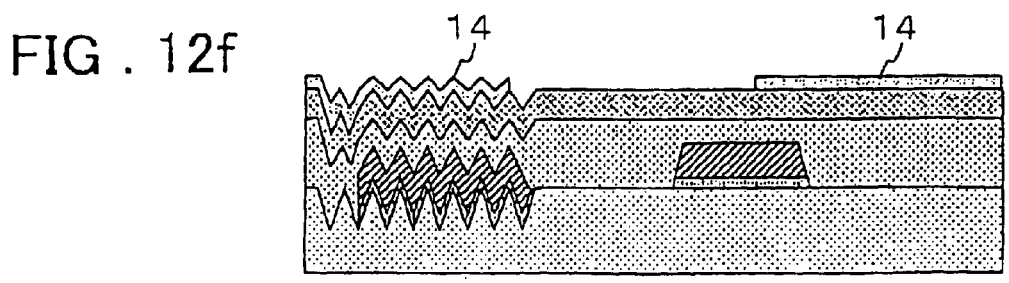
Figure 14A:
FIGS. 14a–14f are cross-sectional views along line D–D' schematically showing the production process of the active matrix substrate in the liquid crystal display apparatus according to the first embodiment of the present invention.
Figure 14B:
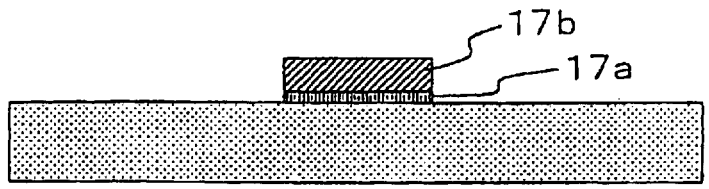
Figure 14C:
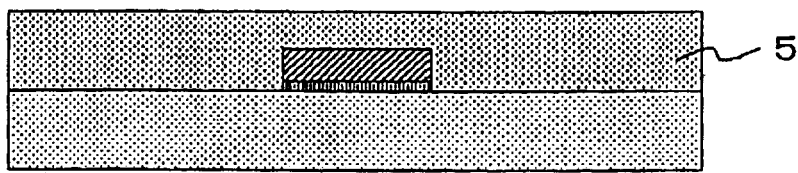
Figure 14D:
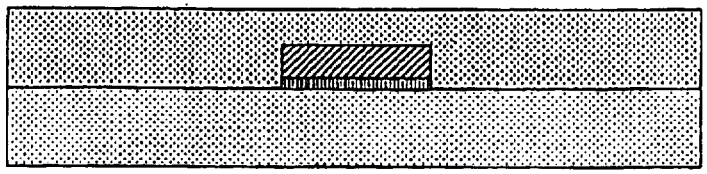
Figure 14E:
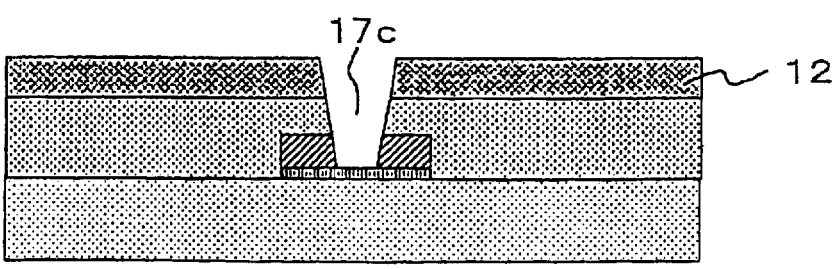
Figure 14F:
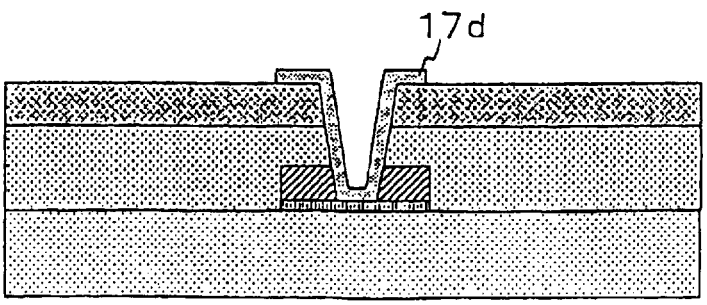
Figure 15A:
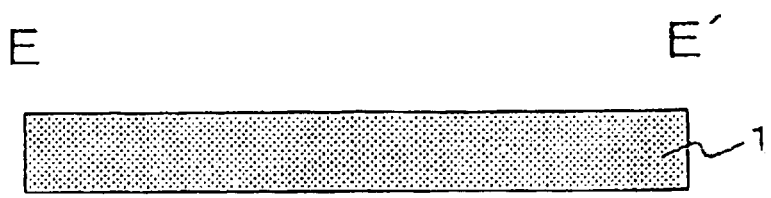
FIGS. 15a–15f are cross-sectional views along line E–E' schematically showing the production process of the active matrix substrate in the liquid crystal display apparatus according to the first embodiment of the present invention.
Figure 15B:
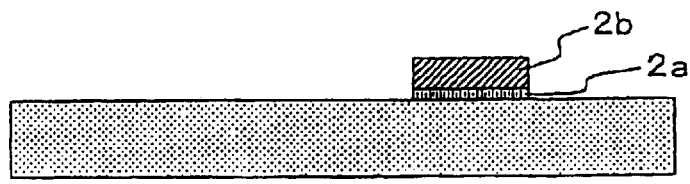
Figure 15C:
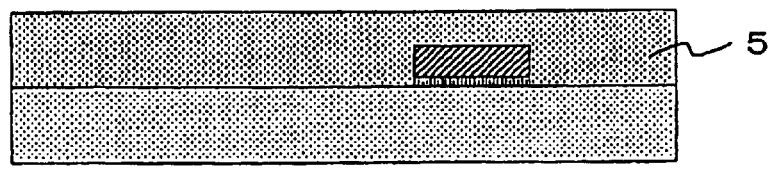
Figure 15D:
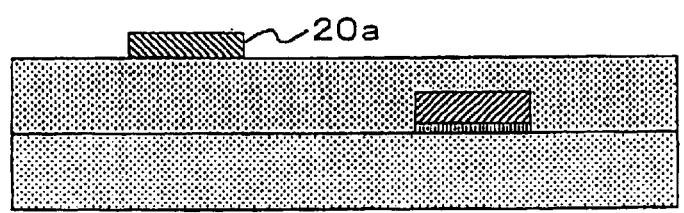
Figure 15E:
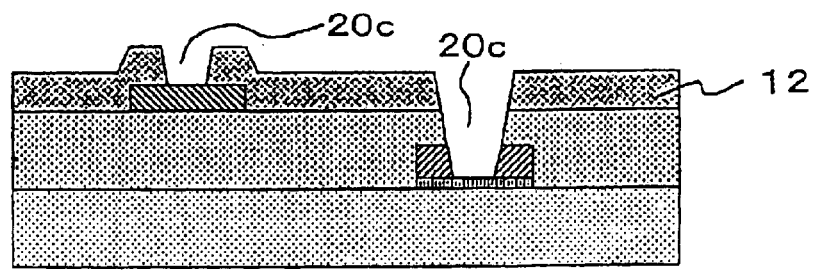
Figure 15F:
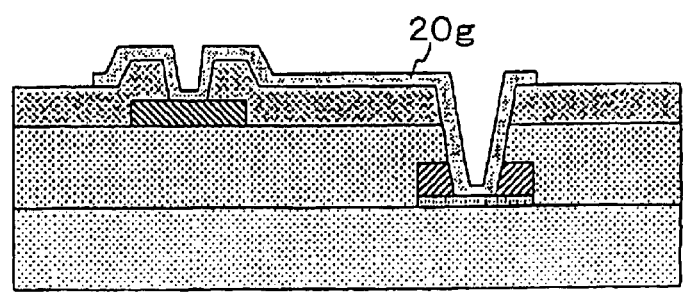
Figure 16:
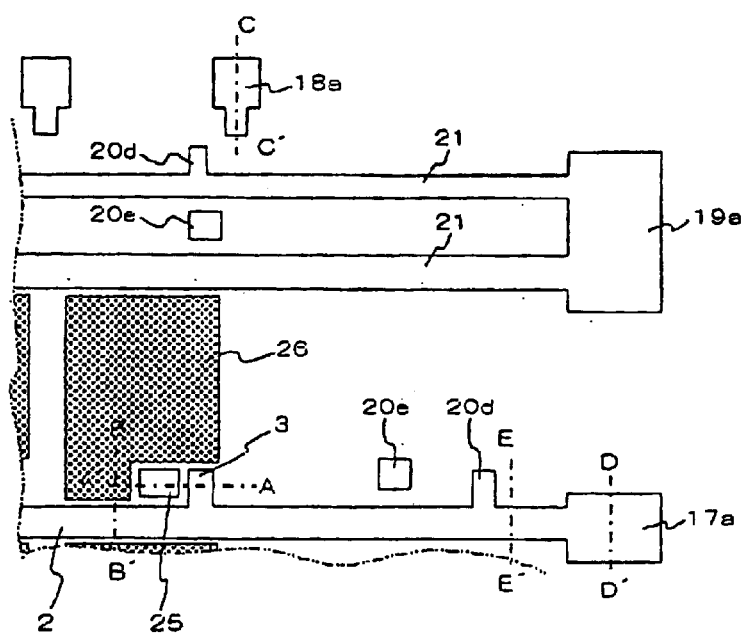
FIG. 16 is a first plan view schematically showing the production process of the active matrix substrate in the liquid crystal display apparatus according to the second embodiment of the present invention.
Figure 17:
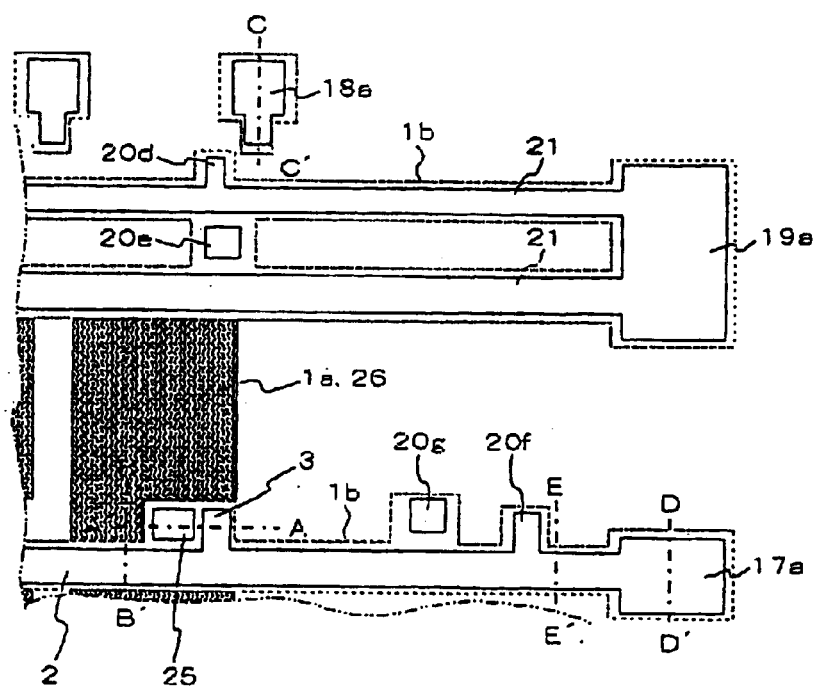
FIG. 17 is a second plan view schematically showing the production process of the active matrix substrate in the liquid crystal display apparatus according to the second embodiment of the present invention.
Figure 18:
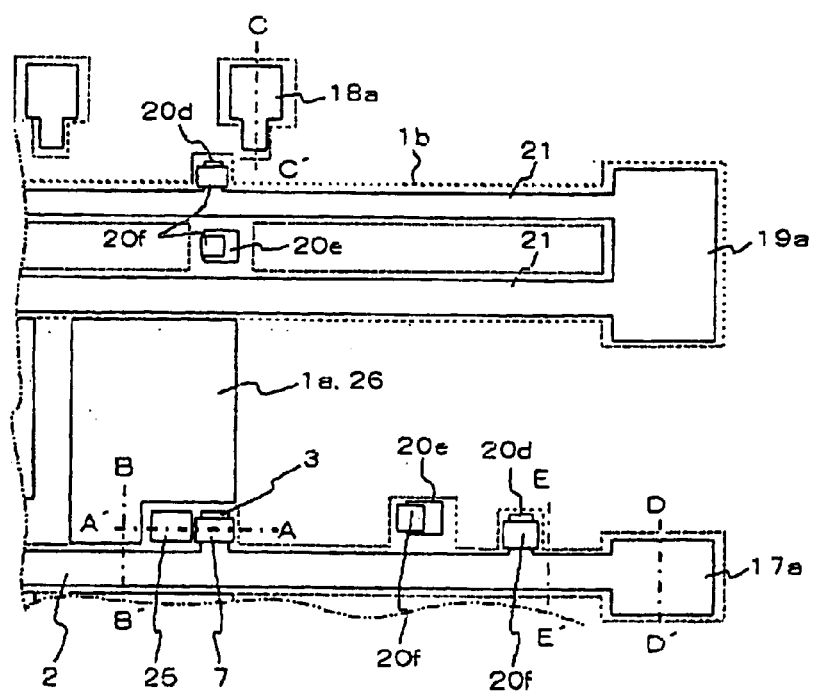
FIG. 18 is a third plan view schematically showing the production process of the active matrix substrate in the liquid crystal display apparatus according to the second embodiment of the present invention.
Figure 19:
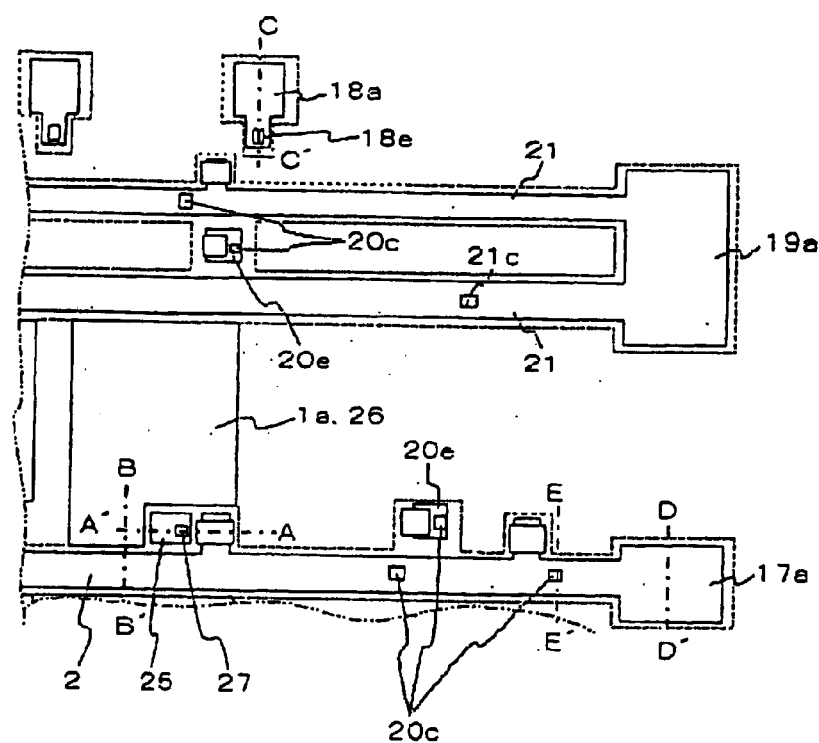
FIG. 19 is a fourth plan view schematically showing the production process of the active matrix substrate in the liquid crystal display apparatus according to the second embodiment of the present invention.
Figure 20:
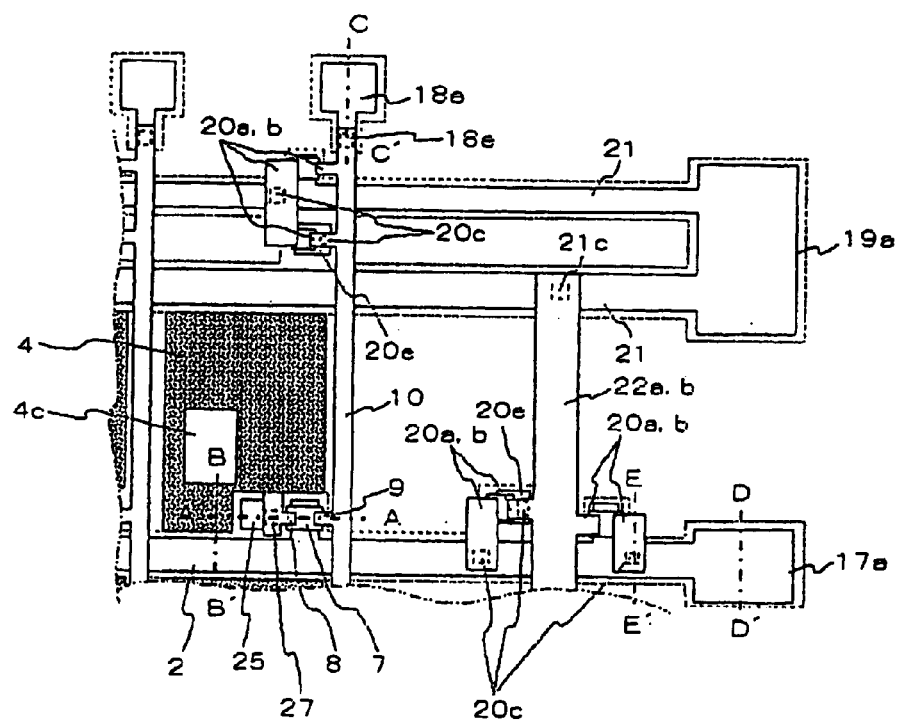
FIG. 20 is a fifth plan view schematically showing the production process of the active matrix substrate in the liquid crystal display apparatus according to the second embodiment of the present invention.
Figure 21:
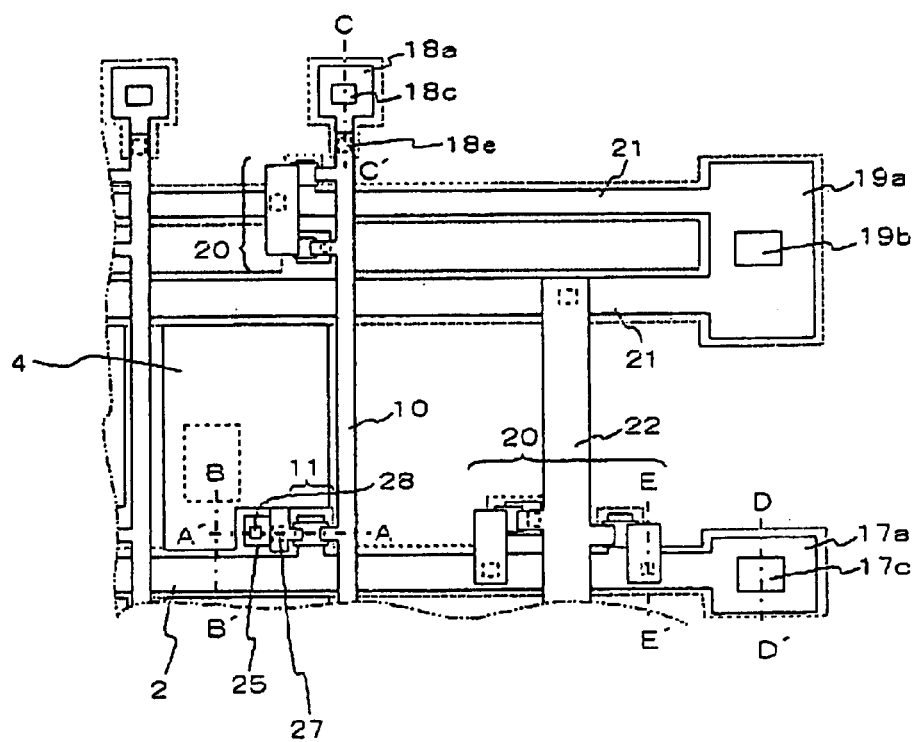
FIG. 21 is a sixth plan view schematically showing the production process of the active matrix substrate in the liquid crystal display apparatus according to the second embodiment of the present invention.

Referring to FIGS. 10 and 11, the active matrix substrate according to the present embodiment is constructed as follows:

In an area of a planar surface of an insulating substrate 1 of, for example, glass, plastics or poly-carbonate, having a rough surface 1a in a preset area, plural gate bus lines 2 made up of, for example, a Cr, Ta, Mo, Ti or Cr/Al are arranged parallel to one another. A gate electrode 3 is branched from each gate bus line 2. In the case of the reflection type apparatus, the insulating substrate 1 need not be transparent. The gate bus line 2 operates as a scanning line. A reflector 4 (4a and 4b) made up of, for example, Cr, Ta, Mo, Ti or Cr/Al is provided in the area of the insulating substrate 1 provided with the rough surface 1a.

The reflector 4 is isolated from the gate bus line 2. The surface of the reflector 4 is rough as is the rough surface 1a of the insulating substrate 1, and extends along the rough surface 1a. The maximum height of the surface roughness is on the order of 2 to 3 μm, with the spacing between adjoining crests being on the order of tens of μm. In the case of the semi-transmission type liquid crystal display apparatus, an aperture 4c is provided in a portion of the rough surface area of the reflector 4 for transmitting the light emitted from a backlight. In the case of the reflection type liquid crystal display apparatus, no aperture is provided in the rough surface in the reflector 4. Although the protrusions and dents of the rough surface shown in the drawings may be seen to be sharp, these protrusions and dents are actually rounded smoothly.

A gate insulating film 5 of, for example, SiNx or SiOx, is formed on the insulating substrate 1 provided with the gate electrode 3 and the reflector 4. The gate insulating film 5 includes a contact hole 6 for exposing a portion of the reflector 4, and has on its surface a rough surface lying on the rough surface of the reflector 4.

On the gate insulating film overlying the gate electrode 3, there is formed an island 7, made up by a semiconductor layer 7a, formed e.g., of amorphous silicon (a-Si) or polycrystalline silicon, and a contact electrode 7b of n+ type a-Si on each end of the semiconductor layer.

On one end of the island 7, there is formed a source electrode 8 (8a) of, for example, Cr, Ta, Mo, Ti or Cr/Al, whereas, on the opposite side thereof, there is formed a drain electrode 9 (9a) of, for example, Cr, Ta, Mo, Ti or Cr/Al. The drain electrode 9 is branched from the drain bus line 10 (10a), which intersects the gate bus line 2 via gate insulating film 5. The drain bus line 10 operates as a signal line and is formed of metal, as is the drain electrode 9.

The gate electrode 3, gate-insulating film 5, island 7, source electrode 8 and the drain electrode 9 compose a thin-film transistor (TFT) 11. This TFT 11 operates as a switching device.

On the entire surface of the substrate including the gate bus line 2, drain bus line 10 and the TFT 11, there is formed a passivation film 12 of, for example, $SiN_x$ or $SiO_x$. The passivation film 12 includes a first contact hole 6 in a region corresponding to the contact hole in the gate insulating film 5, a second contact hole 13, at a preset position on the source electrode 8, for exposing the source electrode 8, and a rough surface, in an area of the rough surface of the gate insulating film 5, for extending along this rough surface of the gate insulating film.

In an area on the passivation film 12 having the rough surface, there is provided a transparent electrode 14 formed of, for example, ITO (indium tin oxide) or IZO (indium zinc oxide). The transparent electrode 14 serves to connect electrically the reflector 4 to the source electrode 8 through the first contact hole 6 and the second contact hole 13. The transparent electrode 1 operates, together with the reflector 4, as pixel electrodes.

At a corner of the insulating substrate 1, there are formed a common terminal unit 19, a common device unit 20 and a common bus line 21 for applying the common potential to the gate bus line 2, drain bus line 10 of the active matrix substrate 15 and to the opposite side transparent common electrode 42 of the opposite side substrate 40 of FIGS. 2 and 3. Although not shown, a storage capacitor may be formed between each TFT 11 and the neighboring gate bus line 2.

The process for producing the active matrix substrate according to the first embodiment is now explained.

First referring to FIGS. 5, 11a, 12a, 13a, 14a and 15a, a first mask, not shown, is formed on a planar insulating substrate 1 of, for example, glass, by a photolithography technique. A rough surface 1a then is formed on the insulating substrate 1 having a flat surface, such as a glass substrate, by a photolithography technique. Then, by e.g., wet etching, employing HF (hydrofluoric acid), sandblasting, or dry etching, employing $CF_4$ or $O_2$, a rough surface 1a is formed in a preset area of the insulating substrate 1. The resulting product is washed and the first mask is removed.

The wet etching of the glass substrate is meritorious in that the back surface of the substrate is simultaneously etched to thereby reduce the substrate thickness.

Then, referring to FIGS. 6, 11b, 12b, 13b, 14b and 15b, underlying metal layers 2a, 3a, 4a and 17a of, for example, Cr, Ti or Mo (referred to below as 'Cr'), and overlying metal layers 2b, 3b, 4b and 17b of, for example, Al (referred to below as 'Al/Nd' are deposited in this order on the entire surface of the insulating substrate 1 to form a gate electrode layer, not shown.

It is noted that the gate electrode layer is deposited, using, for example, a sputtering method, so that the total film thickness of the underlying metal Cr and the overlying metal Al/Nd will be on he order of 100 to 200 nm.

Then, referring to FIGS. 6, 11b, 12b, 13b, 14b and 15b, a second mask, not shown, is formed by the photolithography technique on the gate electrode layer. An unneeded electrode layer then is removed by dry etching or wet etching. The second mask then is removed. This forms the gate electrode 3, the gate bus line 2, underlying metal layers 17a and 17b of the gate terminal unit, reflector 4, an underlying metal layer 19a, a common bus line 21 for the drain and gate electrodes 20d, and 20e for the common device unit.

The underlying metal layers 17a and 17b are connected to the gate bus line 2. In the case of the reflection type apparatus, no aperture is provided in the reflector 4, whereas, in the semi-transmission type apparatus, an aperture 4c is provided in the reflector 4. The underlying metal layer 19a for the common terminal unit is connected to the common bus line 21 for the drain. The gate electrode 20d for the common device unit is connected to the common bus line 21 or to the gate bus line 2. The gate electrode 20e for the common device unit is separated from the common bus line 21 for the drain and from the gate bus line 2.

Then, referring to FIGS. 7, 11c, 12c, 13c, 14c and 15c, the gate insulating film 5, a-Si layer 7a which is to become a semiconductor layer, and a $n^+$ type a-Si layer 7b, which is to become a contact electrode, are sequentially formed on the entire surface of the substrate provided with the gate electrode 3, gate bus line 2, underlying metal layers 17a and 17b for the gate terminal unit, reflector 4, underlying metal layer 19a for the common terminal unit, common bus line 21 for the drain and the gate electrodes 20d, and 20e for the common device unit. The semiconductor layer and the contact electrode form islands 7 and 20f.

The gate insulating film 5 is formed by for example a plasma CVD method to a film thickness of the order of 300 to 500 nm. For forming the islands 7, and 20f, a-Si, for example, is formed to a film having a film thickness on the order of 150 to 400 nm, by a plasma CVD method, while $n^+$ a-Si is formed to a film having a film thickness on the order of 20 to 60 nm, by a plasma CVD method.

In forming the $n^+$ type a-Si layer 7b, a substrate on which film deposition has been completed up to the a-Si layer 7a is held in a $PH_3$ plasma atmosphere and phosphorus(P) is diffused into the a-Si layer 7a to form a $n^+$ layer, as a surface layer, in order to form an ohmic contact to the a-Si layer 7a.

The processing conditions for achieving this include using a plasma CVD system, supplying the $PH_3/H_2$ (0.5% $PH_3$) gas at 1000 sccm at a temperature of 300° C. and processing for five minutes under a pressure of 200 Pa and an RF power of 0.1 $W/cm^2$.

Then, referring to FIGS. 7, 11c, 12c, 13c, 14c and 15c, a third mask, not shown, is formed by the photolithography technique on the $n^+$ type a-Si layer 7b. Then, by e.g., dry etching, the unneeded a-Si layer 7a and unneeded $n^+$ type a-Si layer 7b are removed and the third mask then is removed. This forms the dry islands 7, 20f. The island 7 is formed above the gate electrode 3 adapted for driving a liquid crystal. The island 20f is formed above the gate electrodes 20d for the common device, the gate electrodes 20e for the common device unit, gate electrodes 20d for the common device unit and the gate electrodes 20e for the common device unit.

Then, referring to FIGS. 8, 11d, 12d, 13d, 14d and 15d, metal layers 8a, 9a, 10a, 18a, 20a and 22a are deposited on the entire surface of the substrate, provided with the gate electrode 3, gate bus line 2, underlying metal layers 17a and 17b for the gate terminal unit, reflector 4, underlying metal layer 19a for the common terminal unit, common bus line 21 for the drain, gate electrodes 20d, and 20e for the common device unit, and the islands 7, and 20f, to a film thickness of 100 to 200 nm, by e.g., a sputtering method.

Then, referring to FIGS. 8, 11d, 12d, 13d, 14d and 15d, a fourth mask, not shown, is formed, by a photolithography technique, on the metal layers 8a, 9a, 1a, 18a, 20a and 22a. Then, unneeded metal is removed by dry etching. This forms a source electrode 8, a drain electrode 9, a drain bus line 10, an underlying metal 18a for the drain terminal unit, a common bus line 22 for the gate, and plural source/drain electrodes 20a for the common device unit. Part of plural source/drain electrodes 20a for the common device unit is connected to the drain bus line 10 and to the common bus line 22a for the gate.

The $n^+$ type a-Si layer 7b then is etched, using the source electrode 8a, drain electrode 9a and the fourth mask, as etching masks. The fourth etching mask then is removed. This forms an ohmic contact layer.

Then, referring to FIGS. 9, 11e, 12e, 13e, 14e and 15e, a passivation film 12 of, for example, $SiN_x$, is formed to a film thickness of 100 to 500 nm, by the plasma CVD method, on the entire surface of the substrate provided with the gate electrode 3, gate bus line 2, underlying metal layers 17a and 17b for the gate terminal unit, reflector 4, underlying metal layer 19a for the common terminal unit, common bus line 21 for the drain, gate electrodes 20d and 20e for the common device unit, islands 7, and 20f, source electrode 8, drain electrode 9, drain bus line 10, underlying metal 18a for the drain terminal unit, common bus line 22a for the gate, and plural source/drain electrodes 20a for the common device unit.

As the material for the passivation film 12, such a material is to be selected and used which will give a sufficiently large etching selection ratio for the a-Si a7 and the gate insulating film 5, in order to form the contact holes 6, 13 and the like in the subsequent process steps.

Then, referring to FIGS. 9, 11e, 12e, 13e, 14e and 15e, a fifth mask, not shown, is formed, by a photolithography technique, on the passivation film 12. Then, excess portions of the passivation film 12, gate insulating film 5 or the Al/Nd layers 2b, 4b, 17b, 19a and 21b, lying in areas which later become contact holes, are removed by, for example, dry etching, until part of the Cr layers 2a, 4a, 8a, 10a, 17a, 18a, 19a, 20a, 20d, 20e, 21a and 22a is exposed. The fifth mask then is removed. With this process, contact holes 6, 13, 17c, 18c, 19b, 20c, 21c and 22c are formed.

It is noted that the contact hole 6 exposes part of the Cr layer 4a of the reflector. The contact hole 13 exposes part of the source electrode (Cr layer) 8a. The contact hole 17c exposes part of the Cr layer 17a of the gate terminal unit. The contact hole 18c exposes part of the Cr layer 18a of the drain terminal unit. The contact hole 19b exposes part of the Cr layer 19a of the common terminal unit. The contact hole 20c-expose part of the Cr layers 2a, 20a, 20d, 20e, 21a, and 22a of the common device unit. The contact hole 21c exposes part of the Cr layer 21a for the common bus line for the drain. The contact hole 22c exposes part of the Cr layer 22a of the common bus line for the gate.

The reason why the Al/Nd layers 2b, 4b, 17b, 19a and 21b for the contact holes 6, 17c, 19b and part of 20c, 20e and 21r are removed is that, without this removal, the electrical conductivity of Al/Nd with the ITO which later becomes the pixels in the subsequent process is not good.

Then, referring to FIGS. 10, 11f, 12f, 13f, 14f and 15f, transparent electrode layers 14, 17d, 18d, 19c, 20g and 23 of, for example, ITO, are deposited, by sputtering, on the entire surface substrate provided with the passivation film 12, to a film thickness of the order of 30 to 100 nm.

Finally, referring to FIGS. 10, 11f, 12f, 13f, 14f and 15f, a sixth mask, not shown, is formed by a photolithography technique on the transparent electrode layers 14, 17d, 18d, 19c, 20g and 23. Then, unneeded portions of the transparent electrode layers are removed by wet etching (oxalic acid, aqua regia, ferric chloride plus hydrochloric acid). The sixth mask then is removed. This forms a transparent electrode 14 which later becomes a pixel electrode, a terminal 17d of the gate terminal unit, a terminal 18d of the drain terminal unit, a terminal 19c of the common terminal unit, a wiring 20g of the common terminal unit and a wiring 23 across the common bus lines 21 and 22.

Figure 7:
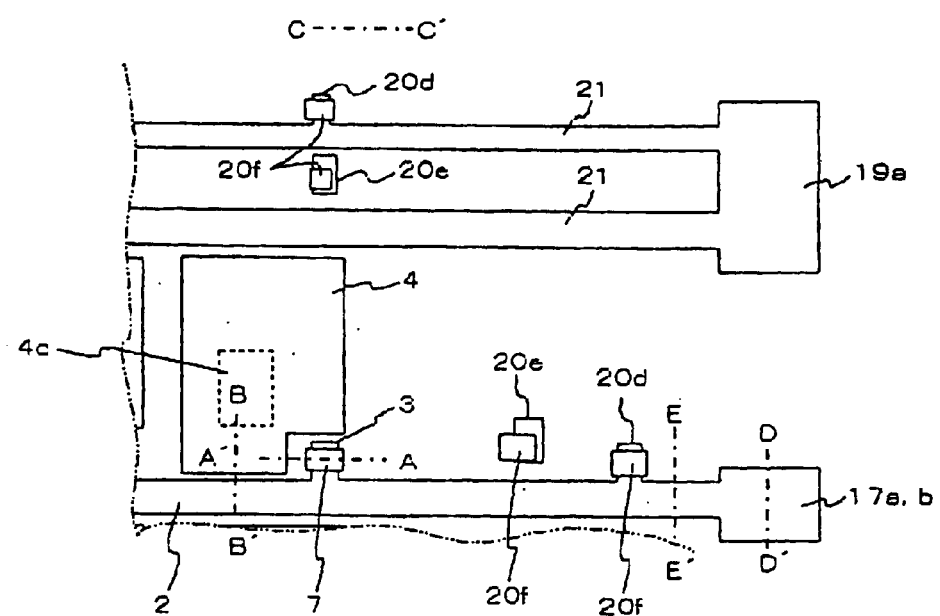
FIG. 7 is a third plan view schematically showing the production process of the active matrix substrate in the liquid crystal display apparatus according to the first embodiment of the present invention.
Figure 8:
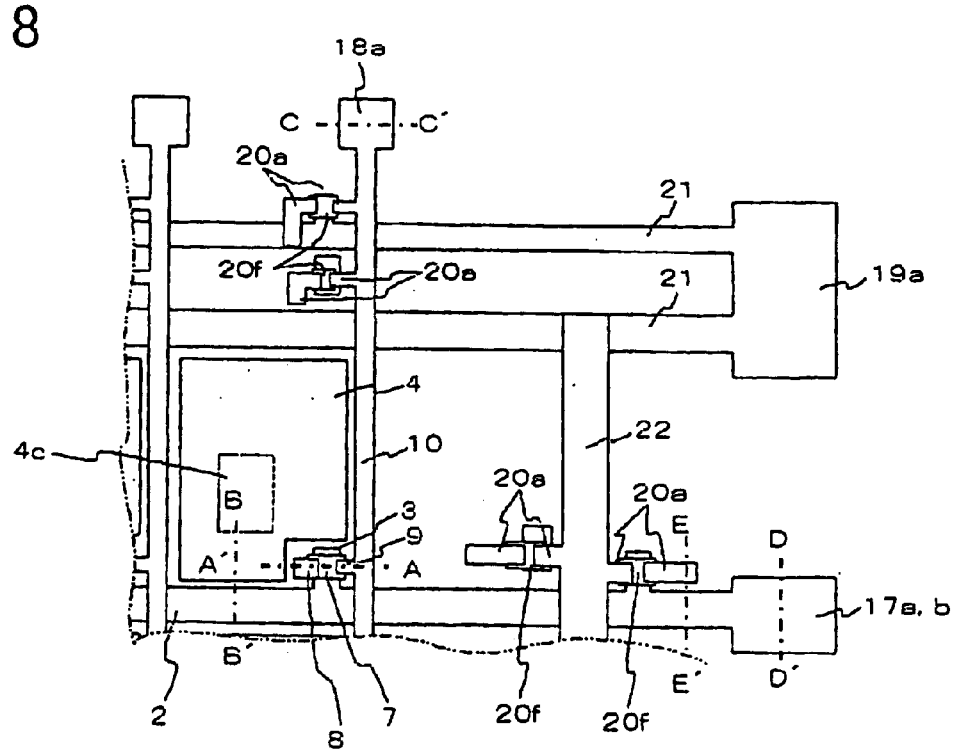
FIG. 8 is a fourth plan view schematically showing the production process of the active matrix substrate in the liquid crystal display apparatus according to the first embodiment of the present invention.
Figure 9:
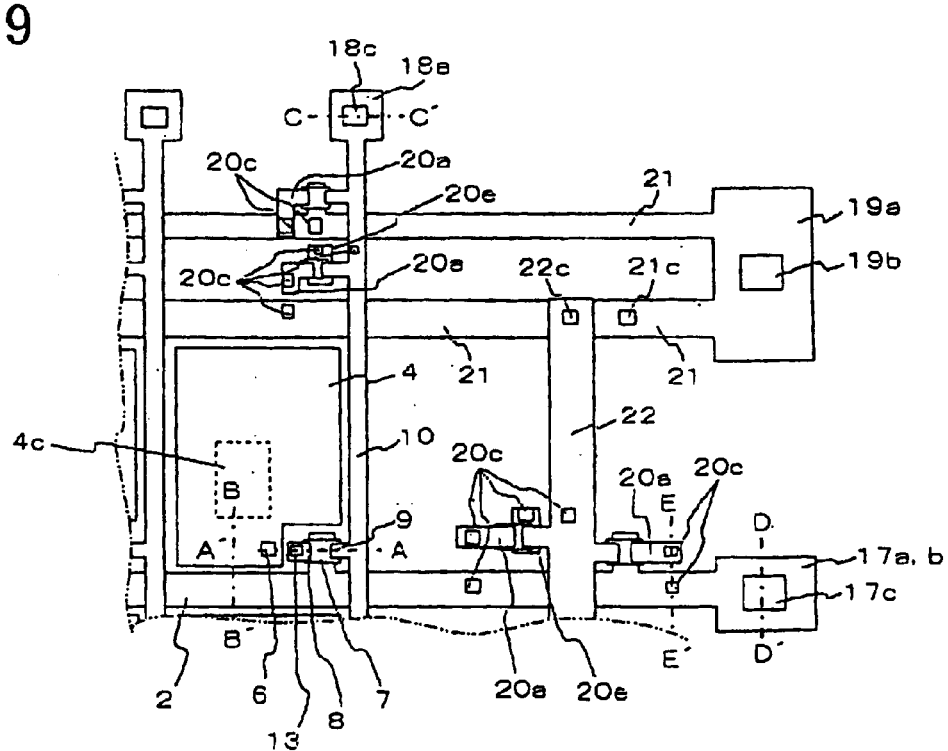
FIG. 9 is a fifth plan view schematically showing the production process of the active matrix substrate in the liquid crystal display apparatus according to the first embodiment of the present invention.

It is noted that the transparent electrode 14 electrically connects the source electrode 8 and the reflector 4 through the contact holes 6 and 13 (see FIGS. 7 and 9). The terminal 17d of the gate terminal unit, the terminal 18d of the drain terminal unit and the terminal 19c of the common terminal unit connect to the Cr layers 17a, 18a and 19a of the respective parts through contact holes 17c, 18c and 19b of the respective parts. Through contact holes of an optional combination, the wiring 20f of the common device unit electrically connects the gate bus line 2 to the source/drain electrode 20a of the common device unit, while connecting the common bus line 22 to the gate electrode 20e of the common device unit, connecting the common bus line 21 to the source/drain electrode 20a of the common device unit and connecting the drain bus line 10 to the gate electrode 20e of the common device unit. The wiring 23 across the common bus lines 21, and 22 electrically connects the common bus lines 21, 22 across the contact holes 21c, and 22c.

If the transparent electrode 14, as the pixel electrode, is formed on the uppermost layer of the substrate, there is derived a merit that the electrical field can be applied directly to the liquid crystal without separation by e.g., an insulating film. In light of above, the transparent electrode 14 is desirably provided as an uppermost layer of the substrate, even in the case of the reflection type apparatus.

The above process may produce the active matrix substrate, constructed as shown in FIG. 11. Thus, with the method for manufacturing the active matrix substrate according to the first embodiment, described above, a reflection type or semi-transparent type active matrix substrate of optimum display performance, presenting irregularities on its reflector, can be formed using only six masks, so that the manufacturing process can be simplified at least by one PR as compared to the customary manufacturing process.

The second embodiment of the present invention is now explained with reference to the drawings. FIGS. 16 to 22 are schematic plan views showing he manufacturing process of the active matrix substrate for the liquid crystal display apparatus according to the second embodiment of the present invention. FIGS. 23 to 32 are schematic cross-sectional views showing the manufacturing process of the active matrix substrate for the liquid crystal display apparatus according to the second embodiment of the present invention. In FIGS. 23 and 24, FIGS. 25 and 26, FIGS. 27 and 28, FIGS. 29 and 30 and in FIGS. 31 and 32, the section lines are A–A', B–B', C–C', D–D' ad E–E', respectively.

Figure 22:
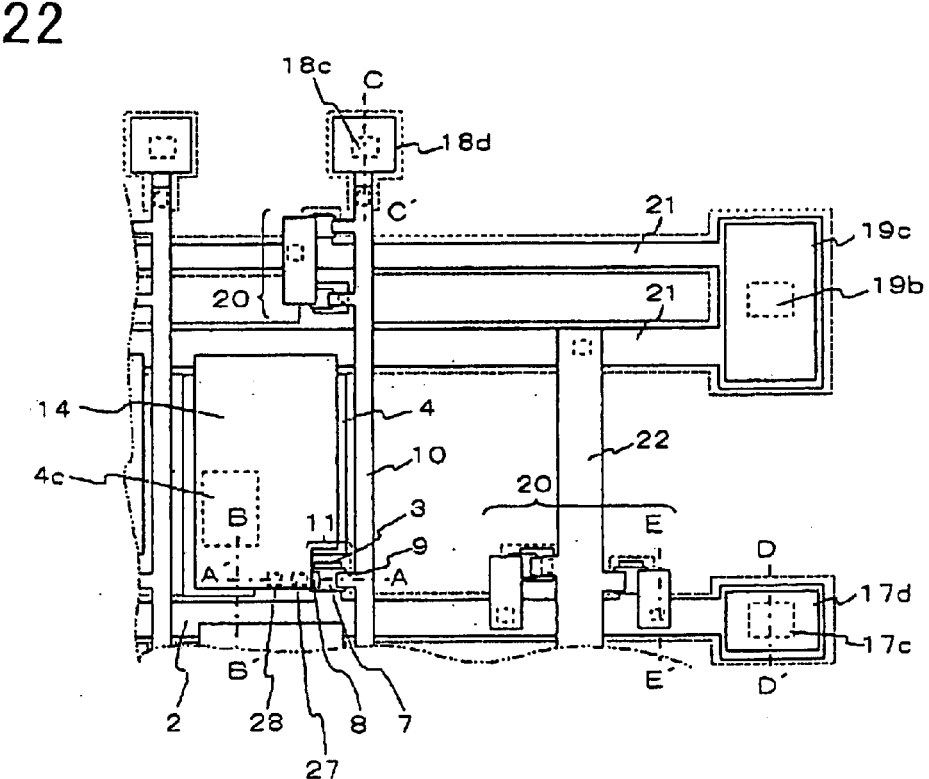
FIG. 22 is a seventh plan view schematically showing the production process of the active matrix substrate in the liquid crystal display apparatus according to the second embodiment of the present invention.

Referring to FIGS. 22 to 24, the active matrix substrate according to the second embodiment is constructed in the following manner. The structure of the liquid crystal display apparatus except the active matrix substrate is the same as that of the first embodiment.

In an area of the planar surface of the insulating substrate 1, presenting the rough surface 1a in a preset area thereof, plural gate lines 2 are arranged parallel to one another. From each gate bus line 2 is branched a gate electrode 3. On the planar top surface in the rough surface 1a on the insulating substrate 1, there is provided a projection member 26 formed of the same metal as the gate electrode 3, for example, Cr, Ta, Mo, Ti or Cr/Al. The projection member 26 serves as a basis in forming the rough surface of the reflector 4 along with the rough surface 1a of the insulating substrate 1. Between the projection member 26 on the insulating substrate 1 and the gate electrode 3, there is formed a shorting prohibiting wiring 25, adapted for preventing shorting across the reflector 4 and the gate electrode 3 and for separating the projection member 26 from the gate electrode 3.

On the insulating substrate 1, including the gate electrode 3, a shorting prohibiting wiring 25 and the projection member 26, a gate insulating film 5 of $SiN_x$ or $SiO_x$ is formed. The gate insulating film 5 includes contact holes 27, 28, at preset positions on the shorting prohibiting wiring 25 for exposing this shorting prohibiting wiring 25. The gate insulating film 5 also includes, in its area on a roughened surface formed by the rough surface 1a and the projection member 26 of the insulating substrate 1, a rough surface on this surface. The contact hole 27 is a hole for electrically connecting the source electrode 8 and the shorting prohibiting wiring 25. The contact hole 28 is a hole for electrically interconnecting the transparent electrode 14 and the shorting prohibiting wiring 25.

On the gate insulating film 5, overlying the gate electrode 3, there is formed an island 7 comprised of a semiconductor layer 7a and a contact electrode 7, stacked in this order.

Towards one end and the other end on the island 7, there are formed a source electrode 8 (8a and 8b) and a drain electrode 9 (9a, and 9b), respectively. The source electrode 8 is electrically connected through the contact hole 27 to the shorting prohibiting wiring 25. The drain electrode 9 is branched from a drain bus line 10 (10a and 10b) intersecting the gate bus line 2 through the gate insulating film 5.

In an area of the gate insulating film 5 overlying the rough surface 1a of the insulating substrate, there is formed the reflector 4 which is formed of the same metal as the source electrode 8 or the drain electrode 9 and which serves for separating these electrodes from each other. The surface of the reflector 4 also has a rough surface substantially similar to the roughened surface formed by the rough surface 1a and the projection member 26. For example, the maximum height of the surface roughness is of the order of 2 to 3 μm, with the distance between neighboring crests of the projection member being of the order of tens of μm. In the case of a semi-transmission type liquid crystal display apparatus, an aperture 4c for transmitting a backlight are provided in an area of the rough surface of the reflector 4. In the case of a reflection type liquid crystal display apparatus, no aperture is provided in an area of the rough surface of the reflector 4. Meanwhile, the crests and recesses in the non-uniform, uneven or rough surfaces in the drawing, shown pointed, actually are rounded smoothly.

The gate electrode 3, gate-insulating film 5, island 7, source electrode 8 and the drain electrode 9 make up a thin film transistor 11 (TFT). This TFT 11 operates as a switching device.

A passivation film 12 is formed on the entire surface of the substrate including the TFT 11 and the reflector 4. The passivation film 12 includes a contact hole 28 corresponding to the contact hole in the gate insulating film 5 and has a rough surface corresponding to the rough surface of the reflector 4.

The transparent electrode 14 is formed in the area of the passivation film 12 presenting the rough surface. The transparent electrode 14, electrically connected through the contact hole 28 to the shorting prohibiting wiring 25, operates as a pixel electrode in conjunction with the reflector 4.

The production process for the active matrix substrate 15 in the liquid crystal display apparatus according to the second embodiment is now explained.

Referring first to FIGS. 16, 23a, 25a, 27a, 29a and 31a, a gate electrode layer (Cr layer, not shown), which later becomes underlying metal layers 2a, 3a, 17a, 18a, 19a, 20d, 20e, 21a, 25 and 26, is formed on the entire surface of the insulating substrate 1 having a planar surface.

Referring to FIGS. 16, 23a, 25a, 27a, 29a and 31a, a first mask 24 is formed on the gate electrode layer by a photolithography technique. Then, unneeded portions of the gate electrode layer are removed by for example dry etching or wet etching. This forms the gate bus line 2, gate electrode 3, underlying metal layer 17a of the gate terminal unit, underlying metal layer 18a of the drain terminal unit, underlying metal layer 19a of the common terminal unit, gate electrodes 20d, 20e for the common device unit, common bus line 21 for the drain, shorting prohibiting wiring 25 and the projection member 26. At this stage, the first mask 24 has not been removed.

Referring to FIGS. 16, 23b, 25b, 27b, 29b and 31b, exposed sidewall sections of the gate bus line 2, gate electrode 3, underlying metal layer 17a of the gate terminal unit, underlying metal layer 18a of the drain terminal unit, underlying metal layer 19a of the common terminal unit, gate electrodes 20d, 20e for the common device unit, common bus line 21 for the drain, shorting prohibiting wiring 25 and the projection member 26 and near-by surface portions of the insulating substrate 1 are covered by the first mask 24, by reflow processing, which is carried out to such an extent that only the first mask 24 is melted.

Since the distance between the gate electrode 3 and the shorting prohibiting wiring 25 is several μm and that between the neighboring projection members 26 is tens of μm, it is possible to make the first mask 24 continuous between the gate electrode 3 and the shorting prohibiting wiring 25 while making the first mask 24 non-continuous between the neighboring projection members 26.

Referring to FIGS. 17, 23c, 25c, 27c, 29c and 31c, a rough surface 1a is formed at a preset area of the insulating substrate 1 by for example wet etching employing HF (hydrofluoric acid), sandblasting or dry etching employing $CF_4$ or $O_2$. The resulting product then is rinsed and the first mask removed. A broken line in FIG. 17 indicates a step 1b of the insulating substrate. In this area, defined by the broken line in FIG. 17, the surface of the insulating substrate 1 is the original flat area, with an area lying outside the surrounded area being lower in level.

Such etching of the insulating substrate 1 in the step following the formation of for example the gate electrode 3 is meritorious in that, since HF is not interposed between e.g., the gate electrode and glass if the insulating substrate is formed of glass, it is possible to prevent peeling of e.g., the gate electrode.

Referring to FIGS. 18, 23d, 25d, 27d, 29d and 31d, a gate insulating film 5 of e.g., $SiN_x$, an a-Si layer 7a, which is to become a semiconductor layer, and an $n^+$ type a-Si layer 7b, which is to become a contact electrode, are sequentially formed on the entire surface of the insulating substrate 1 including the gate bus line 2, gate electrode 3, underlying metal layer 17a of the gate terminal unit, underlying metal layer 18a of the drain terminal unit, underlying metal layer 19a of the common terminal unit, gate electrodes 20d, 20e for the common device unit, common bus line 21 for the drain, shorting prohibiting wiring 25 and the projection member 26.

Referring to FIGS. 18, 23d, 25d, 27d, 29d and 31d, a second mask, not shown, is formed on the $n^+$ type a-Si layer 7b by the photolithography technique. Then, unneeded portions of the a-Si layer 7a and the $n^+$ type a-Si layer 7b are removed, by e.g., dry etching. The second mask then is removed to form islands 7 and 20f.

Referring to FIGS. 19, 24e, 26e, 28e, 30e and 32e, a third mask, not shown, is formed on the gate insulating film 5, including the islands 7, and 20f, by the photolithography technique. Then, unneeded portions of the gate insulating film 5 of an area which later become a contact hole are removed, by e.g., dry etching, until the Cr layers 2, 18a, 20e, 21 and 25 are partially exposed. The third mask then is removed. This forms contact holes 18e, 20c, 21c and 27.

It is noted that the contact hole 18e serves for partially exposing the Cr layer 18a of the drain device unit. The contact hole 20c serves for partially exposing the Cr layers 2, 20a, 20e and 21 of the common device unit. The contact hole 21c serves for partially exposing the common bus line 21, while the contact hole 27 serves for partially exposing the shorting prohibiting wiring 25.

Referring to FIGS. 20, 24f, 26f, 28f, 30f and 32f, underlying metal layers 4a, 8a, 9a, 10a and 22a (referred to below as 'Cr'), and overlying metal layers 4b, 8b, 9b, 10b and 22b (referred to below as 'Al/Nd'), are deposited in this order, to form a source/drain electrode layer.

Referring to FIGS. 20, 24f, 26f, 28f, 30f and 32f, a fourth mask, not shown, is formed on the source/drain electrode layer, by a photolithography technique. Then, unneeded portions of the source/drain electrode layers are removed, such as by dry etching or wet etching. This forms the reflector 4, source electrode 8, drain electrode 9, and drain bus line 10, source/drain electrodes 20a, 20b for the common device unit and the common bus line 22 for the gate.

It is noted that, for the reflection type apparatus or the semi-transmitting type apparatus, the reflector 4 is or is not provided with an aperture, respectively. On the other hand, the reflector 4 is connected to the source electrode 8, while the source electrode 8 is connected through the contact hole 27 to the shorting prohibiting wiring 25. The source/drain electrodes 20a, and 20b for the common device unit are connected through the contact hole 20c to the gate bus line 2, common bus line 21 for the drain or to the gate electrode 20e of the common device unit. The common bus line 22 for the gate is connected through the contact hole 21c to the common bus line 21 for the drain.

Then, using the metal layer, for example, the source electrode 8 or the drain electrode 9, and the fourth mask, as etching masks, the n$^+$ type a-Si layer 7b is etched. The fourth mask then is removed. This forms an ohmic contact layer.

Referring to FIGS. 21, 24g, 26g, 28g, 30g and 32g, a passivation film 12 is formed, such as by plasma CVD method, on the entire surface of the gate insulating film 5, including the source electrode 8, drain electrode 9, drain bus line 10, source/drain electrodes 20a, and 20b for the common device unit and the common bus line 22 for the gate and on the reflector 4.

Referring to FIGS. 21, 24g, 26g, 28g, 30g and 32g, a fifth mask, not shown, is formed on the passivation film 12 by a photolithography technique. Then, unneeded portions of the passivation film 12 or the gate insulating film 5 in an area which later becomes the contact hole are removed, such as by dry etching, until the Cr layers 17a, 18a, 19a and 25 are partially exposed. The fifth mask then is removed. This forms the contact holes 17c, 18c, 19b and 28.

It is noted that the contact hole 17c serves for partially exposing the Cr layer 17a of the gate terminal unit. The contact hole 18c serves for partially exposing the Cr layer 18 of the drain terminal unit in an area other than the contact hole 18e. The contact hole 19b serves for partially exposing the Cr layer 19a of the common terminal unit, while the contact hole 28 serves for partially exposing the shorting prohibiting wiring 25 in an area other than the contact hole 27.

Referring to FIGS. 22, 24h, 26h, 28h, 30h and 32h, transparent electrode layers 14, 17d, 18d and 19c of, for example, ITO, are deposited, such as by sputtering, on the entire surface of the substrate, including the passivation film 12.

Referring to FIGS. 22, 24h, 26h, 28h, 30h and 32h, a sixth mask, not shown, is finally formed, such as by a photolithography technique, on the transparent electrode layers 14, 17d, 18d and 19c. An excess portion of the transparent electrode layers is then removed such as by wet etching. This forms the transparent electrode 14, which later becomes the pixel electrode, the terminal 17d of the gate terminal unit, terminal 18d of the drain terminal unit and the terminal 19c of the common terminal portion.

It is noted that the transparent electrode 14 is electrically connected to the shorting prohibiting wiring 25 through contact hole 28. The terminal 17d of the gate terminal unit, the terminal 18d of the drain terminal unit and the terminal 19c of the common terminal unit are connected to the Cr layers 17a, 18a and 19a of the respective portions through the contact holes 17c, 18c and 19c of the respective portions.

The above process renders it possible to manufacture an active matrix substrate having a structure shown in FIG. 22. With the manufacturing method for the active matrix substrate according to the second embodiment, a reflection or semi-transmission type active matrix substrate, with an optimum display function, having a reflector presenting a rough surface, may be produced, using only six masks, thus achieving a process simplified by at least one PR step as compared to the conventional manufacturing method.

A third embodiment is now explained by referring to the drawings. FIGS. 33 to 38 are plan views schematically illustrating the manufacturing method for the active matrix substrate in a liquid crystal display apparatus according to the third embodiment of the present invention. FIG. 39a to FIG. 45g are cross-sectional views schematically illustrating the manufacturing process for the active matrix substrate in a liquid crystal display apparatus according to the third embodiment of the present invention. In FIGS. 39 and 40, FIGS. 41 and 42, FIG. 43, FIG. 44 and in FIG. 45, the section lines are A–A', B–B', C–C', D–D' and E–E', respectively.

Referring to FIGS. 39 to 40, the active matrix substrate of the third embodiment is constructed as follows. It is noted that the structure of the liquid crystal display apparatus except the active matrix substrate is the same as that of the first embodiment.

In an area of the planar surface of the insulating substrate 1, presenting the rough surface 1a in a preset area thereof, plural gate lines 2 are arranged parallel to one another. From each gate bus line 2 is branched a gate electrode 3. On the planar top surface in the rough surface 1a on the insulating substrate 1, there are provided plural projection members 26 formed of the same metal as that of the gate electrode 3, for example, Cr, Ta, Mo, Ti or Cr/Al. The projection member 26 serve as a basis in forming the rough surface of the reflector 4 along with the rough surface 1a of the insulating substrate 1.

On the insulating substrate 1, including the gate electrode 3 and the projection member 26, a gate insulating film 5 of SiNx or SiOx is formed. The gate insulating film 5 also includes, in an area of the surface lying on the rough surface formed by the rough surface 1a and the projection member 26 of the insulating substrate 1, a rough surface.

On the insulating substrate 1 overlying the gate electrode 3, there is formed an island 7 comprised of a semiconductor layer 7a and a contact electrode 7b, stacked in this order.

Towards one end and the other end on the island 7, there are formed a source electrode 8 (8a and 8b) and a drain electrode 9 (9a, and 9b), respectively. The reflector 4 (4a and 4b) is formed, without separation, in the same layer as the source electrode 8, in an area on the gate insulating film 5 overlying the roughened surface formed by the rough surface 1a of the insulating substrate 1 and the projection member 26. The surface of the reflector 4 presents a rough surface substantially similar to the roughened surface formed by the rough surface 1a of the insulating substrate 1 and the projection member 26, with the maximum height of the surface roughness being on the order of two to three μm, with the separation between the crests of the neighboring projection member 26 being tens of μm. In the case of the semi-transmission type liquid crystal display apparatus, there are formed aperture 4c in a portion of the area of the rough surface in the reflector 4 for transmitting the light rays of the backlight. In the case of the reflection type liquid crystal display apparatus, no aperture is provided in the area of the rough surface of the reflector 4. Although the crests and dents of the rough surface as shown in the drawings are seen to be pointed, these are actually rounded smoothly. The drain electrode 9 is branched from the drain bus lines 10 (10a and 10b) intersecting the gate bus line 2 via gate insulating film 5.

The gate electrode 3, gate-insulating film 5, island 7, source electrode 8 and the drain electrode 9 constitute a thin-film transistor (TFT) 11. This TFT 11 operates as a switching device.

On the entire surface of the substrate including the TFT 11 and the reflector 4, there is formed a passivation film 12 including a contact hole 6 in a preset area of the rough surface of the reflector 4, for exposing the Cr layer 4a of the reflector 4, and in an area of the surface of the reflector 4, there is provided a rough surface lying on this rough surface.

In an area on the passivation film 12 having the rough surface, there is provided a transparent electrode 14 which connects to the reflector 4 through the first contact hole 6. The transparent electrode 14 operates, together with the reflector 4, as pixel electrodes.

The production process for the active matrix substrate in the liquid crystal display apparatus according to the third embodiment is now explained.

Referring first to FIGS. 33, 39a, 41a, 43a, 44a and 45a, a gate electrode layer (Cr layer, not shown), which later becomes underlying metal layers 2a, 3a, 17a, 18a, 19a, 20d, 20e and 21a, is formed on the entire surface of the insulating substrate 1 having a planar surface.

Referring to FIGS. 33, 39a, 41a, 43a, 44a and 45a, a first mask 24 is formed on the gate electrode layer by a photolithography technique. Then, unneeded portions of the gate electrode layer are removed by for example dry etching or wet etching. This forms the gate bus line 2, gate electrode 3, underlying metal layer 17a of the gate terminal unit, underlying metal layer 19a for the common terminal unit, gate electrodes 20d, 20e for the common device unit and the common bus line 21 for the drain. At this stage, the first mask 24 has not been removed.

Referring to FIGS. 33, 39b, 41b, 43b, 44b and 45b, exposed sidewall sections of the gate bus line 2, gate electrode 3, underlying metal layer 17a of the gate terminal unit, underlying metal layer 19a of the common terminal unit, gate electrodes 20d, and 20e for the common device unit and the common bus line 21 for the drain, and near-by surface portions of the insulating substrate 1, are covered by the first mask 24, by reflow processing, which is carried out to such an extent that only the first mask 24 is melted.

Referring to FIGS. 34, 39c, 41c, 43c, 44c and 45c, the rough surface 1a is formed at a preset area of the insulating substrate 1 by for example wet etching employing HF (hydrofluoric acid), sandblasting or dry etching employing $CF_4$ or $O_2$. The resulting product then is rinsed and the first mask removed. The broken line in FIG. 34 indicates a step 1b of the insulating substrate. In this area, defined by the broken line in the drawing, the surface of the insulating substrate 1 is the original flat area, with an area lying outside the surrounded area being lower in level.

Referring to FIGS. 35, 39d, 41d, 43d, 44d and 45d, a gate insulating film 5 of e.g., SiNx, an a-Si layer 7a, which is to become a semiconductor layer and an n$^+$ type a-Si layer 7b which is to become a contact electrode, are sequentially formed on the entire surface of the insulating substrate 1 including the gate bus line 2, gate electrode 3, underlying metal layer 17a of the gate terminal unit, underlying metal layer 19a of the common terminal unit, gate electrodes 20d, and 20e for the common device unit and the common bus line 21 for the drain.

Referring to FIGS. 35, 39d, 41d, 43d, 44d and 45d, a second mask, not shown, is formed on the n$^+$ type a-Si layer 7b by the photolithography technique. Then, unneeded portions of the a-Si layer 7a and the n$^+$ type a-Si layer 7b are removed, by e.g., dry etching. The second mask then is removed to form islands 7 and 20f.

Then, referring to FIGS. 36, 40e, 42e, 43e, 44e and 45e, underlying metal layers 4a, 8a, and 9a, 10a and 22a (referred to below as 'Cr'), and metal overlying layers 4b, 8b, 9b, 10b and 22b of, for example, Al (referred to below as 'Al/Nd' are deposited in this order on the entire surface of the insulating substrate to form a source/drain electrode layer, not shown.

Referring now to FIGS. 36, 40e, 42e, 43e, 44e and 45e, a third mask, not shown, is formed by the photolithography technique on a source/drain electrode layer. Then, unneeded portions of the source/drain electrode layer are removed by for example dry etching or wet etching. This forms the reflector 4, source electrode 8, drain electrode 9, drain bus line 10, source/drain electrode layers 20a, 20b for the common device unit, and the common bus line 22 for the gate.

In the case of the reflection type liquid crystal display apparatus, no aperture is provided in the rough surface in the reflector 4. In the case of the semi-transmission type liquid crystal display apparatus, there is formed an aperture 4c. The reflector 4 is formed on the same layer with the source electrode 8 and is continuous to the source electrode 8.

Then, using the metal layers, inclusive of the source electrode 8 and the drain electrode 9, and the third mask, as etching masks, the n$^+$ type a-Si layer 7b is etched. The third mask then is removed to form an ohmic contact layer.

Then, referring to FIGS. 37, 40f, 42f, 43f, 44f and 45f, a passivation film 12 is formed, by e.g., the plasma CVD method, on the entire surface of the gate insulating film 5, inclusive of the reflector 4, source electrode 8, drain electrode 9, drain bus line 10, source/drain electrodes 20a, 20b for the common device part, and the common bus line 22 for the gate.

Then, referring to FIGS. 37, 40f, 42f, 43f, 44f and 45f, a fourth mask, not shown, is formed on the passivation film 12 by the photolithography technique. Then, unneeded portions of the passivation film 12, gate insulating film 5 or the Al/Nd layers 2b, 4b, 17b, 19a, 21a, lying in an area which later becomes the contact hole, are removed, such as by dry etching, until the Cr layers 2a, 4a, 10a, 17a, 18a, 19a, 20a, 20d, 20e, 21a and 22a are partially exposed. The fourth mask then is removed. This forms contact holes 6, 17c, 18c, 19b, 20c, 21c and 22c.

The contact holes 6, 17c, 18c, 19b, 20c, 21c and 22c are those for partially exposing the Cr layer 4a of the reflector, the Cr layer 17a of the gate terminal unit, the Cr layer 18a of the drain terminal unit, the Cr layer 19a of the common terminal unit, the Cr layers 2a, 20a, 20d, 20e, 21a and 22a of the common device unit, the Cr layer 21a of the common bus line for the drain and those for partially exposing the Cr layer 22a of the common bus line Cr for the gate, respectively.

Then, referring to FIGS. 38, 40g, 42g, 43g, 44g and 45g, on the entire substrate surface including the passivation film 12, the transparent electrode layers 14, 17d, 18d, 19c, 20g and 23 of ITO or the like are deposited, such as by sputtering method.

Finally, referring to FIGS. 38, 40g, 42g, 43g, 44g and 45g, a fifth mask, not shown, is formed on the transparent electrode layers 14, 17d, 18d, 19c, 20g and 23, such as by the photolithography technique. Then, unneeded portions of the transparent electrode layers are removed; such as by wet etching. The fifth mask then is removed. This forms the transparent electrode 14, as pixel electrodes, terminal 17d of the gate terminal unit, terminal 18d of the drain terminal unit, terminal 19c of the common terminal unit, wiring 20g of the common device unit and the wiring 23 across the common bus lines 21 and 22.

The transparent electrode 14 electrically connects to the Cr layer 4a of the reflector through the contact hole 6. The terminal 17d of the gate terminal unit, the terminal 18d of the drain terminal unit and the terminal 19c of the common terminal unit connect to the Cr layers 17a, 18a and 19a of the respective units, respectively, through the contact holes 17c, 18c and 19b of the respective units, respectively. Through the contact holes 20c of optional combinations, the wiring 20f of the common device unit electrically connects the gate bus line 2 to the source/drain electrode 20a of the common device unit, while electrically connecting the common bus line 22 to the gate electrode 20e of the common device unit, electrically connecting the common bus 21 to the source/drain electrode 20a of the common device unit and electrically connecting the drain bus line 10 to the gate electrode 20e of the common device unit. The wiring 23 across the common bus lines 21 and 22 electrically interconnects the common bus lines 21 and 22 through contact holes 21c and 22c.

Figure 38:
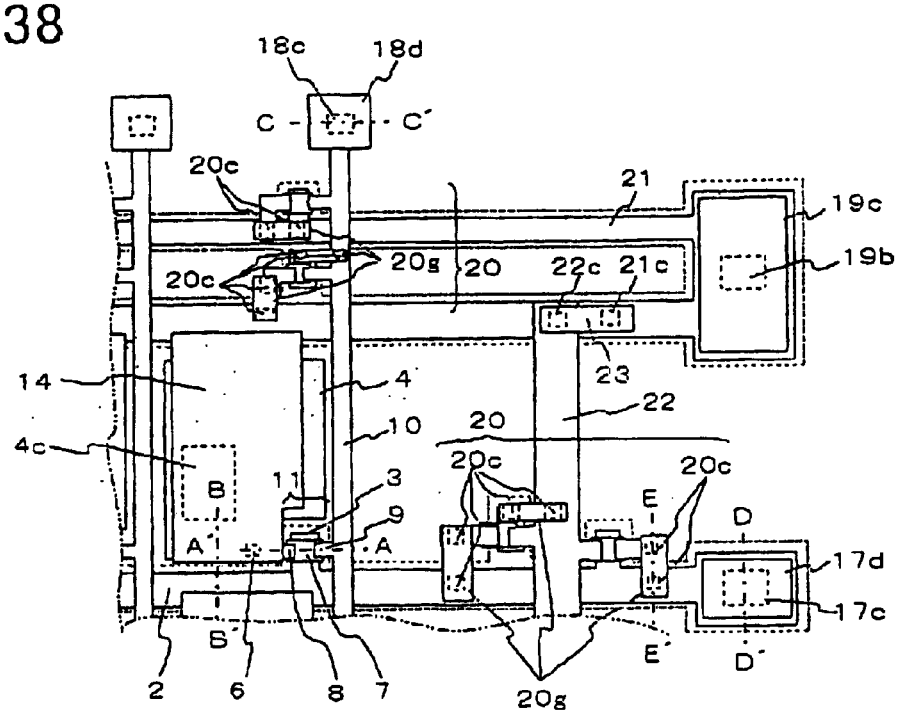
FIG. 38 is a sixth plan view schematically showing the production process of the active matrix substrate in the liquid crystal display apparatus according to the third embodiment of the present invention.
Figure 39A:
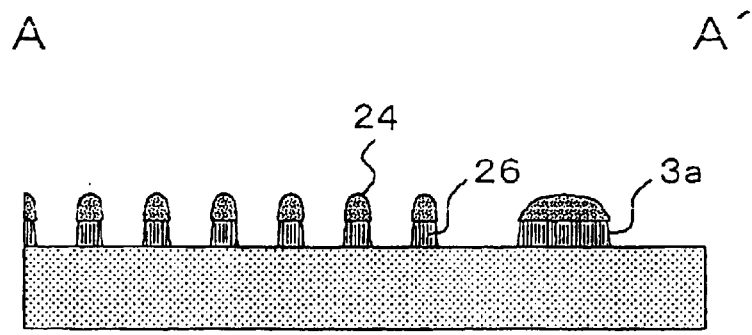
FIGS. 39a–39d are first cross-sectional views along line A–A' schematically showing the production process of the active matrix substrate in the liquid crystal display apparatus according to the third embodiment of the present invention.
Figure 39B:
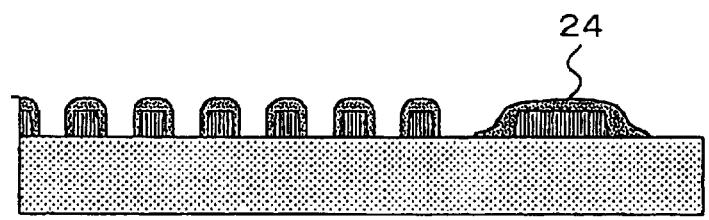
Figure 39C:
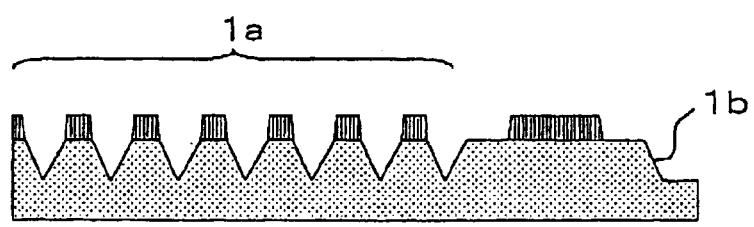
Figure 39D:
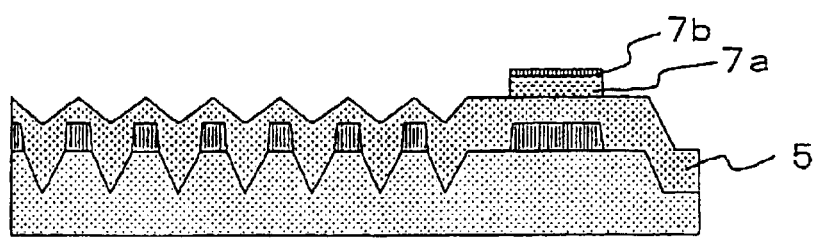
Figure 40E:
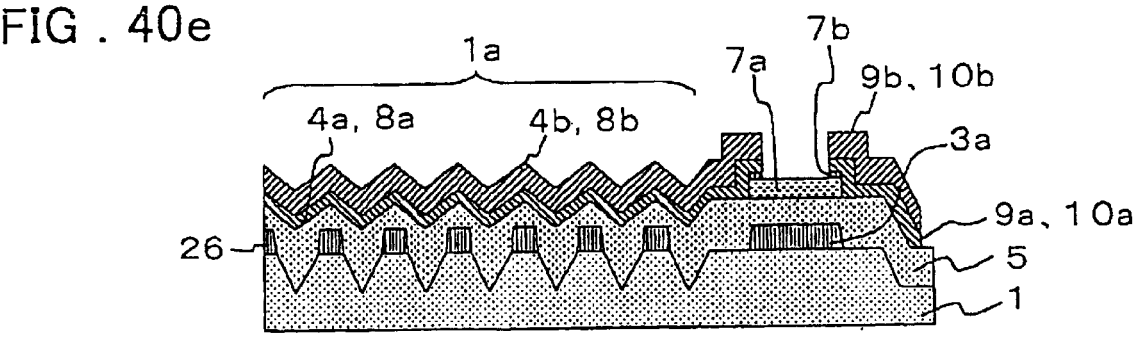
FIGS. 40e–40g are second cross-sectional views along line A–A' schematically showing the production process of the active matrix substrate in the liquid crystal display apparatus according to the third embodiment of the present invention.
Figure 40F:
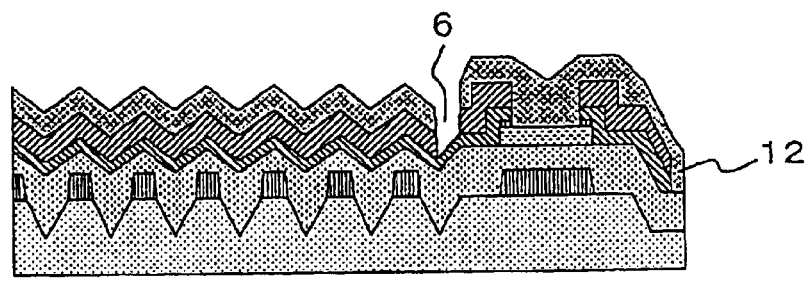
Figure 40G:
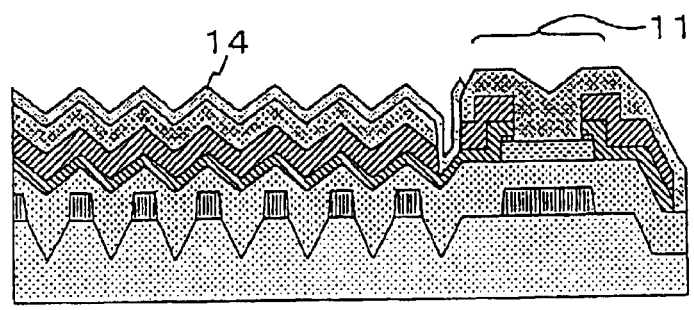
Figure 41A:
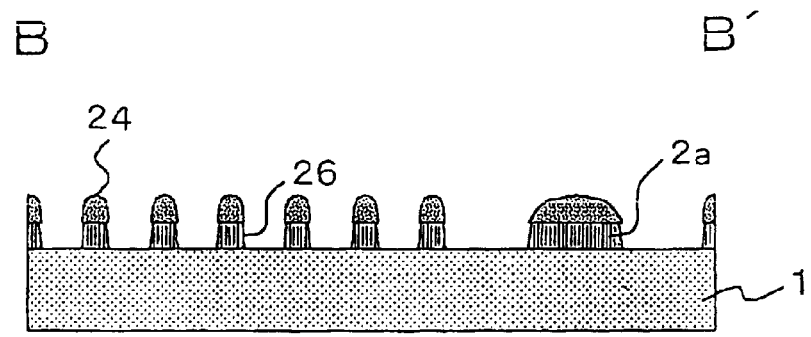
FIGS. 41a–41d are first cross-sectional views along line B–B' schematically showing the production process of the active matrix substrate in the liquid crystal display apparatus according to the third embodiment of the present invention.
Figure 41B:
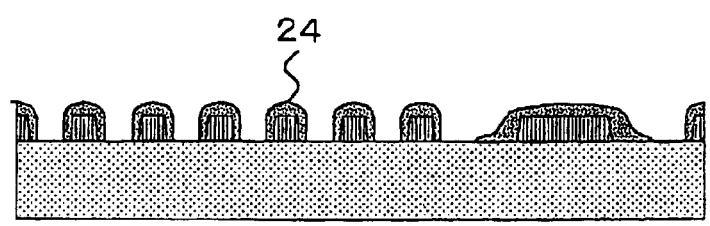
Figure 41C:
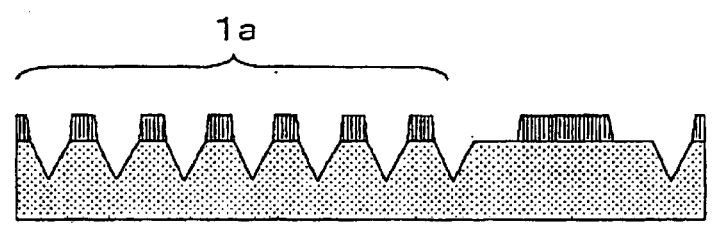
Figure 41D:
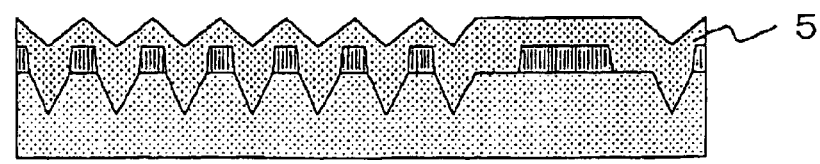
Figure 42E:
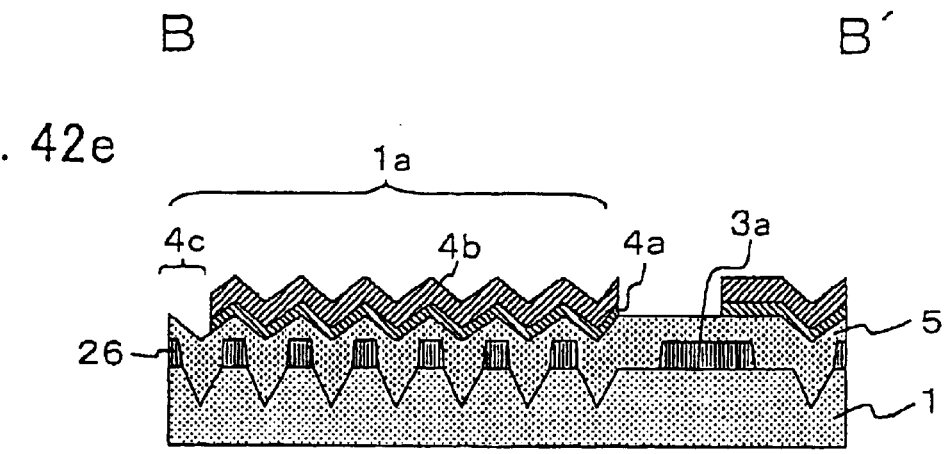
FIGS. 42e–42g are second cross-sectional views along line B–B' schematically showing the production process of the active matrix substrate in the liquid crystal display apparatus according to the third embodiment of the present invention.
Figure 42F:
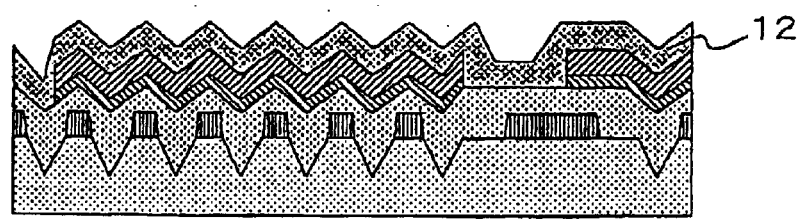
Figure 42G:
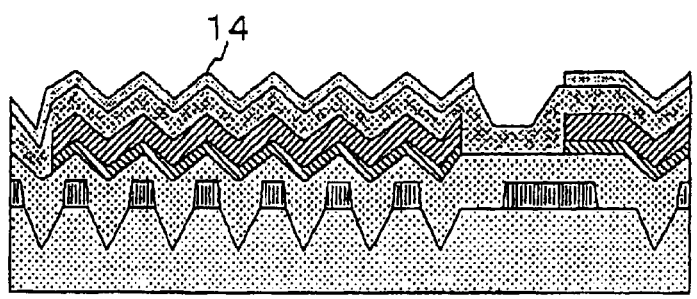
Figure 43A:
FIGS. 43a–43g are cross-sectional views along line C–C' schematically showing the production process of the active matrix substrate in the liquid crystal display apparatus according to the third embodiment of the present invention.
Figure 43B:
Figure 43C:
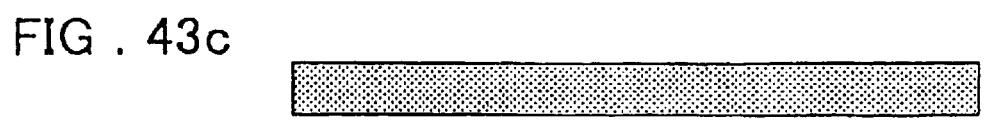
Figure 43D:
Figure 43E:
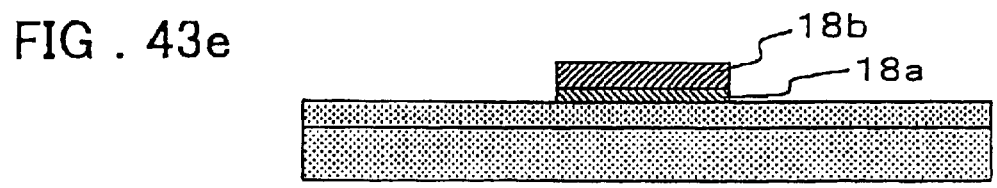
Figure 43F:
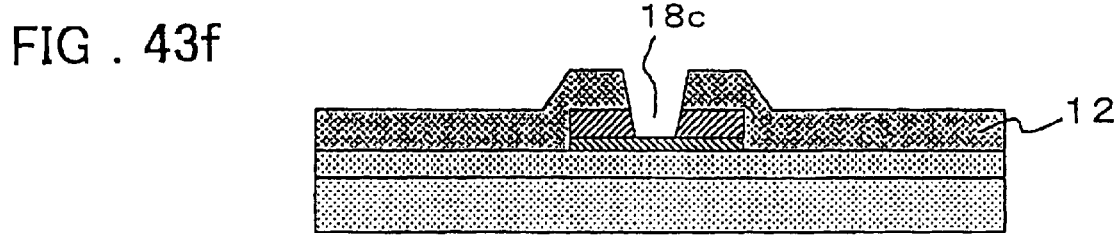
Figure 43G:
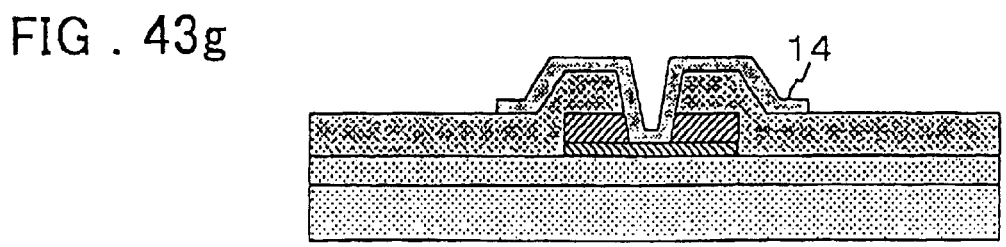
Figure 44A:
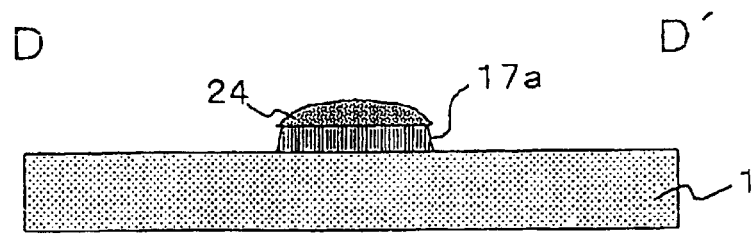
FIGS. 44a–44g are cross-sectional views along line D–D' schematically showing the production process of the active matrix substrate in the liquid crystal display apparatus according to the third embodiment of the present invention.
Figure 44B:
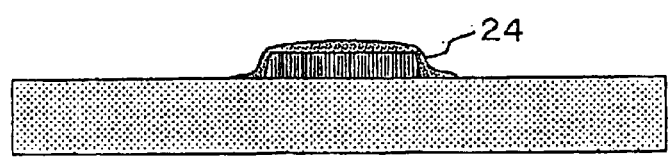
Figure 44C:
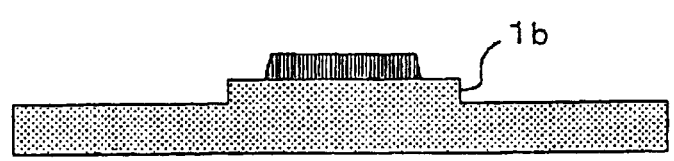
Figure 44D:
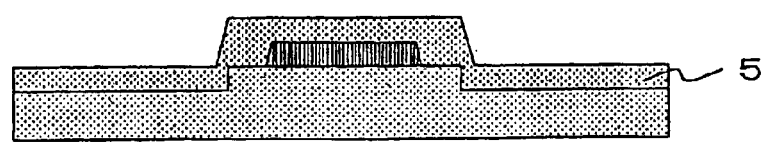
Figure 44E:
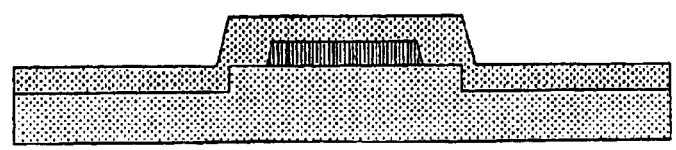
Figure 44F:
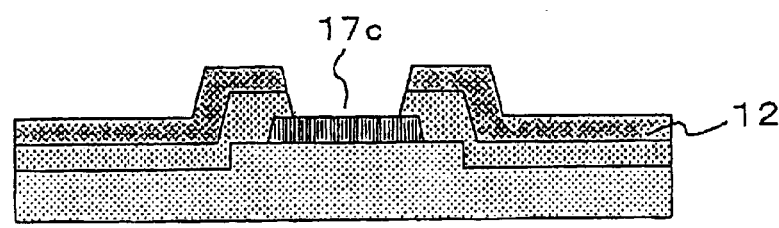
Figure 44G:
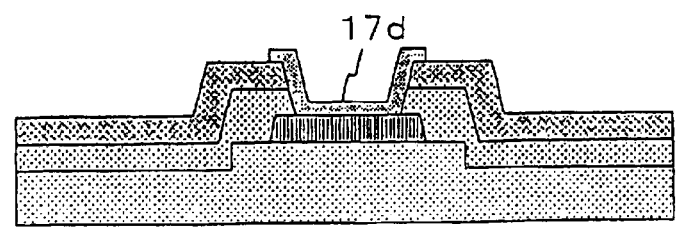
Figure 45A:
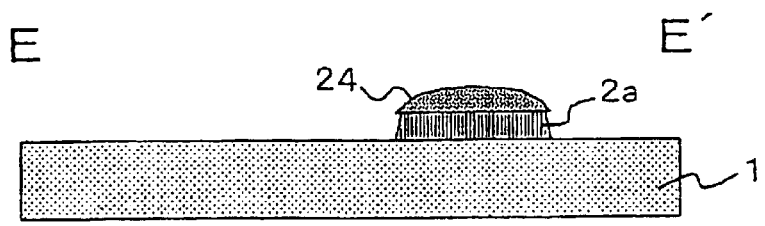
FIGS. 45a–45g are second cross-sectional views along line E–E' schematically showing the production process of the active matrix substrate in the liquid crystal display apparatus according to the third embodiment of the present invention.
Figure 45B:
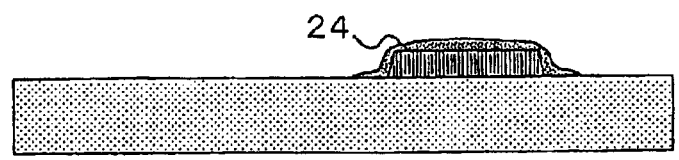
Figure 45C:
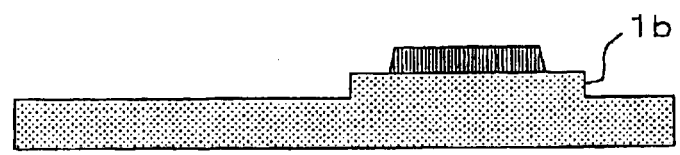
Figure 45D:
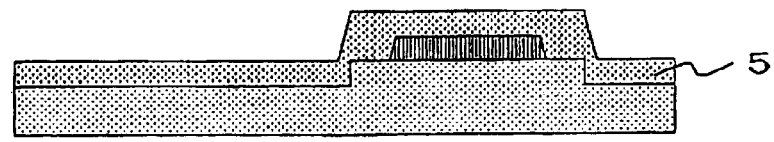
Figure 45E:
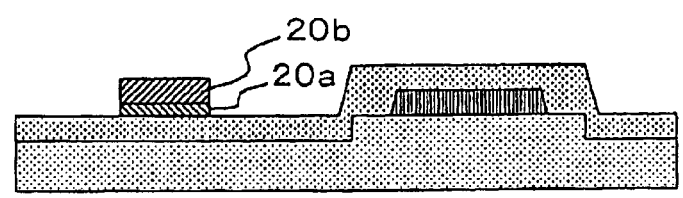
Figure 45F:
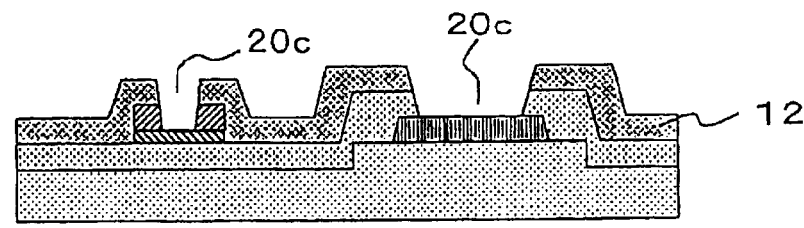
Figure 45G:
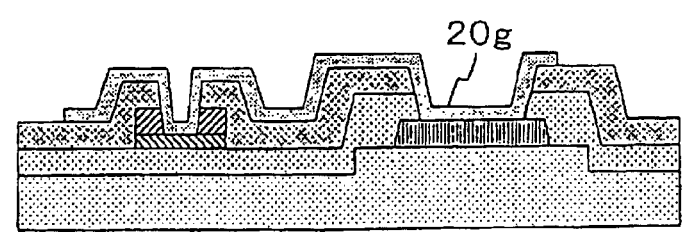
Figure 46:
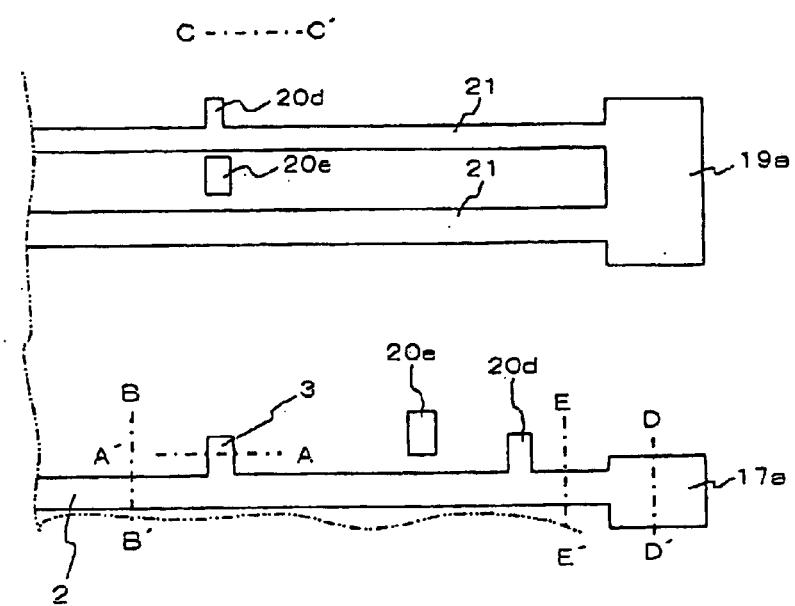
FIG. 46 is a first plan view schematically showing the production process of the active matrix substrate in the liquid crystal display apparatus according to a fourth embodiment of the present invention.
Figure 47:
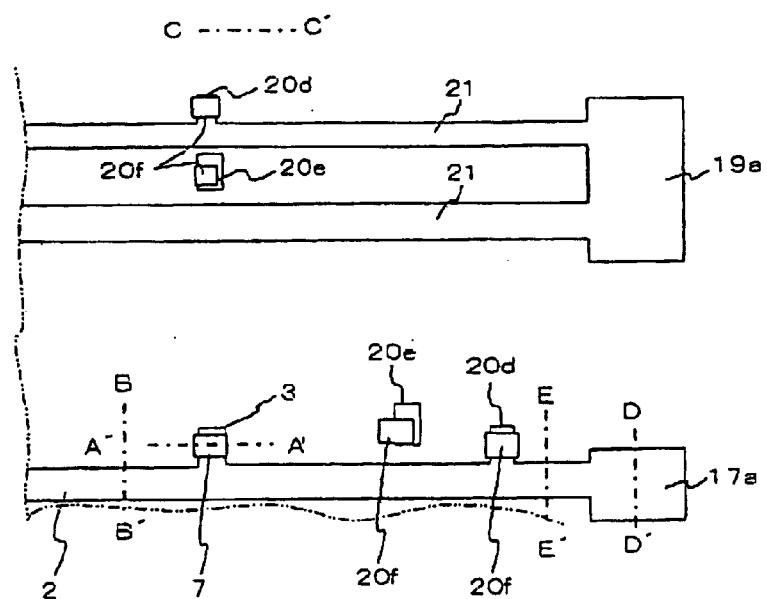
FIG. 47 is a second plan view schematically showing the production process of the active matrix substrate in the liquid crystal display apparatus according to the fourth embodiment of the present invention.
Figure 48:
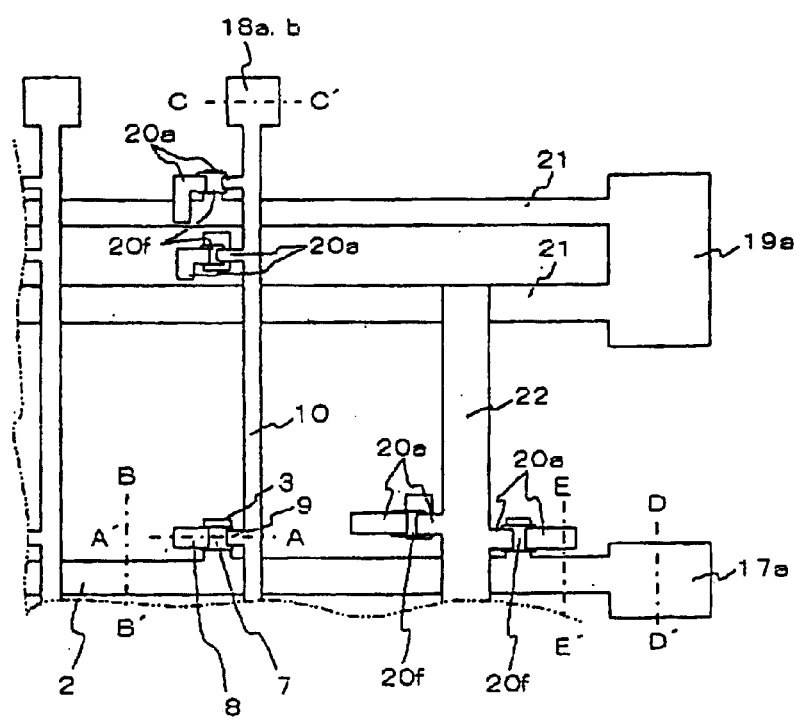
FIG. 48 is a third plan view schematically showing the production process of the active matrix substrate in the liquid crystal display apparatus according to the fourth embodiment of the present invention.
Figure 49:
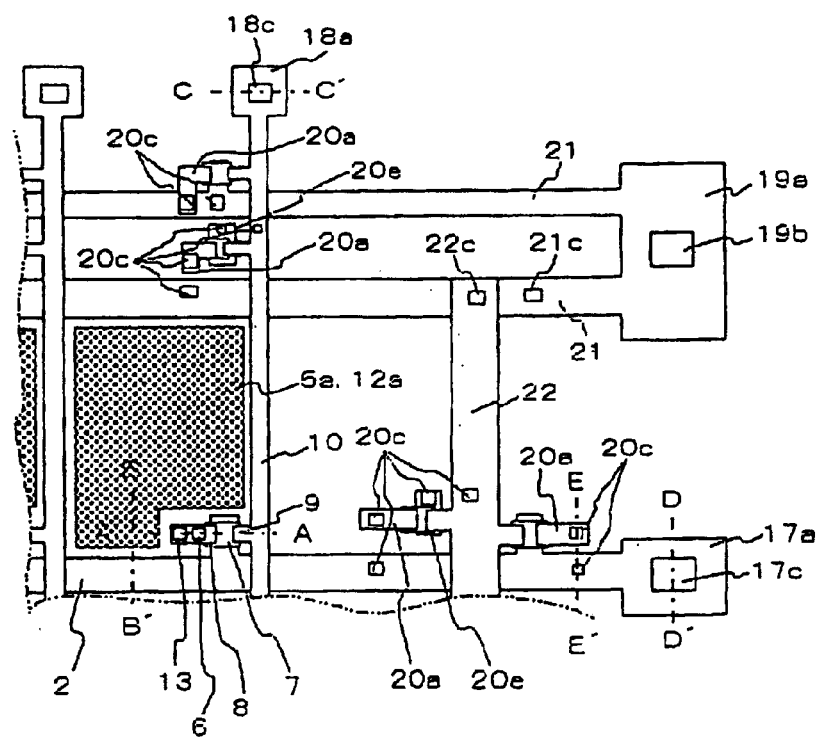
FIG. 49 is a fourth plan view schematically showing the production process of the active matrix substrate in the liquid crystal display apparatus according to the fourth embodiment of the present invention.
Figure 50:
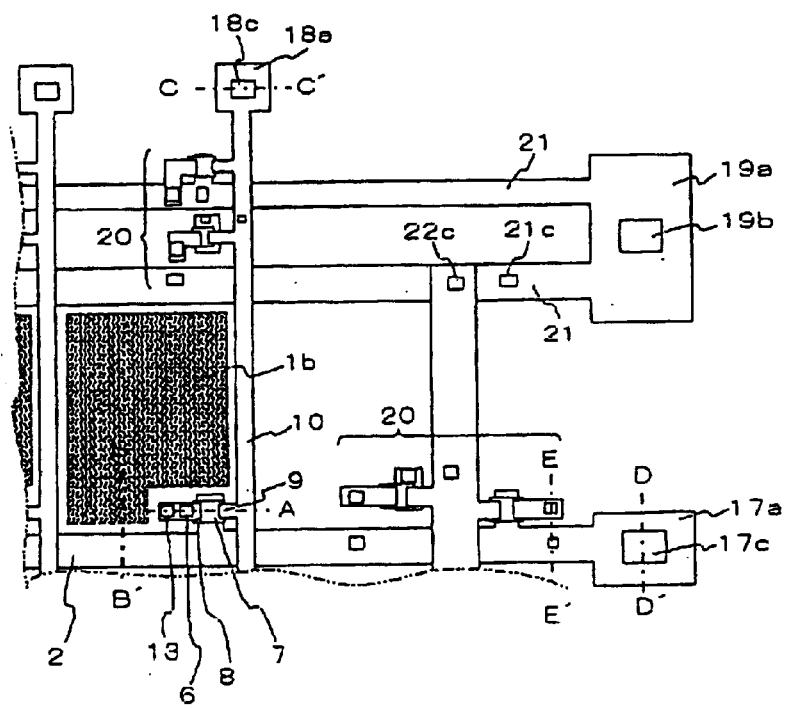
FIG. 50 is a fifth plan view schematically showing the production process of the active matrix substrate in the liquid crystal display apparatus according to the fourth embodiment of the present invention.
Figure 51:
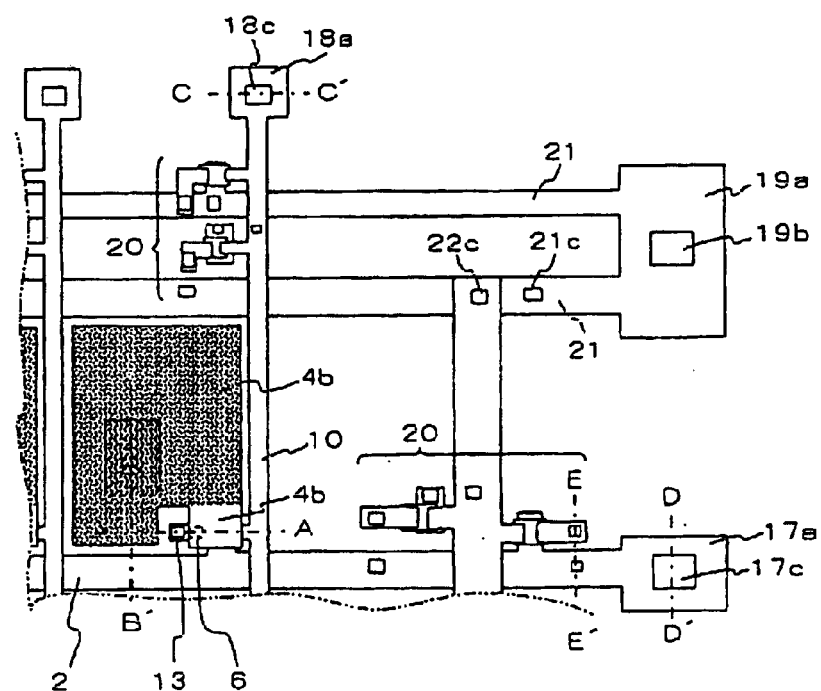
FIG. 51 is a sixth plan view schematically showing the production process of the active matrix substrate in the liquid crystal display apparatus according to the fourth embodiment of the present invention.

The above process renders it possible to prepare the active matrix substrate having the structure shown in FIG. 38. With the method for producing the active matrix substrate according to the third embodiment, described above, it is possible to produce a reflection or semi-transmitting type active matrix substrate, having a reflector presenting a rough surface, and which exhibits optimum display performance, using only five masks, thus simplifying the production method by at least two PRs as compared to the conventional production method.

A fourth embodiment is now explained by referring to the drawings. FIGS. 46 to 52 are plan views schematically illustrating the manufacturing method for the active matrix substrate in a liquid crystal display apparatus according to the fourth embodiment of the present invention. FIG. 53a to FIG. 62h are cross-sectional views schematically illustrating the manufacturing process for the active matrix substrate in a liquid crystal display apparatus according to the fourth embodiment of the present invention. In FIGS. 53 and 54, FIGS. 57 and 58, FIG. 59, FIG. 60 and in FIGS. 61 and 62, the section lines are A–A', B–B', C–C', D–D' and E–E', respectively.

Figure 52:
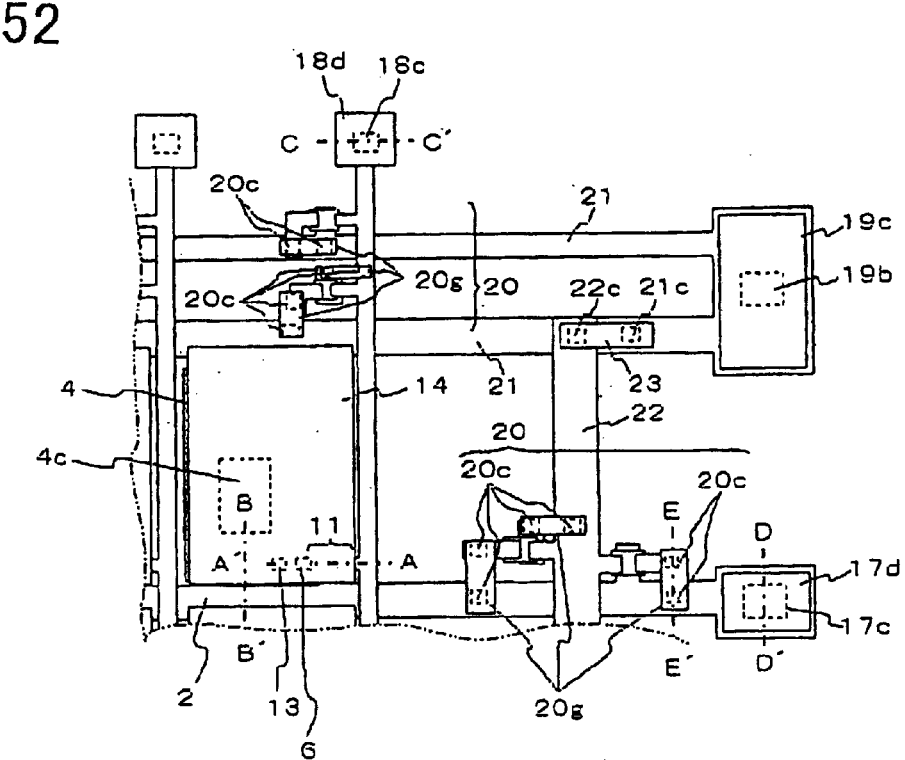
FIG. 52 is a seventh plan view schematically showing the production process of the active matrix substrate in the liquid crystal display apparatus according to the fourth embodiment of the present invention.
Figure 53A:
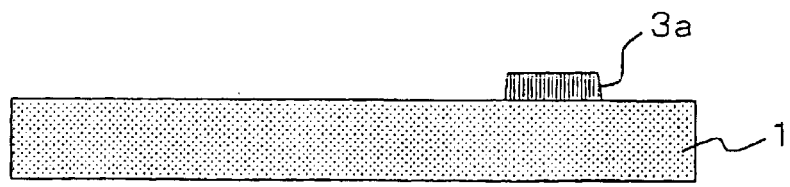
FIGS. 53a–53d are first cross-sectional views along line A–A' schematically showing the production process of the active matrix substrate in the liquid crystal display apparatus according to a fourth embodiment of the present invention.
Figure 53B:
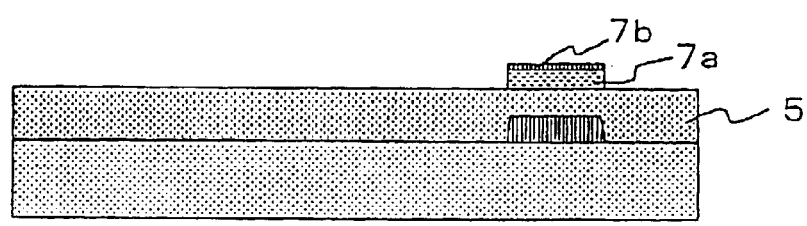
Figure 53C:
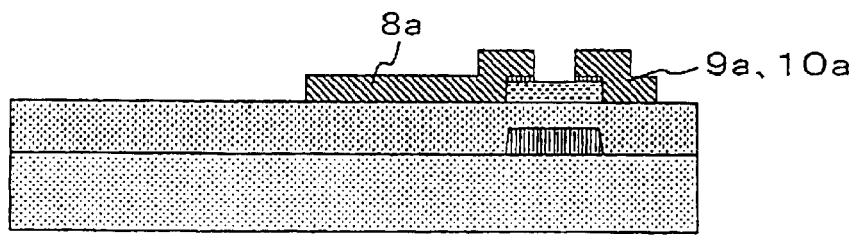
Figure 53D:
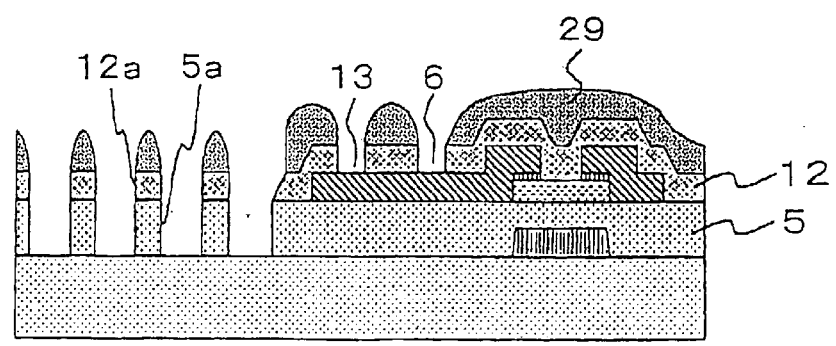
Figure 54E:
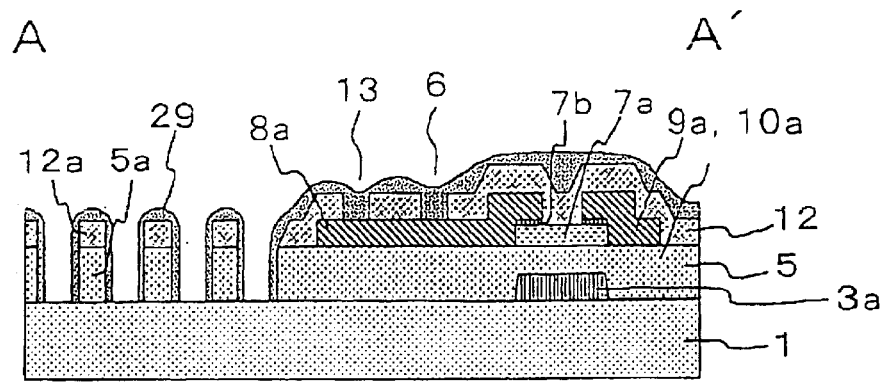
FIGS. 54e–54h are second cross-sectional views along line A–A' schematically showing the production process of the active matrix substrate in the liquid crystal display apparatus according to the fourth embodiment of the present invention.
Figure 54F:
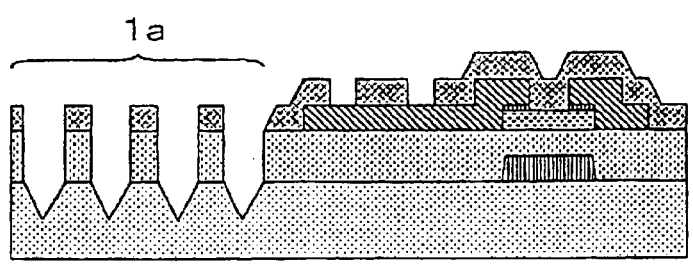
Figure 54G:
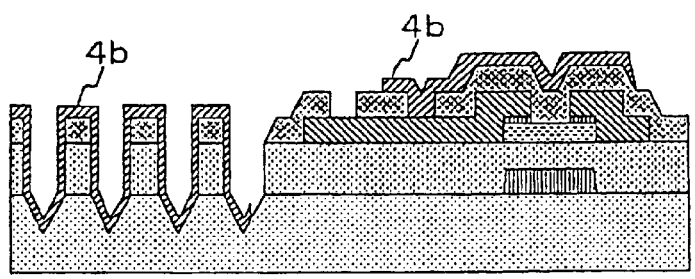
Figure 54H:
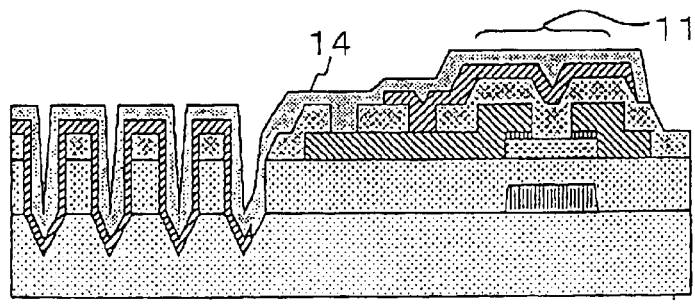
Figure 55A:
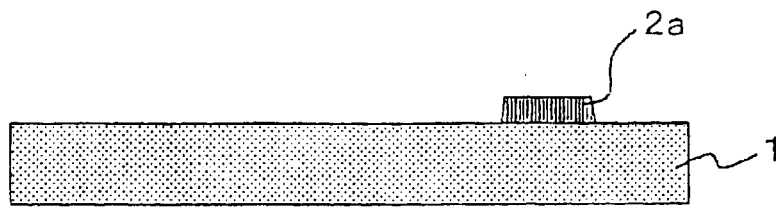
FIGS. 55a–55d are first cross-sectional views along line B–B' schematically showing the production process of the active matrix substrate in the liquid crystal display apparatus according to the fourth embodiment of the present invention.
Figure 55B:
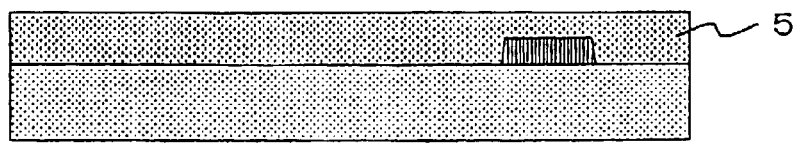
Figure 55C:
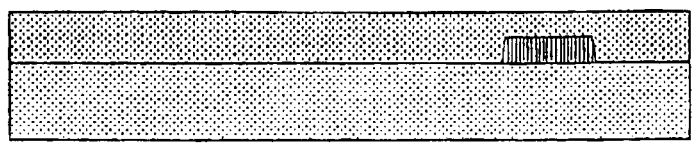
Figure 55D:
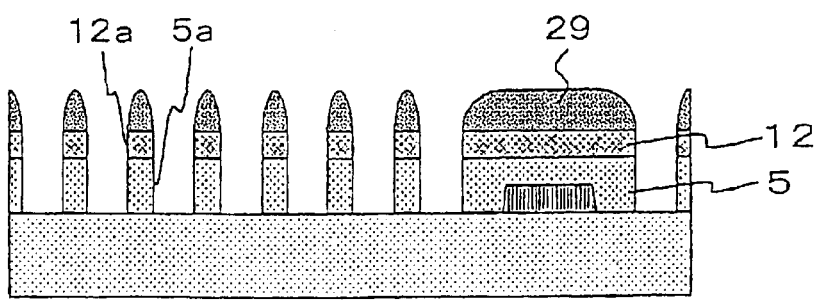
Figure 56E:
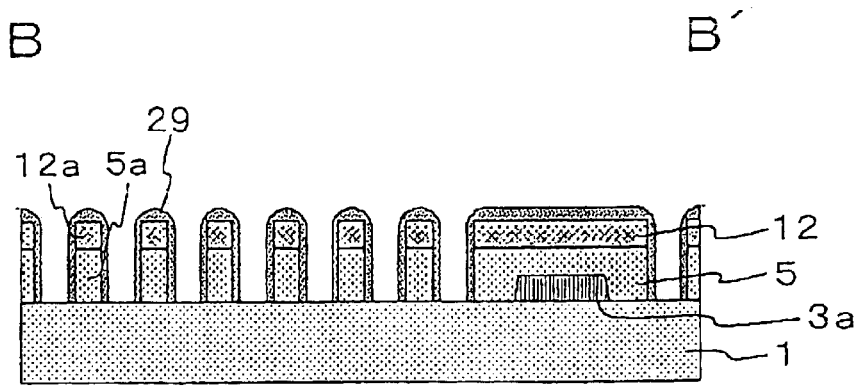
FIGS. 56e–56h are second cross-sectional views along line B–B' schematically showing the production process of the active matrix substrate in the liquid crystal display apparatus according to the fourth embodiment of the present invention.
Figure 56F:
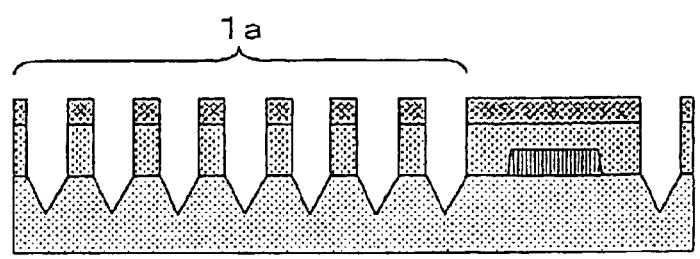
Figure 56G:
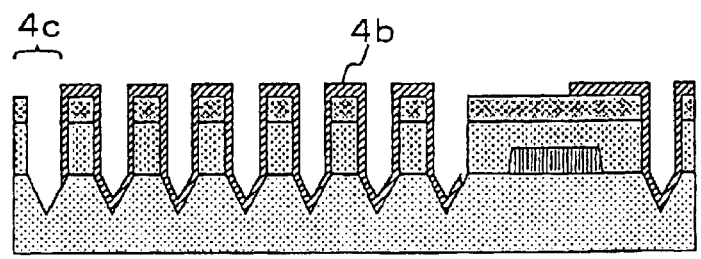
Figure 56H:
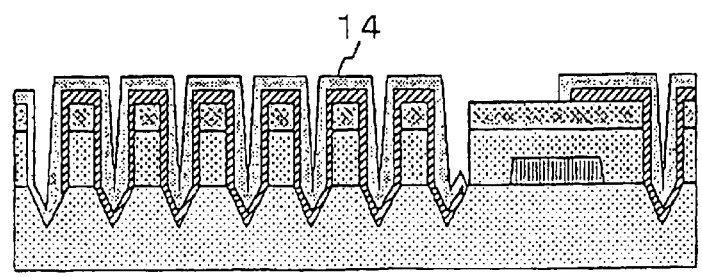
Figure 57A:
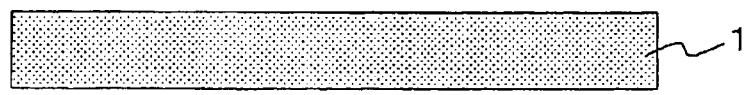
FIGS. 57a–57d are first cross-sectional views along line C–C' schematically showing the production process of the active matrix substrate in the liquid crystal display apparatus according to the fourth embodiment of the present invention.
Figure 57B:
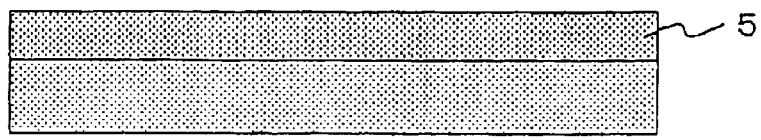
Figure 57C:
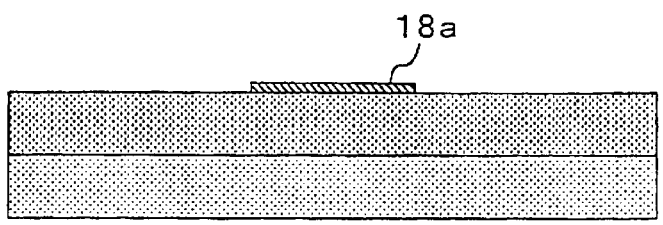
Figure 57D:
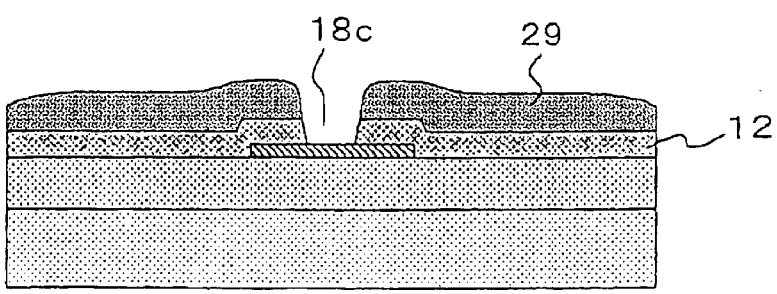
Figure 58E:
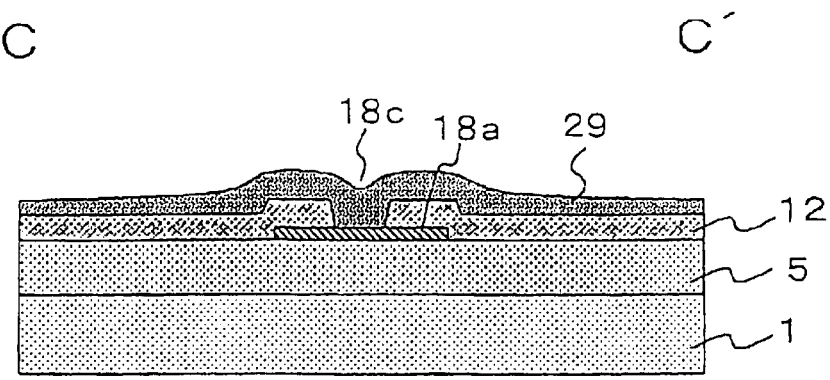
FIGS. 58e–58h are second cross-sectional views along line C–C' schematically showing the production process of the active matrix substrate in the liquid crystal display apparatus according to the fourth embodiment of the present invention.
Figure 58F:
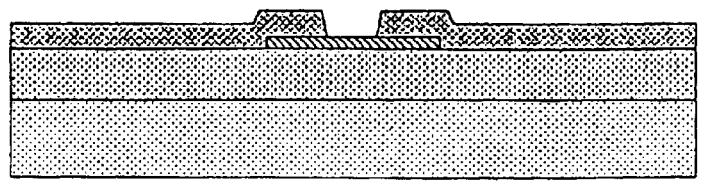
Figure 58G:
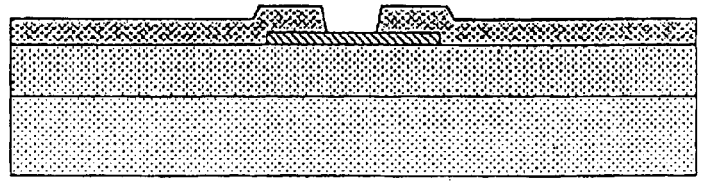
Figure 58H:
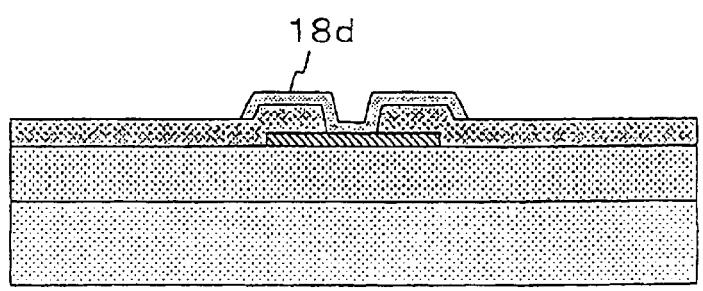
Figure 59A:
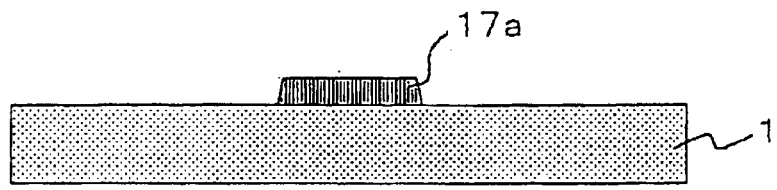
FIGS. 59a–59d are first cross-sectional views along line D–D' schematically showing the production process of the active matrix substrate in the liquid crystal display apparatus according to the fourth embodiment of the present invention.
Figure 59B:
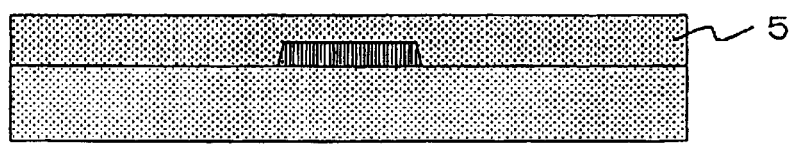
Figure 59C:
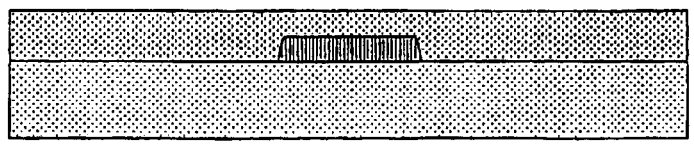
Figure 59D:
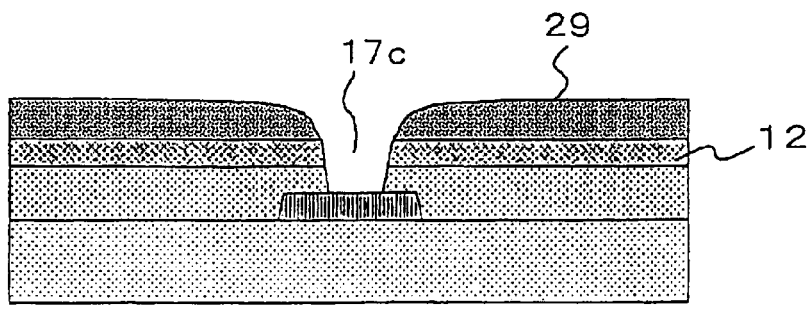
Figure 60E:
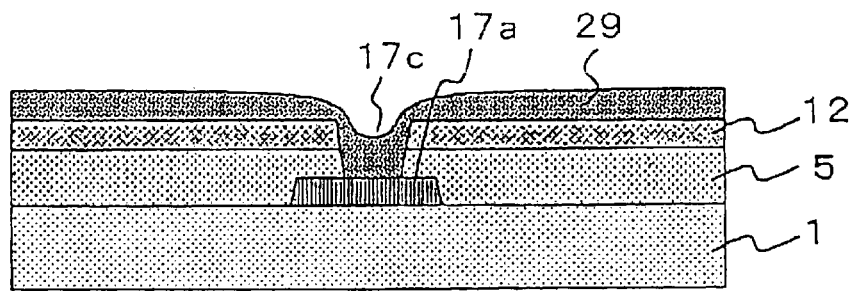
FIGS. 60e–60h are second cross-sectional views along line D–D' schematically showing the production process of the active matrix substrate in the liquid crystal display apparatus according to the fourth embodiment of the present invention.
Figure 60F:
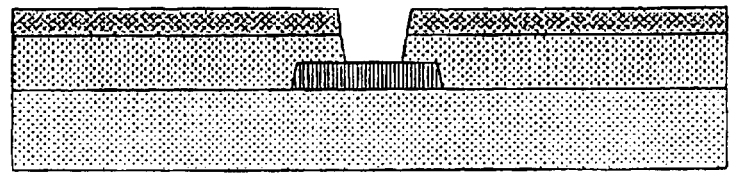
Figure 60G:
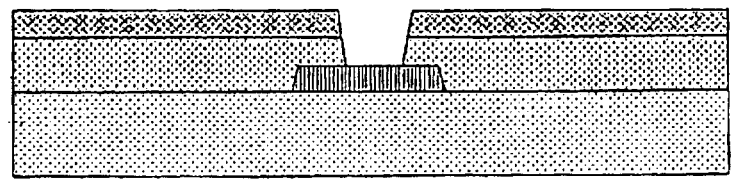
Figure 60H:
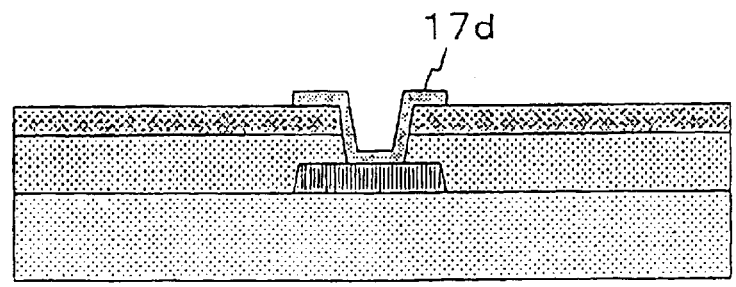
Figure 61A:
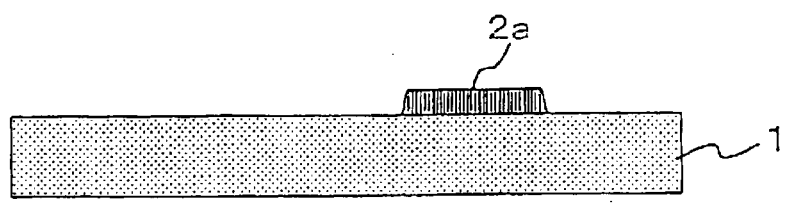
FIGS. 61a–61d are first cross-sectional views along line E–E' schematically showing the production process of the active matrix substrate in the liquid crystal display apparatus according to the fourth embodiment of the present invention.
Figure 61B:
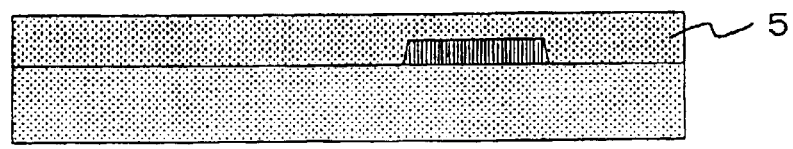
Figure 61C:
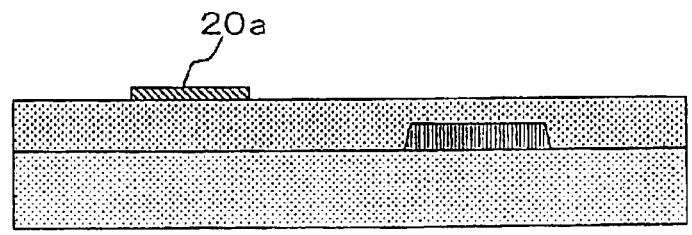
Figure 61D:
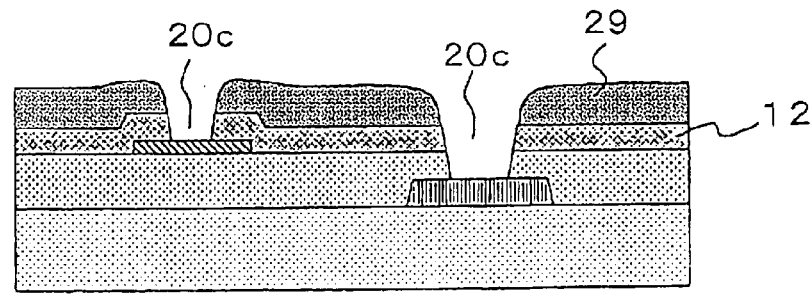
Figure 62E:
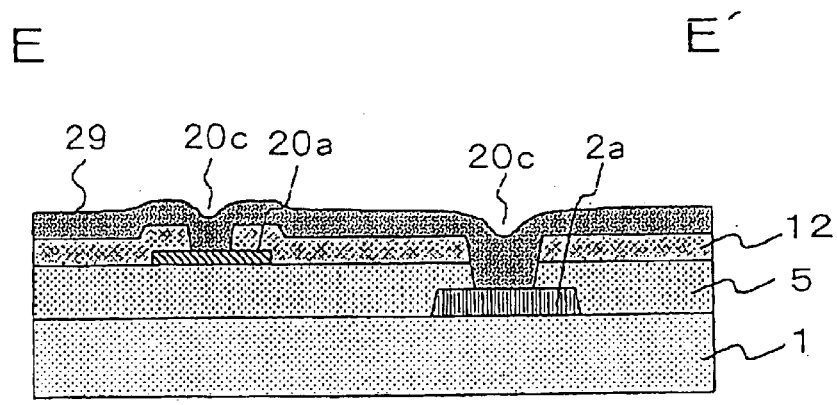
FIGS. 62e–62h are second cross-sectional views along line E–E' schematically showing the production process of the active matrix substrate in the liquid crystal display apparatus according to the fourth embodiment of the present invention.
Figure 62F:
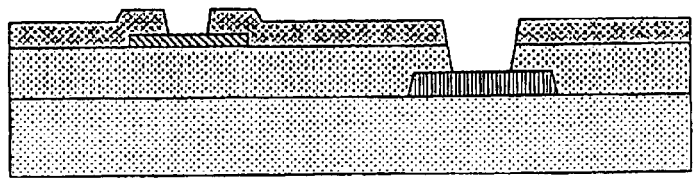
Figure 62G:
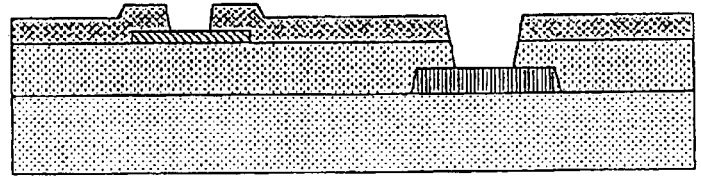
Figure 62H:
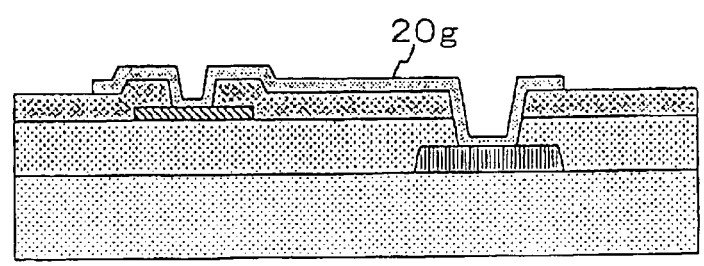
Figure 63:
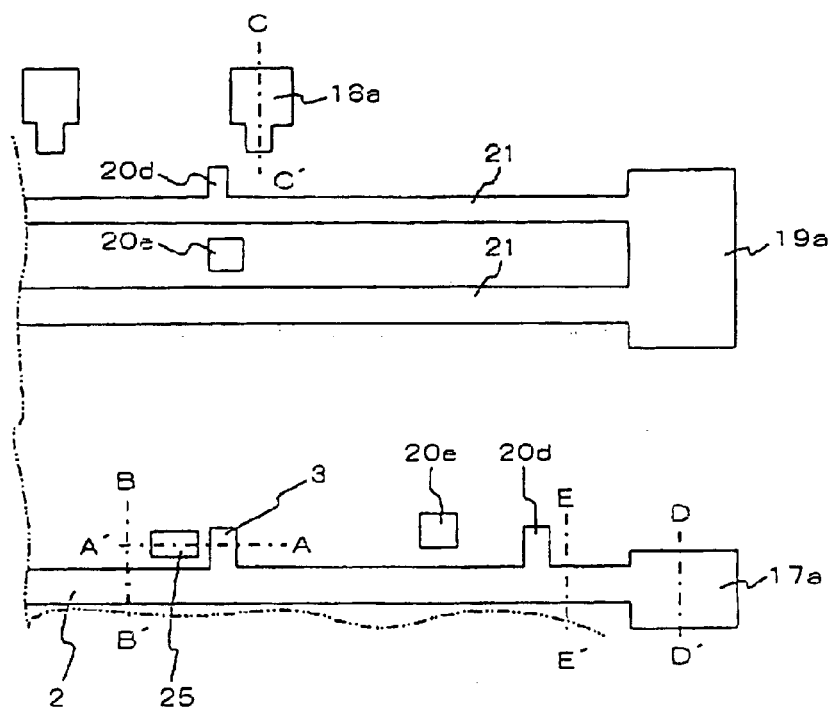
FIG. 63 is a first plan view schematically showing the production process of the active matrix substrate in the liquid crystal display apparatus according to a fifth embodiment of the present invention.
Figure 64:
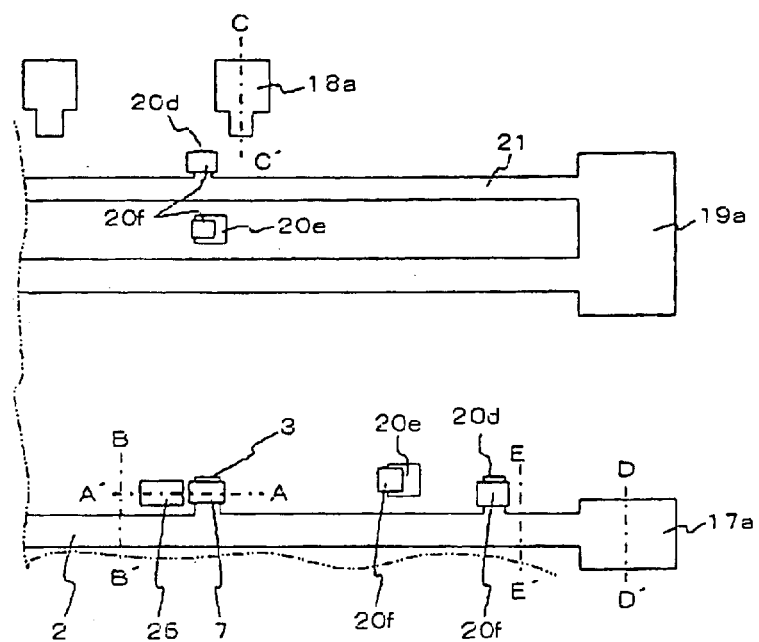
FIG. 64 is a second plan view schematically showing the production process of the active matrix substrate in the liquid crystal display apparatus according to the fourth embodiment of the present invention.
Figure 65:
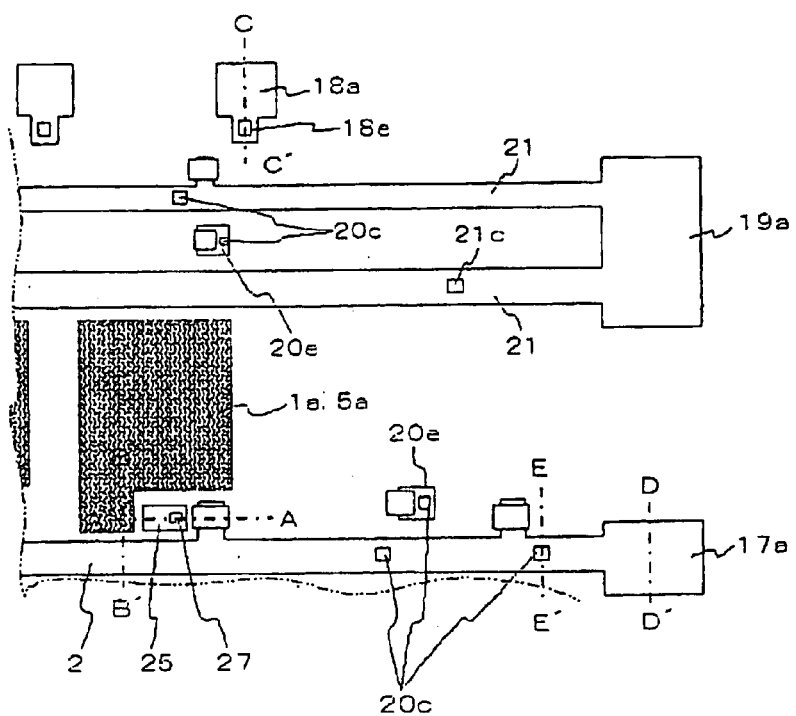
FIG. 65 is a third plan view schematically showing the production process of the active matrix substrate in the liquid crystal display apparatus according to the fifth embodiment of the present invention.
Figure 66:
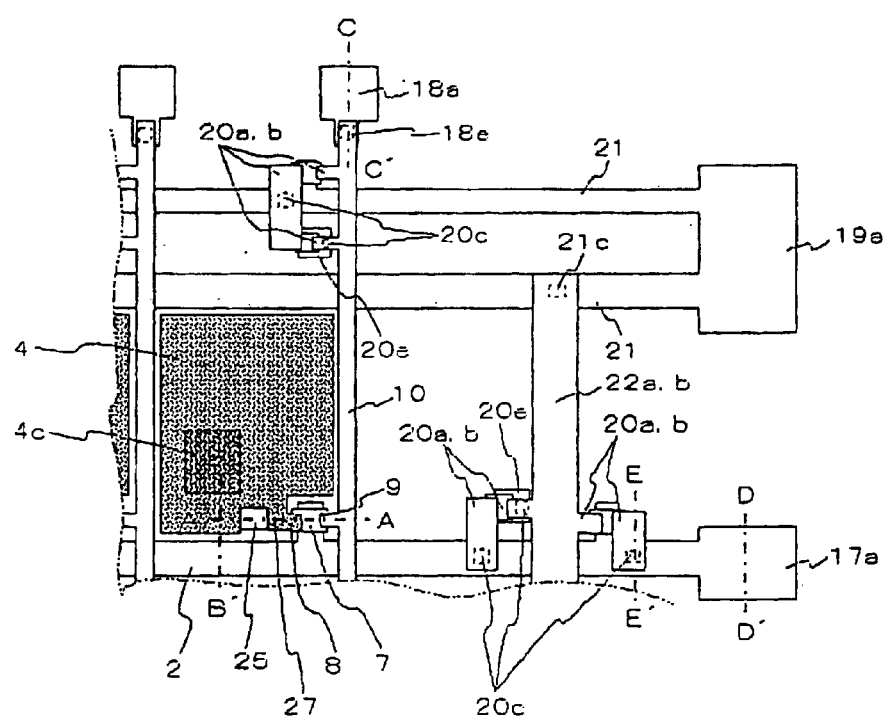
FIG. 66 is a fourth plan view schematically showing the production process of the active matrix substrate in the liquid crystal display apparatus according to the fifth embodiment of the present invention.
Figure 67:
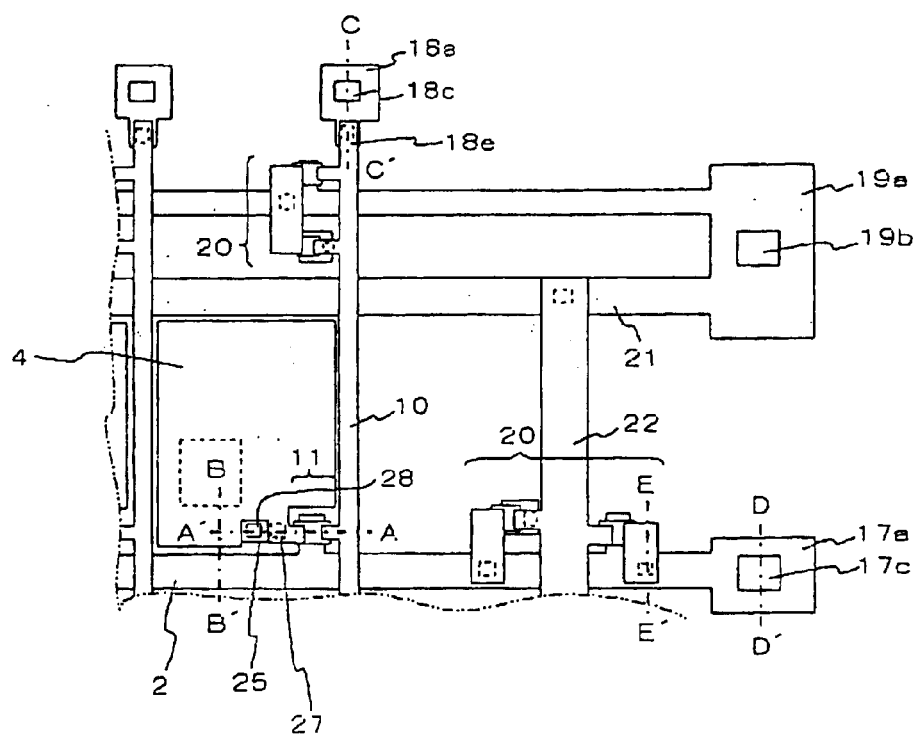
FIG. 67 is a fifth plan view schematically showing the production process of the active matrix substrate in the liquid crystal display apparatus according to the fifth embodiment of the present invention.

Referring to FIGS. 52 to 54, the active matrix substrate according to the fourth embodiment is constructed as follows. It is noted that the structure of the liquid crystal display apparatus except the active matrix substrate is the same as that of the first embodiment.

In an area of the planar surface of the insulating substrate 1, presenting the rough surface 1a in a preset area thereof, plural gate lines 2 are arranged parallel to one another. From each gate bus line 2 is branched a gate electrode 3.

A gate insulating film 5 of, for example, $SiN_x$, is formed on the insulating substrate 1 including the gate electrode 3. On the planar surface of the insulating substrate 1, presenting the rough surface 1a, there are provided plural projection members 5a formed of the same metal as that of the gate insulating film, for example, $SiN_x$. Projection members 5a serve as a basis in forming the rough surface of the reflector 4 along with the rough surface 1a of the insulating substrate 1. Although not shown, plural projection members of the same metal as that of the gate electrode 3, such as Cr, may be provided between the top planar surfaces of the rough surface 1a of the insulating substrate 1 and the projection members 5a as in the second and third embodiment (refer to projection members 26 of FIGS. 23 and 39).

On the insulating substrate 1 overlying the gate electrode 3, there is formed an island 7 comprised of a semiconductor layer 7a and a contact electrode 7b, laminated in this order.

Towards one end and the other end on the island 7, there are formed a source electrode 8 (8a and 8b) and a drain electrode 9 (9a, and 9b), respectively. The drain electrode 9 is branched from the drain bus line 10 (10a) intersecting the gate bus line 2 via gate insulating film 5.

The gate electrode 3, gate-insulating film 5, island 7, source electrode 8 and the drain electrode 9 constitute a thin-film transistor (TFT) 11. This TFT 11 operates as a switching device.

On the substrate inclusive of the TFT 11, there is formed a passivation film 12. The passivation film 12 includes contact holes 6, 13, in preset areas of the source electrode 8, for exposing its Cr layer 8a. The contact hole 6 serves for electrically interconnecting the source electrode 8a and the reflector 4b, while the contact hole 6 serves for electrically interconnecting the source electrode 8a and the transparent electrode 14. On the top of the projection member 5a, there is provided a projection member 12a formed of the same material as that of the passivation film 12, for example SiNx.

The reflector 4 (4b) is formed in an area from the roughened surface formed by the rough surface 1a of the insulating substrate 1 and the projection members 5a and 12a, or projection members by the Cr layer, up to an area overlying the passivation film 12 in turn overlying the TFT 11. The reflector 4b overlying the roughened surface formed by the rough surface 1a of the insulating substrate 1 and the by the projection members 5a, 12a, occasionally the projection members by the Cr layer, and the reflector 4b overlying the TFT 11, are formed by the same process and are electrically conducting to each other. The surface of the reflector 4 presents a rough surface lying on the roughened surface formed by the rough surface 1a of the insulating substrate 1 and by the projection members 5a, 12a, with the rough surface being of substantially the same shape as the roughened surface. The maximum height of the surface roughness is on the order of 2 to 3 $\mu$m, with the spacing between adjoining crests being on the order of tens of $\mu$m. In the case of the semi-transmission type liquid crystal display apparatus, there is formed an aperture 4c in a portion of an area of the rough surface of the reflector 4 for transmitting the light rays from the backlight. In the case of the reflection type liquid crystal display apparatus, no aperture is provided in the rough surface in the reflector 4. Although the crests and dents of the rough surface and the rough surface as shown in the drawings are seen to be pointed these crests and groves are actually rounded smoothly.

On the reflector 4 and on an area of the passivation film 12 including the rough surface there is provided a transparent electrode 14, which transparent electrode 14 is electrically connected to the source electrode 8 through the contact hole 6. The transparent electrode 14 operates as pixel electrodes in conjunction with the reflector 4. When the transparent electrode 14 is formed in contact with the reflector 4, and the reflector 4 is formed of metal including Al, ITO as the material of the transparent electrode 14 is effective to prevent hillocks from being produced by Al. The transparent electrode 14 (ITO) is not optimum in electrical conductivity to the reflector 4 (Al/Nd) and hence is supplied with the power predominantly from the source electrode 8 (Cr).

The production process for producing the active matrix substrate in the liquid crystal display apparatus according to the fourth embodiment is hereinafter explained.

Referring first to FIGS. 46, 53a, 55a, 55a, 59a and 61a, a gate electrode layer (Cr layer, not shown), which is to become the underlying metal layers 2a, 3a, 17a, 19a, 20d, 20e and 21a, is formed on the entire surface of the insulating substrate 1 having a planar surface.

Then, referring to FIGS. 46, 53a, 57a, 55a, 59a and 61a, a first mask, not shown, is formed on the gate electrode layer by the photolithography technique. Then, unneeded portions of the gate electrode layer are removed by for example dry etching or wet etching. The first mask then is removed. This sequentially forms the gate bus line 2, gate electrode 3, underlying metal layer 17a for the gate terminal unit, underlying metal layer 19a for the common terminal unit, gate electrodes 20d, 20e for the common device unit, and the common bus line 21 for the drain.

Then, referring to FIGS. 47, 53b, 55b, 57b, 59b and 61b, the gate insulating film 5 of, for example, SiNx, the a-Si layer 7a, which becomes the semiconductor layer, and the n$^+$ type a-Si layer 7b, which becomes he contact electrode, are sequentially formed on the entire substrate surface comprising the gate bus line 2, gate electrode 3, underlying metal layer 17a for the gate terminal unit, underlying metal layer 19a for the common terminal unit, gate electrodes 20d, and 20e for the common device unit, and the common bus line 21 for the drain.

Then, referring to FIGS. 47, 53b, 55b, 57b, 59b and 61b, a second mask, not shown, is formed by the photolithography technique on the n$^+$ type a-Si layer 7b. Then, unneeded portions of the a-Si layer 7a and the n$^+$ type a-Si layer 7b are removed, such as by dry etching, and subsequently the second mask is removed. This forms islands 7 and 20f.

Then, referring to FIGS. 48, 53c, 55c, 57c, 59c and 61c, a source/drain electrode layer, not shown, comprised of metal layers 4a, 8a, 9a, 10a and 22a of, for example, Cr (referred to below as 'Cr'), is formed on the entire substrate surface.

Referring to FIGS. 48, 53c, 55c, 57c, 59c and 61c, a third mask, not shown, is formed on the source/drain electrode layer by the photolithography technique. Then, unneeded portions of the source/drain electrode layer are removed by for example dry etching or wet etching. This forms the source electrode 8, drain electrode 9, and drain bus line 10, source/drain electrodes 20a and 20b for the common device unit and the common bus line 22 for the gate.

Then, using the metal layers, such as source electrode 8 or drain electrode 9, and the third mask, as the etching masks, the n$^+$ type a-Si layer 7b is etched and subsequently the third mask is removed to form an ohmic contact layer.

Referring to FIGS. 49, 53d, 55d, 57d, 59d and 61d, the passivation film 12 is formed, by the plasma CVD method, on the entire surface of the gate insulating film 5, including the source electrode 8, drain electrode 9, drain bus line 10, source/drain electrodes 20a and 20b for the common device unit and the common bus line 22 for the gate.

Referring to FIGS. 49, 53d, 55d, 57d, 59d and 61d, a fourth mask 29 is formed on the passivation film 12, by the photolithography technique. Then, excess portions of the passivation film 12 or the gate insulating film 5, lying in an area which later becomes the contact hole, are removed by e.g., dry etching, until the insulating substrate 1 or Cr layers 2a, 8a, 10a, 17a, 18a, 19a, 20a, 20d, 20e, 21a and 22a are partially exposed. This forms contact holes 6, 13, 17c, 18c, 19b, 20c, 21c and 22c and projection members 5aand 12a. At this stage, the fourth mask 29 has not been removed.

It is noted that the contact hole 6 partially exposes part of the source electrode 8a. The contact hole 13 exposes part of the source electrode 8a. The contact hole 17c partially exposes part of the Cr layer 17a of the gate terminal unit. The contact hole 18c partially exposes part of the Cr layer 18a of the drain terminal unit. The contact hole 19b partially exposes part of the Cr layer 19a of the common terminal unit. The contact hole 20c partially exposes part of the Cr layers 2a, 20a, 20d, 20e, 21a and 22a of the common device unit. The contact hole 21c partially exposes part of the Cr layer 21a for the common bus line for the drain. The contact hole 22c partially exposes part of the Cr layer 22a of the common bus line for the gate.

Referring to FIGS. 49, 54e, 56e, 58e, 60e and 62e, exposed sidewall sections of the gate insulating film 5, passivation film 12 and the projection members 5a, 12a and near-by surface portions of the insulating substrate 1 are covered by the fourth mask 29, by reflow processing, which is carried out to such an extent that only the fourth mask 29 is melted. The contact holes 6, 13, 17c, 18c, 19b, 20c, 21c and 22c as well as the exposed surface portions of the Cr layers 2a, 8a, 10a, 17a, 18a, 19a, 20a, 20d, 20e, 21a, and 22a are closed by the fourth mask 29.

Since the diameter of the contact hole including the surface of the Cr layer is on the order of several $\mu$m and the interval between the neighboring projection members 5a and 12a is tens of $\mu$m, it is possible to cover the surface of each contact hole including the surface of the Cr layer with the fourth mask 29 in such a manner that the fourth mask 29 is non-continuous between the neighboring projection members 5a and 12a. In this manner, the exposed surface not covered by the fourth mask 29 may be only the portion of the insulating substrate 1 between the respective projection members 5a and 12a.

Referring to FIGS. 50, 54f, 56f, 58f, 60f and 62f, a rough surface 1a then is formed in a preset area of the insulating substrate 1 by wet etching, employing HF (hydrofluoric acid), sandblasting, or dry etching, employing $CF_4$ or $O_2$, a rough surface 1a is formed. The resulting product is washed and the first mask is removed.

Referring to FIGS. 51, 54g, 56g, 58g, 60g and 62g, a layer of a reflector, formed by a metal layer 4b of, for example, Al/Nd (referred to below as 'Al/Nd'), is formed on the entire surface of the substrate including the passivation film 12.

Referring to FIGS. 51, 54g, 56g, 58g, 60g and 62g, a fifth mask, not shown, is formed, by the photolithography technique, on the layer of the reflector. Then, unneeded portions of the layer of the reflector are removed by for example dry etching or wet etching. The fifth mask then is removed. This forms the reflector 4b.

In the case of the reflection type apparatus, no aperture is provided in the reflector 4, whereas, in the semi-transmission type apparatus, an aperture 4c is provided in the reflector 4. The reflector 4 connects to the source electrode 8 through the contact hole 6. Since the reflector (Al/Nd) 4 is of a material different than the source electrode (Cr) 8, the layer of the reflector can be selectively etched, based on the difference in the selection ratio, so that the Cr layers 2a, 8a, 10a, 17a, 18a, 19a, 20a, 20d, 20e, 21a and 22a can be exposed from the contact holes 13, 17c, 18c, 19b, 20c, 21c, 22c. On the other hand, the reflector 4b, above the roughened surface formed by the rough surface 1a and the projection members 5a and 12a, is electrically connected to the reflector 4b above the TFT 11.

Referring to FIGS. 52, 54h, 56h, 58h, 60h and 62h, the transparent electrode layers 14, 17d, 18d, 19c, 20g and 23 of, for example, ITO, are deposited by for example sputtering on the entire substrate surface which includes the passivation film 12.

Finally, referring to FIGS. 52, 54h, 56h, 58h, 60h and 62h, a sixth mask, not shown, is formed, by the photolithography technique, on the transparent electrode layers 14, 17d, 18d, 19c, 20g and 23. Then, redundant portions of the transparent electrode layers are removed by for example wet etching. The sixth mask then is removed. This forms a transparent electrode 14 which later becomes pixel electrodes, a terminal 17d of the gate terminal unit, a terminal 18d of the drain terminal unit, a terminal 19c of the common terminal unit, a wiring 20g of the common terminal unit and a wiring 23 across the common bus lines 21 and 22.

It is noted that the transparent electrode 14 electrically connects to the source electrode 8a through the contact hole 13. The terminal 17d of the gate terminal unit, the terminal 18d of the drain terminal unit and the terminal 19c of the common terminal unit connect to the Cr layers 17a, 18a and 19a of the respective units through contact holes 17c, 18c and 19b of the respective units. Through two contact holes 20c of an optional combination, the wiring 20f of the common device unit electrically connects the gate bus line 2 to the source/drain electrode 20a of the common device unit, while connecting the common bus line 22 to the gate electrode 20e of the common device unit, connecting the common bus line 21 to the source/drain electrode 20a of the common device unit and connecting the drain bus line 10 to the gate electrode 20e of the common device unit. The wiring 23 across the common bus lines 21 and 22 electrically connects the common bus lines 21 and 22 across the contact holes 21c and 22c.

The above process renders it possible to manufacture an active matrix substrate having a structure shown in FIG. 52. With the manufacturing method for the active matrix substrate according to the fourth embodiment, a reflection or semi-transmission type active matrix substrate, with an optimum display function, having a reflector presenting a rough surface, may be produced, using only six masks, thus achieving a process simplified by at least one PR step as compared to the conventional manufacturing method.

A fifth embodiment of the present invention is now explained by referring to the drawings. FIGS. 63 to 68 are plan views schematically illustrating the manufacturing method for the active matrix substrate in a liquid crystal display apparatus according to the sixth embodiment of the present invention. FIG. 69a to FIG. 78h are cross-sectional views schematically illustrating the manufacturing process for the active matrix substrate in a liquid crystal display apparatus according to the fifth embodiment of the present invention. In FIGS. 69 and 70, FIGS. 71 and 72, FIG. 73, FIG. 74 and in FIGS. 75 and 76, the section lines are A–A', B–B', C–C', D–D' and E–E', respectively.

Figure 68:
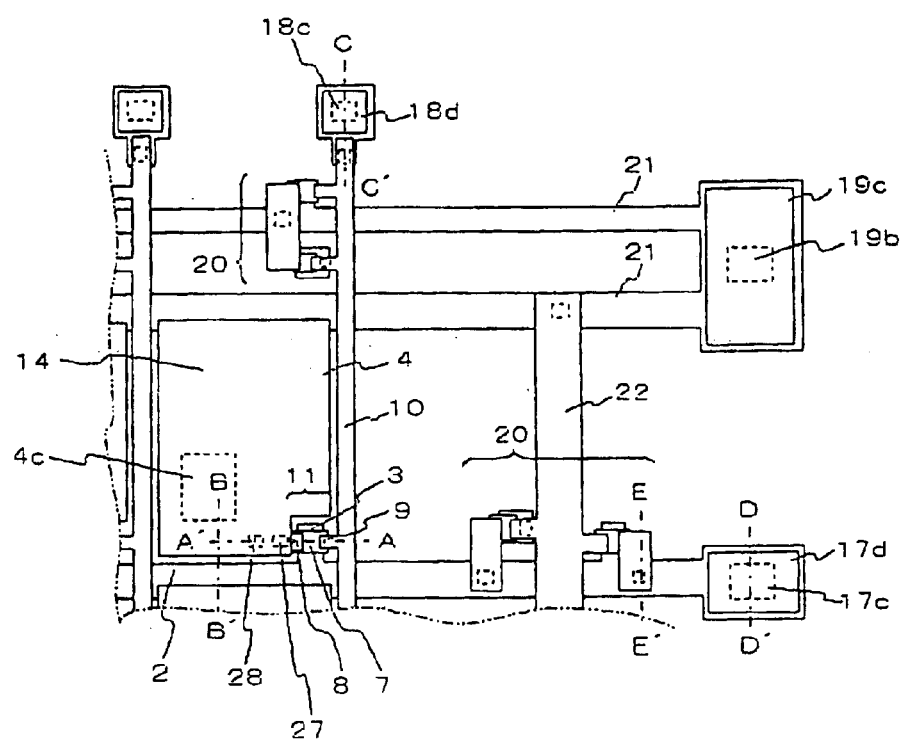
FIG. 68 is a sixth plan view schematically showing the production process of the active matrix substrate in the liquid crystal display apparatus according to the fifth embodiment of the present invention.
Figure 69A:
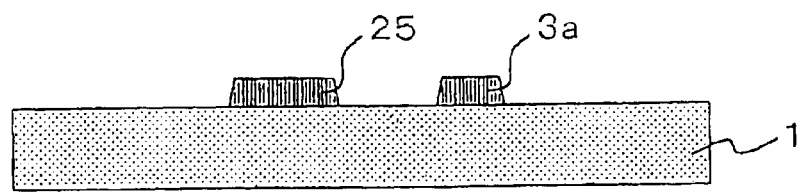
FIGS. 69a–69d are first cross-sectional views along line A–A' schematically showing the production process of the active matrix substrate in the liquid crystal display apparatus according to the fifth embodiment of the present invention.
Figure 69B:
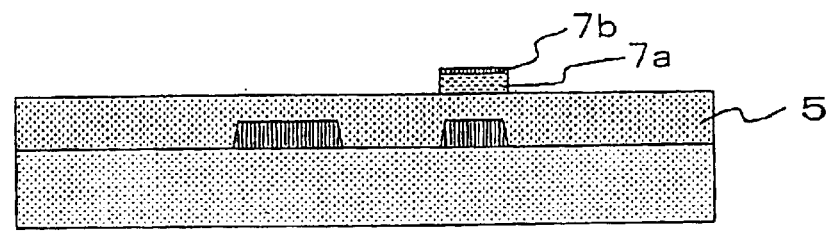
Figure 69C:
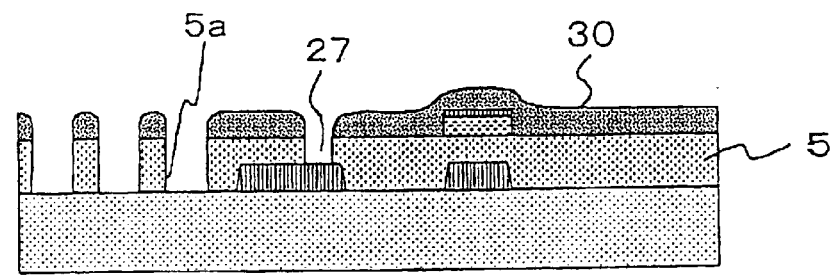
Figure 69D:
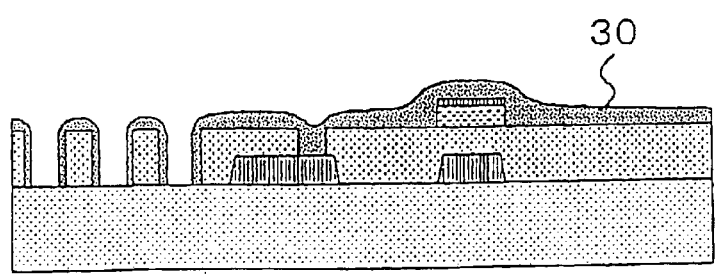
Figure 70E:
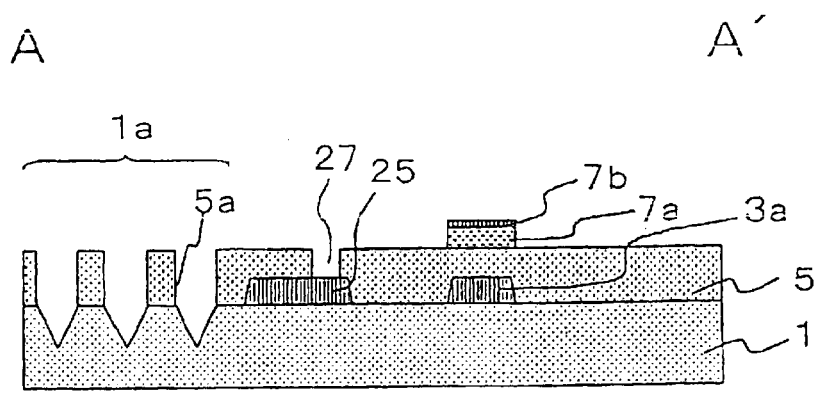
FIGS. 70e–70h are second cross-sectional views along line A–A' schematically showing the production process of the active matrix substrate in the liquid crystal display apparatus according to the fifth embodiment of the present invention.
Figure 70F:
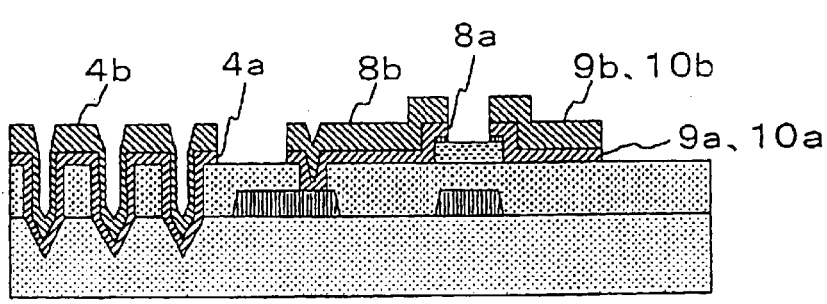
Figure 70G:
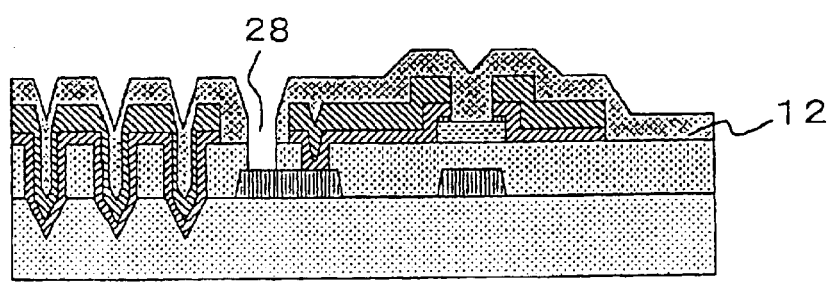
Figure 70H:
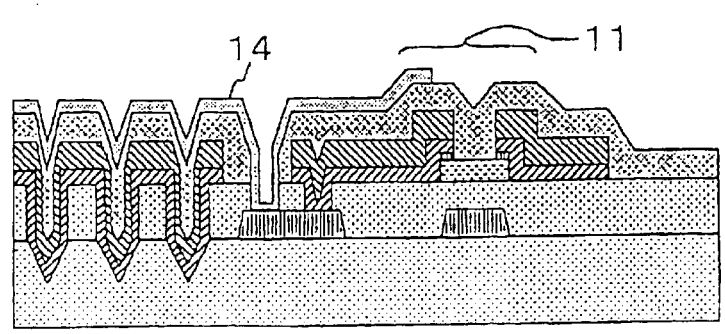
Figure 71A:
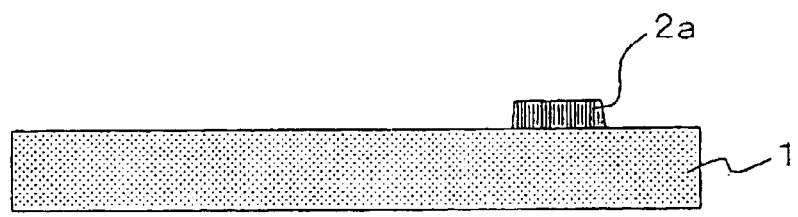
FIGS. 71a–71d are first cross-sectional view along line B–B' schematically showing the production process of the active matrix substrate in the liquid crystal display apparatus according to the fifth embodiment of the present invention.
Figure 71B:
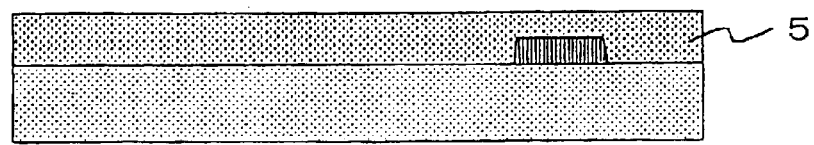
Figure 71C:
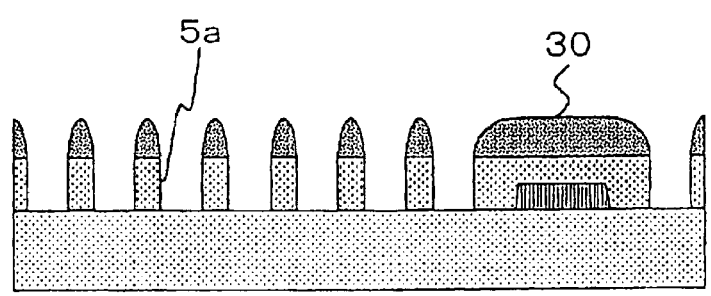
Figure 71D:
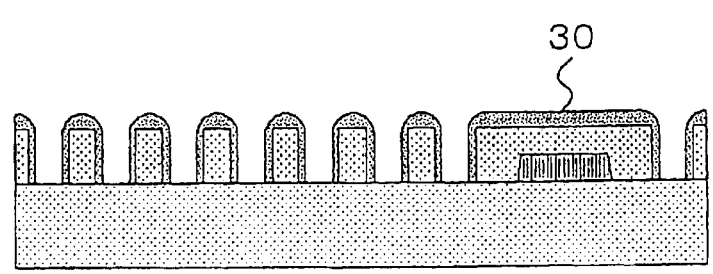
Figure 72E:
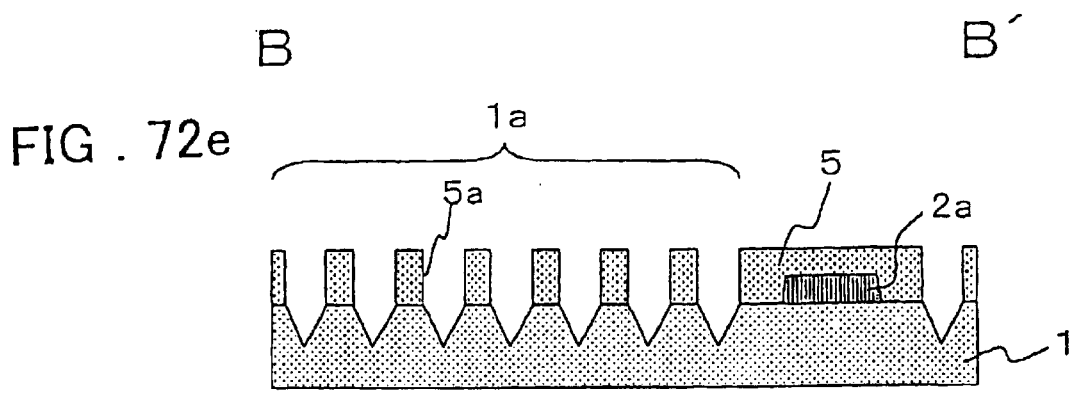
FIGS. 72e–72h are second cross-sectional views along line B–B' schematically showing the production process of the active matrix substrate in the liquid crystal display apparatus according to the fifth embodiment of the present invention.
Figure 72F:
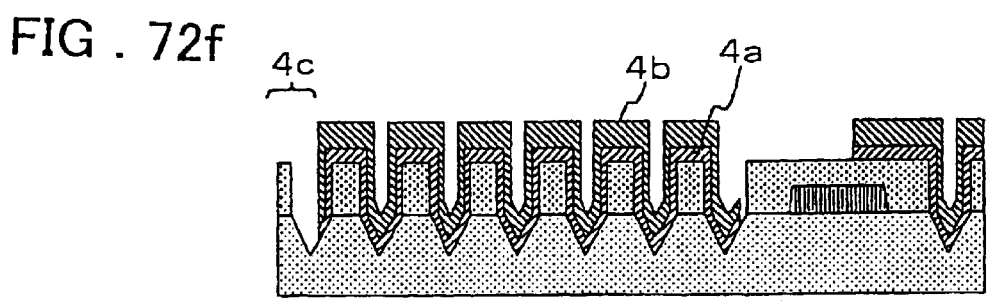
Figure 72G:
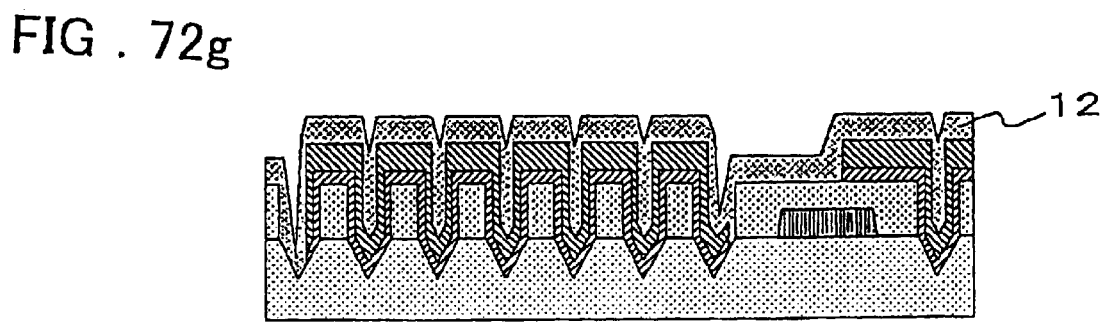
Figure 72H:
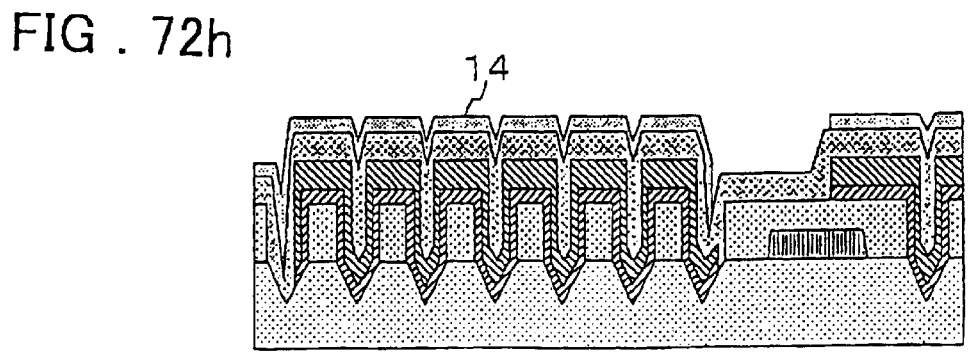
Figure 73A:
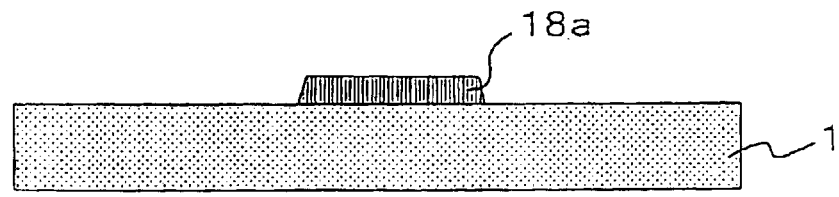
FIGS. 73a–73d are first cross-sectional views along line C–C' schematically showing the production process of the active matrix substrate in the liquid crystal display apparatus according to the fifth embodiment of the present invention.
Figure 73B:
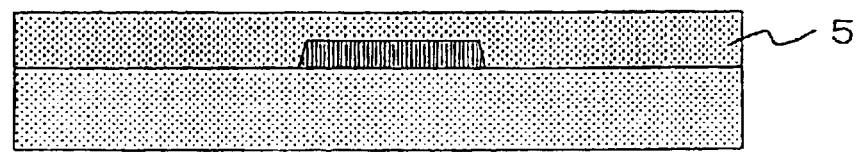
Figure 73C:
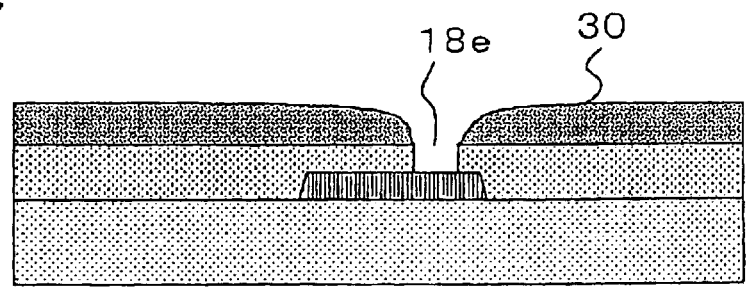
Figure 73D:
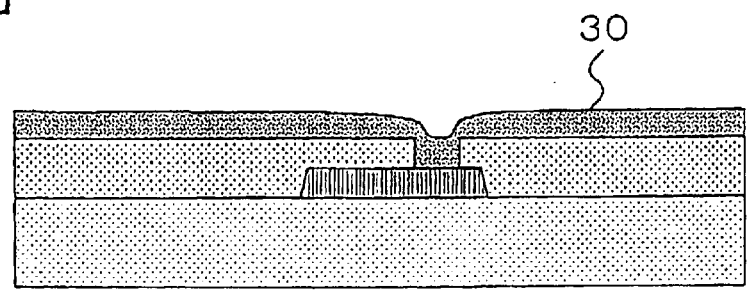
Figure 74E:
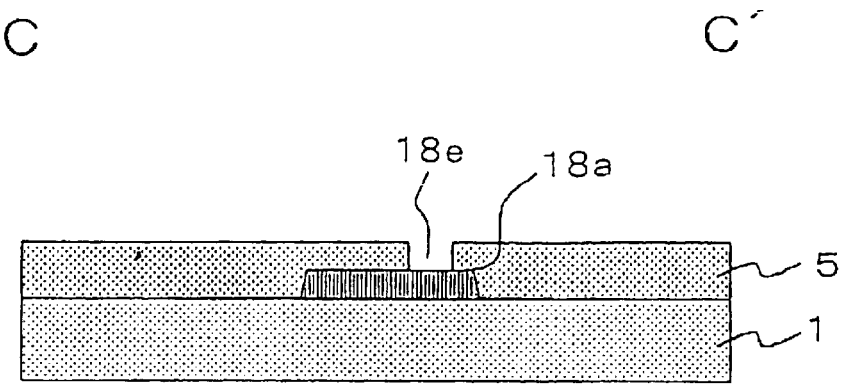
FIGS. 74e–74h are second cross-sectional views along line C–C' schematically showing the production process of the active matrix substrate in the liquid crystal display apparatus according to the fifth embodiment of the present invention.
Figure 74F:
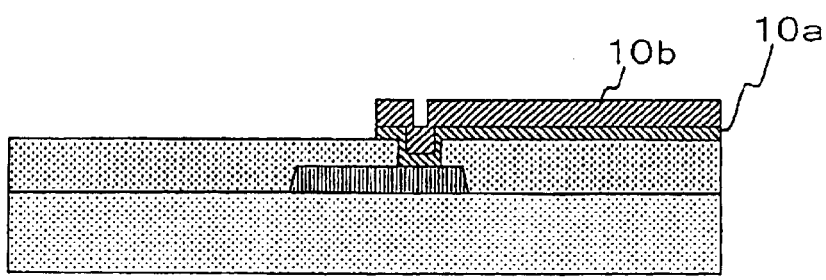
Figure 74G:
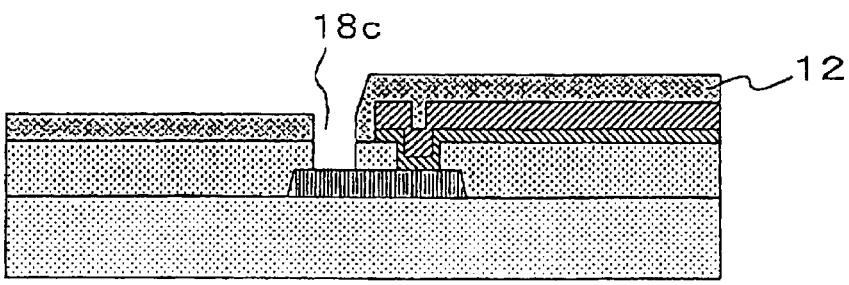
Figure 74H:
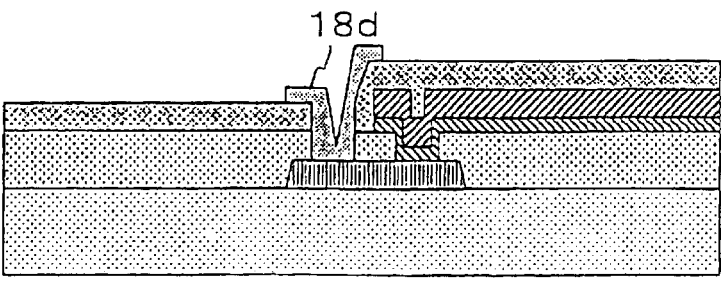
Figure 75A:
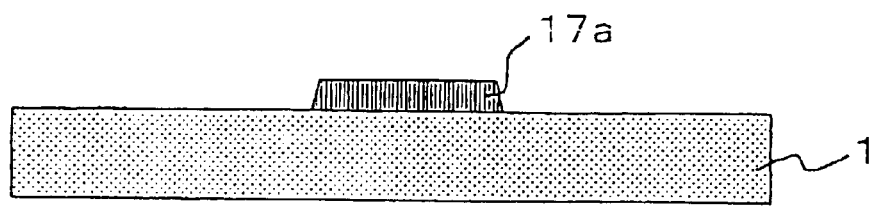
FIGS. 75a–75d are first cross-sectional views along line D–D' schematically showing the production process of the active matrix substrate in the liquid crystal display apparatus according to the fifth embodiment of the present invention.
Figure 75B:
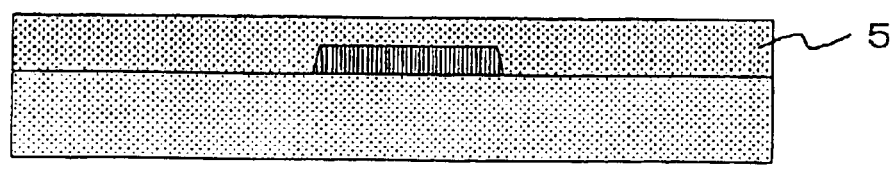
Figure 75C:
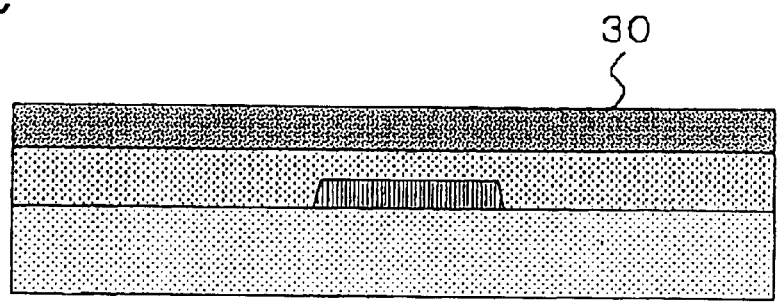
Figure 75D:
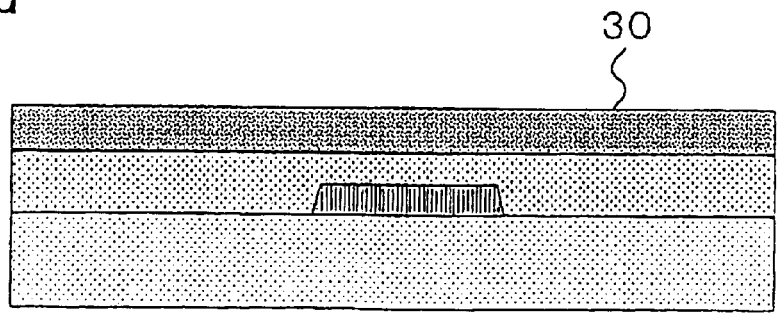
Figure 76E:
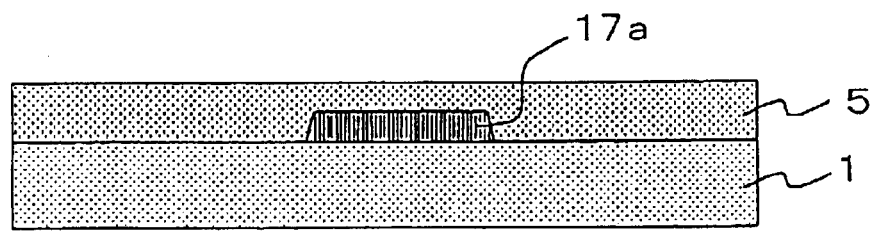
FIGS. 76e–76h are second cross-sectional views along line D–D' schematically showing the production process of the active matrix substrate in the liquid crystal display apparatus according to the fifth embodiment of the present invention.
Figure 76F:
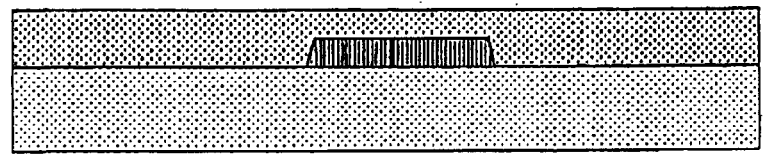
Figure 76G:
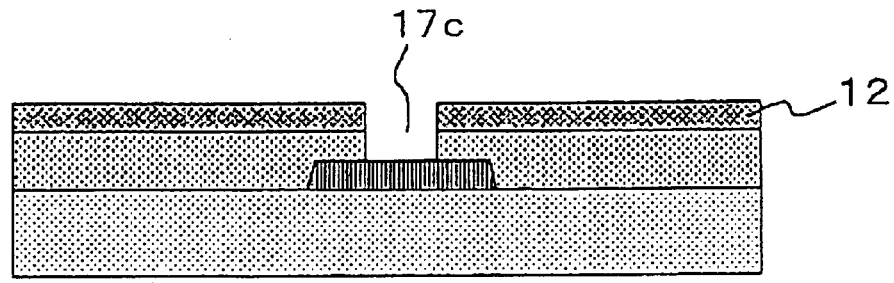
Figure 76H:
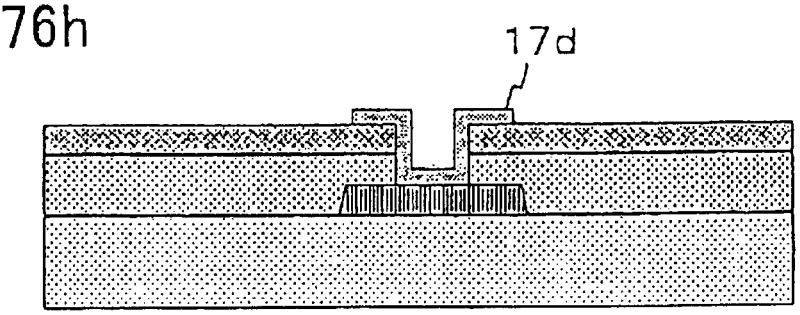
Figure 77A:
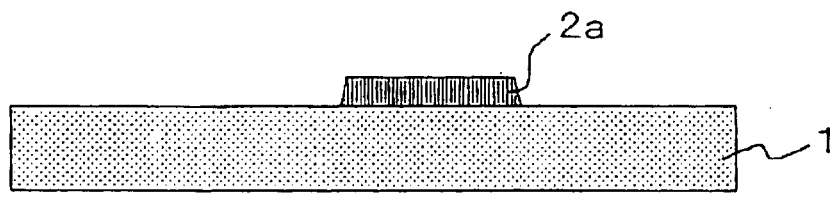
FIGS. 77a–77d are first cross-sectional views along line E–E' schematically showing the production process of the active matrix substrate in the liquid crystal display apparatus according to the fifth embodiment of the present invention.
Figure 77B:
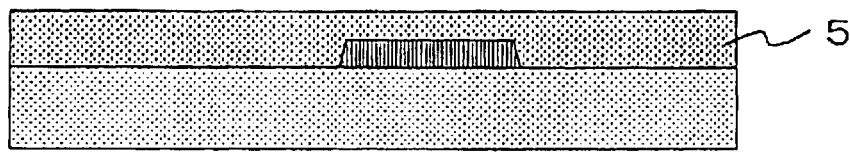
Figure 77C:
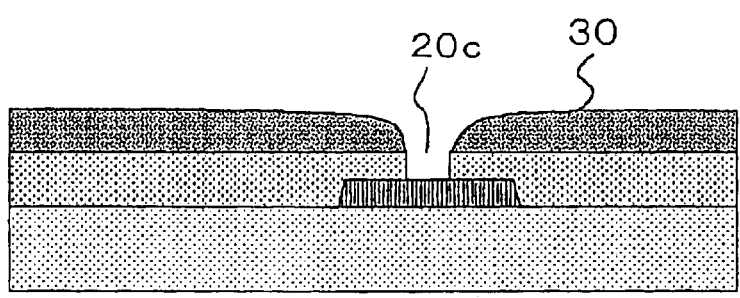
Figure 77D:
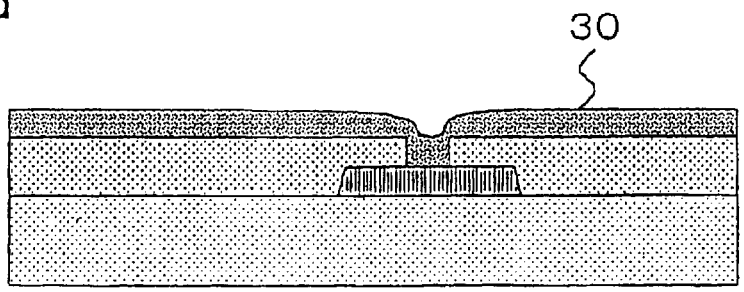
Figure 78E:
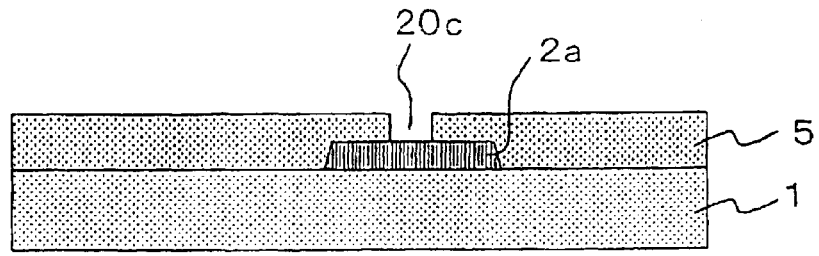
FIGS. 78e–78h are second cross-sectional views along line E–E' schematically showing the production process of the active matrix substrate in the liquid crystal display apparatus according to the fifth embodiment of the present invention.
Figure 78F:
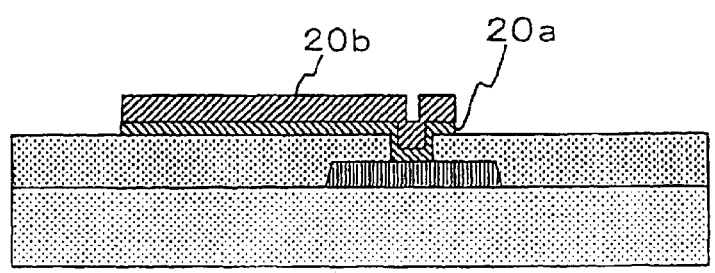
Figure 78G:
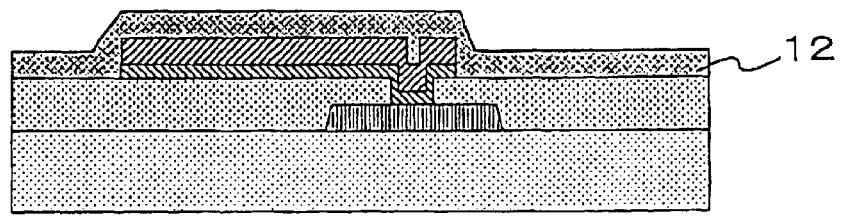
Figure 78H:
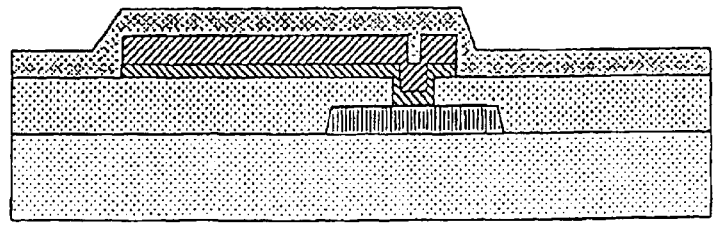

Referring to FIGS. 68 to 70, the active matrix substrate according to the fifth embodiment is constructed as follows. It is noted that the structure of the liquid crystal display apparatus except the active matrix substrate is the same as that of the first embodiment.

In an area of the planar surface of the insulating substrate 1, presenting the rough surface 1a in a preset area thereof, plural gate lines 2 are arranged parallel to one another. From each gate bus line 2 is branched a gate electrode 3.

On the insulating substrate 1, including a gate electrode 3, there is formed a gate insulating film 5 formed of, for example, $SiN_x$. On the planar top surface in the rough surface 1a on the insulating substrate 1, there are provided projection members Sa formed of the same metal as the gate insulating film 5, such as $SiN_x$. The projection members 5a serve as the basis in forming the rough surface of a reflector 4 along with the rough surface 1a of the insulating substrate 1. Between the projection members 5a on the insulating substrate 1 and the gate electrode 3, there is formed a shorting prohibiting wiring 25 for preventing shorting across the reflector 4 and the gate electrode 3 and for separating the projection members 5a from the gate electrode 3.

On the insulating substrate 1, including the gate electrode 3 and the shorting prohibiting wiring 25, a gate insulating film 5 of for example SiNx is formed. The gate insulating film 5 includes contact holes 27 and 28, at preset positions on the shorting prohibiting wiring 25 for exposing this shorting prohibiting wiring 25. The contact hole 27 is a hole for electrically connecting the source electrode 8 and the shorting prohibiting wiring 25. The contact hole 28 is a hole for electrically interconnecting the transparent electrode 14 and the shorting prohibiting wiring 25.

On the gate insulating film 5 overlying the gate electrode 3, there is formed an island 7 comprised of a semiconductor layer 7a and a contact electrode 7b, laminated in this order.

Towards one end and the other end on the island 7, there are formed a source electrode 8 (8a and 8b) and a drain electrode 9 (9a, 9b), respectively. The source electrode 8 is electrically connected through the contact hole 27 to the shorting prohibiting wiring 25. The reflector 4 (4a and 4b) is formed, without separation in the same layer as the source electrode 8, in an area overlying the roughened surface formed by the rough surface 1a of the insulating substrate 1 and the projection members 5a. The surface of the reflector 4 presents a rough surface substantially similar to the roughened surface formed by the rough surface 1a of the insulating substrate 1 and the projection member 26, with the maximum height of the surface roughness being on the order of two to three $\mu$m, with the separation between the crests of the neighboring projection member 26 being tens of $\mu$m. In the case of the semi-transmission type liquid crystal display apparatus, there is formed an aperture 4c in a portion of the area of the rough surface in the reflector 4 for transmitting the backlight. In the case of the reflection type liquid crystal display apparatus, no aperture 4c is provided in the area of the rough surface of the reflector 4. Although the crests and dents of the rough surface as shown in the drawings are seen to be pointed these crests and dents are actually rounded smoothly. The drain electrode 9 is branched from the drain bus line 10 (10a, 10b) intersecting the gate bus line 2 through the gate insulating film 5.

The gate electrode 3, gate-insulating film 5, island 7, source electrode 8 and the drain electrode 9 constitute a thin-film transistor (TFT) 11. This TFT 11 operates as a switching device.

On the entire surface of the substrate including the TFT 11 and the reflector 4, there is formed a passivation film 12. The passivation film 12 includes a first contact hole 28 corresponding to the contact hole 28 in the gate insulating film 5 for exposing the shorting prohibiting wiring 25. The contact hole 28 electrically connects the shorting prohibiting wiring 25 to the transparent electrode 14.

The transparent electrode 14, provided in an area including the passivation film 12, is electrically connected to the shorting prohibiting wiring 25 through the contact hole 28. The transparent electrode 14 operates as a pixel electrode along with the reflector 4.

The production process for producing the active matrix substrate in the liquid crystal display apparatus according to the fifth embodiment is hereinafter explained.

Referring first to FIGS. 63, 69a, 71a, 73a, 75a and 77a, a gate electrode layer (Cr layer, not shown), which is to become the underlying metal layers 2a, 3a, 17a, 18a, 19a, 20d, 20e, 21a and 25, is formed on the entire surface of the insulating substrate 1 having a planar surface.

Then, referring to FIGS. 63, 69a, 71a, 73a, 75a and 77a, a first mask, not shown, is formed on the gate electrode layer by the photolithography technique. Then, unneeded portions of the gate electrode layer are removed by for example dry etching or wet etching. The first mask then is removed. This sequentially forms the gate bus line 2, gate electrode 3, underlying metal layer 17a for the gate terminal unit, underlying metal layer 19a for the common terminal unit, gate electrodes 20d, 20e for the common device unit, common bus line 21 for the drain, and the shorting prohibiting wiring 25.

Then, referring to FIGS. 64, 69b, 71b, 73b, 75b and 77b, the gate insulating film 5 of, for example, SiN$_x$, the a-Si layer 7a, which becomes the semiconductor layer, and the n$^+$ type a-Si layer 7b, which becomes the contact electrode, are sequentially formed on the entire substrate surface comprising the gate bus line 2, gate electrode 3, underlying metal layer 17a for the gate terminal unit, underlying metal layer 18a for the drain terminal unit, underlying metal layer 19a for the common terminal unit, gate electrodes 20d, 20e for the common device unit, common bus line 21 for the drain and the shorting prohibiting wiring 25.

Then, referring to FIGS. 64, 69b, 71b, 73b, 75b and 77b, a second mask, not shown, is formed by the photolithography technique on the n$^+$ type a-Si layer 7b. Then, unneeded portions of the a-Si layer 7a and the n$^+$ type a-Si layer 7b are removed, such as by dry etching, and subsequently the second mask is removed. This forms islands 7, 20f.

Referring to FIGS. 65, 69c, 71c, 73c, 75c and 77c, a third mask 30 is formed on the gate insulation film 5, including the islands 7 and 20f, by the photolithography technique. Then, excess portions of the gate insulating film 5, lying in an area which later becomes the contact hole, other than the projection members 5a, are removed by e.g., dry etching, until the Cr layers 2, 18a, 20e, 21 and 25 are partially exposed. This forms contact holes 18e, 20c, 21c and 27. At this stage, the third mask 30 has not been removed.

It is noted that the contact hole 18e partially exposes part of the Cr layer 18a of the drain terminal unit. The contact hole 20c partially exposes part of the Cr layers 2, 20a, 20e and 21 of the common device unit. The contact hole 21c partially exposes part of the common bus line 21. The contact hole 27 partially exposes part of the shorting prohibiting wiring 25.

Referring to FIGS. 65, 69d, 71d, 73d, 75d and 77d, exposed sidewall sections of the gate insulating film 5 and the projection members 5a and near-by surface portions of the insulating substrate 1 are covered by the third mask 30, by reflow processing, which is carried out to such an extent that only the third mask 29 is melted. The third mask 30 closes the contact holes 18e, 20c, 21c and 27 as well as the exposed surface portions of the Cr layers 2, 18e, 20e, 21 and 25.

Since the diameter of the contact hole including the surface of the Cr layer is on the order of several $\mu$m, the spacing between the gate electrode 3 and the shorting prohibiting wiring 25 is several $\mu$m and the interval between the projection members 5 is tens of $\mu$m, it is possible for the third mask 30 to be non-continuous between the neighboring projection members 5a and for the first masks 24 to be continuous between the gate electrode 3 and the shorting prohibiting wiring 25. In this manner, it becomes possible for only the portion of the insulating substrate 1 lying between the neighboring projection members 5a to be the exposed surface not covered by the third mask 30. The reason why the contact hole is stopped up with the third mask 30 is that, if the metal layer is exposed from the contact hole, HF used for etching the insulating substrate (glass) might be permeated to the metal layer to etch the glass underlying the metal layer.

Referring to FIGS. 65, 70e, 72e, 74e, 76e and 78e, a rough surface 1a is formed in a preset area of the insulating substrate 1 by wet etching, employing HF (hydrofluoric acid), sandblasting, or dry etching, employing CF$_4$ or O$_2$. The resulting product is washed and the third mask is removed.

Referring to FIGS. 66, 70f, 72f, 74f, 76f and 78f, underlying metal layers 4a, 8a, 9a, 10a and 22a (referred to below as 'Cr') are formed on the entire substrate surface including the gate insulating film 5, projection members 5a and the island 7, and overlying metal layers 4b, 8b, 9b, 10b and 22b of, for example, Al/Nd (referred to below as 'Al/Nd'), are sequentially stacked in this order to form a source/drain electrode layer, not shown.

Referring to FIGS. 66, 70f, 72f, 74f, 76f and 78f, a fourth mask, not shown, is formed, by the photolithography technique, on the source/drain electrode layer. Then, unneeded portions of the source/drain electrode layer and the n$^+$ type a-Si layer 7b are removed by for example dry etching or wet etching. This forms the reflector 4, source electrode 8, drain electrode 9, and drain bus line 10, source/drain electrodes 20a, 20b for the common device unit and the common bus line 22 for the gate. At this stage, the fourth mask has not been removed.

In the case of the reflection type apparatus, no aperture is provided in the reflector 4, whereas, in the semi-transmission type apparatus, there is formed an aperture 4c in the reflector 4. The reflector 4 is connected to the source electrode 8, which source electrode 8 is connected to the shorting prohibiting wiring 25 through the contact hole 27. The source/drain electrodes 20a and 20b for the common device unit are connected through the contact hole 20c to the gate bus line 2, gate electrode 20e of the common device unit or to the common bus line 22 for the gate. The common bus line 22 for the gate is connected through the contact hole 21c to the common bus line 21 for the drain.

The n$^+$ type a-Si layer 7b then is etched, using the source electrode 8a, drain electrode 9a and the fourth mask, as etching masks. The fourth etching mask then is removed. This forms an ohmic contact layer.

Referring to FIGS. 67, 70g, 72g, 74g, 76g and 78g, a passivation film 12 is formed, by the plasma CVD method, on the entire surface of the gate insulating film 5, including the reflector 4, source electrode 8, drain electrode 9, drain bus line 10, source/drain electrodes 20a and 20b for the common device unit and the common bus line 22 for the gate.

Referring to FIGS. 67, 70g, 72g, 74g, 76g and 78g, a fifth mask, not shown, is formed on the passivation film 12, by the photolithography technique. Then, excess portions of the passivation film 12 or the gate insulating film 5, lying in an area which later becomes the contact hole, are removed by e.g., dry etching, until the Cr layers 17a, 18a, 19a and 25 are partially exposed. The fifth mask then is removed. This forms contact holes 17c, 18c, 19b and 28.

It is noted that the contact hole 17c partially exposes part of the Cr layer 17a of the gate terminal unit. The contact hole 18c partially exposes part of the Cr layer 18a of the drain terminal unit. The contact hole 19b partially exposes part of the Cr layer 19a of the common terminal unit, while the contact hole 28 exposes part of the shorting prohibiting wiring 25.

Referring to FIGS. 68, 70h, 72h, 74h, 76h and 78h, the transparent electrode layers 14, 17d, 18d, 19c, 20g and 23 of, for example, ITO, are deposited by for example sputtering on the entire substrate surface which includes the passivation film 12.

Finally, referring to FIGS. 68, 70h, 72h, 74h, 76h and 78h, a sixth mask is formed, by the photolithography technique, on the transparent electrode layers 14, 17d, 18d and 19c. Then, unneeded portions of the transparent electrode layers are removed by for example wet etching. The sixth mask then is removed. This forms a transparent electrode 14 which later becomes pixel electrodes, a terminal 17d of the gate terminal unit, a terminal 18d of the drain terminal unit, and a terminal 19c of the common terminal unit.

It is noted that the transparent electrode 14 electrically connects to the shorting prohibiting wiring 25 through the contact hole 28. The terminal 17d of the gate terminal unit, the terminal 18d of the drain terminal unit and the terminal 19c of the common terminal unit connect to the Cr layers 17a, 18a and 19a of the respective units through contact holes 17c, 18c and 19b of the respective units.

The above process renders it possible to produce an active matrix substrate having a structure shown in FIG. 68. With the manufacturing method for the active matrix substrate according to the fifth embodiment, a reflection or semi-transmission type active matrix substrate, with an optimum display function, having a reflector presenting a rough surface, may be produced, using only six masks, thus achieving a process simplified by at least one PR(photolithography ) process as compared to the conventional manufacturing method.

The production process for the active matrix substrate in the liquid crystal display apparatus according to the sixth embodiment is now explained by referring to the drawings. FIGS. 79 and 80 are cross-sectional views schematically illustrating the manufacturing process for the active matrix substrate in the liquid crystal display apparatus of the sixth embodiment of the present invention.

Figure 79A:
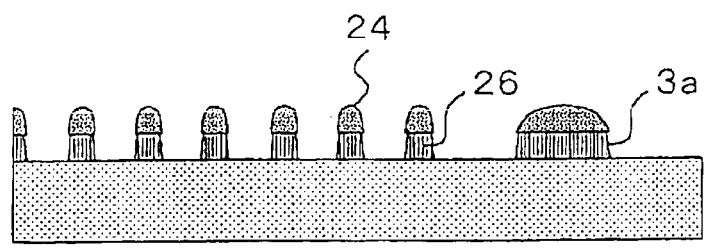
FIGS. 79a–79d are first cross-sectional views schematically showing the production process of an active matrix substrate in the liquid crystal display apparatus according to a sixth embodiment of the present invention.

Referring to FIG. 79a, a gate electrode layer, not shown, which later becomes layers 2a, 3a and 26 of metal, such as Cr, is formed on the entire surface of the insulating substrate 1 having a planar surface.

Referring to FIG. 79a, a first mask 24 is formed on the gate electrode layer by the photolithography technique. Then, unneeded portions of the gate electrode layer are removed by for example dry etching or wet etching. This forms the gate bus line 2a, gate electrode 3a and the projection member 26. At this stage, the first mask 24 has not been removed.

Figure 79B:
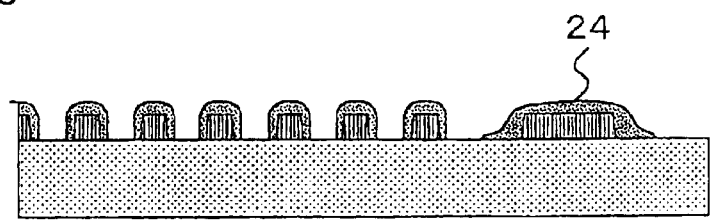

Referring to FIG. 79b, exposed portions of the sidewalls of the gate bus line 2a, gate electrode 3a and the projection member 26 and the near-by surface portions of the insulating substrate 1 are covered by the first mask 24 by reflow processing which is carried out to such an extent that only the first mask 24 is melted.

If now the spacing between neighboring projection members 26 is set to tens of μm, it is possible for the first masks 24 not to be continuous between neighboring projection members 26.

Figure 79C:
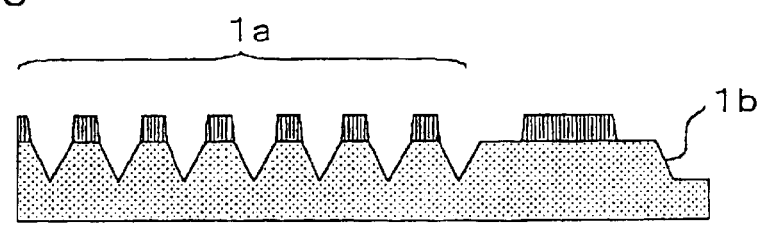

Then, referring to FIG. 79c, a rough surface 1a is formed in a preset area of the insulating substrate 1 by e.g., dry etching, such as wet etching, employing HF (hydrofluoric acid), sandblasting, or dry etching, employing $CF_4$ or $O_2$. The resulting product is washed and the first mask is removed.

Then, referring to FIG. 79d, the gate insulating film 5 of for example SiNx, a-Si layer 7a which later becomes the semiconductor layer, and the $n^+$ type a-Si layer 7b which later becomes the contact electrode, are sequentially formed on the entire surface of the substrate including the gate bus line 2a and the gate electrode 3a.

Figure 79D:
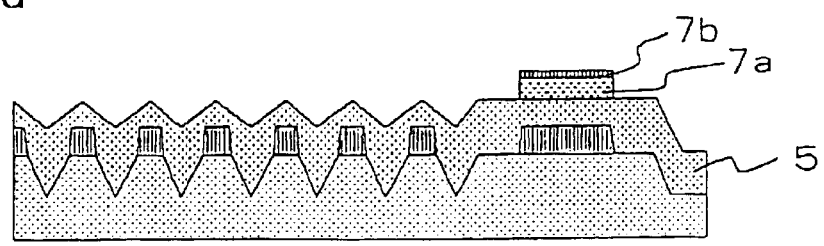

Then, referring to FIG. 79d, a second mask, not shown, is formed on the $n^+$ type a-Si layer 7b by the photolithography technique. Then, unneeded portions of the a-Si layer 7a and the $n^+$ type a-Si layer 7b are removed such as by dry etching and subsequently the second mask is removed. This forms islands 7a and 7b.

Figure 80E:
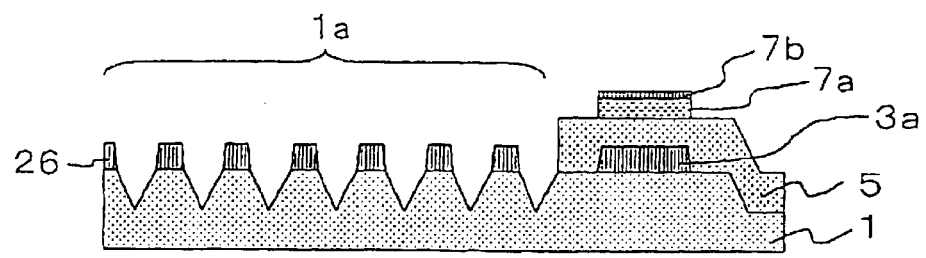
FIGS. 80e–80h are second cross-sectional views schematically showing the production process of an active matrix substrate in the liquid crystal display apparatus according to the sixth embodiment of the present invention.

Referring to FIG. 80e, a third mask, not shown, is formed on the gate insulating film 5 and on the $n^+$ type a-Si layer 7b, by the photolithography technique. Then, unneeded portions of the gate insulating film 5 are removed by for example dry etching, and subsequently the third mask is removed. This exposes the rough surface 1a of the insulating substrate 1 and the projection member 26.

Then, referring to FIG. 80f, underlying metal layers 4a, 8a, 9a and 10a of for example Cr (referred to below as 'Cr'), and overlying metal layers 4b, 8b, 9b and 10b of for example Al/Nd (referred to below as 'Al/Nd'), are stacked in this order on the entire substrate surface to form a source/drain electrode layer. This source/drain electrode layer is provided on the rough surface 1a of the insulating substrate 1.

Figure 80F:
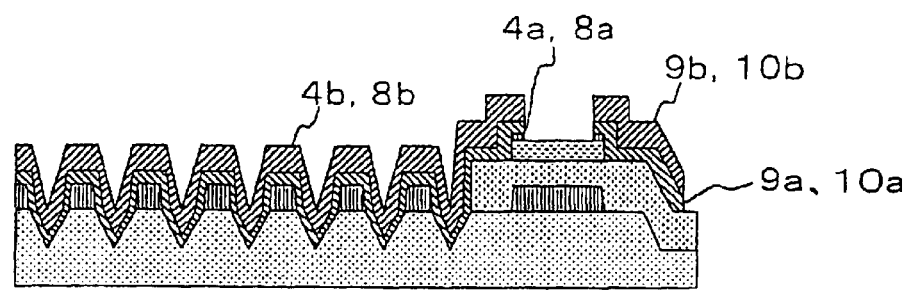

Referring now to FIG. 80f, a fourth mask, not shown, is formed by the photolithography technique on a source/drain electrode layer. Then, unneeded portions of the source/drain electrode layer are removed by for example dry etching or wet etching. This forms the reflectors 4a and 4b, source electrodes 8a and 8b, drain electrodes 9a and 9b, and drain bus lines 10a and 10b. The reflectors 4a and 4b are formed on the same layer of the source electrodes 8a and 8b and are arranged in continuation to the source electrodes 8a and 8b.

Then, using the metal layers, such as source electrode 8 or the drain electrode 9, as etching masks, the $n^+$ type a-Si layer 7b is etched, and subsequently the fourth mask is removed to form an ohmic contact layer.

Figure 80G:
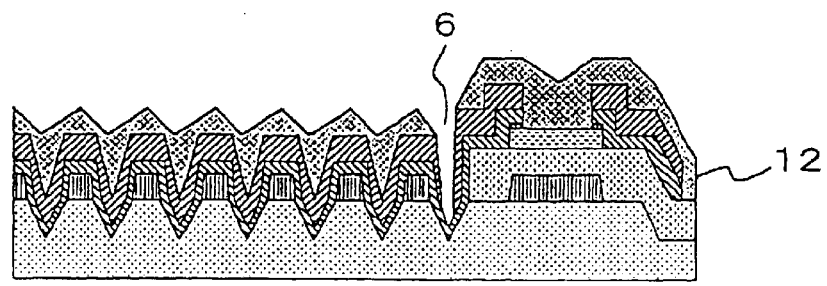

Then, referring to FIG. 80g, the passivation film 12 is deposited on the entire surface of the gate insulating film 5, including the reflector 4, a-Si layer 7a, source electrode 8, drain electrode 9 and the drain bus line 10 by e.g., the plasma CVD method.

Referring to FIG. 80g, a fifth mask, not shown, is formed on the passivation film 12 by the photolithography technique liquid. Then, unneeded portions of the passivation film 12 and the gate insulating film 5, lying in an area which later becomes the contact hole, are removed by for example dry etching, until the Cr layer 3a is partially exposed. The fifth mask then is removed to form the contact hole 6. This contact hole partially exposes the Cr layer 4a of the reflector.

Figure 80H:
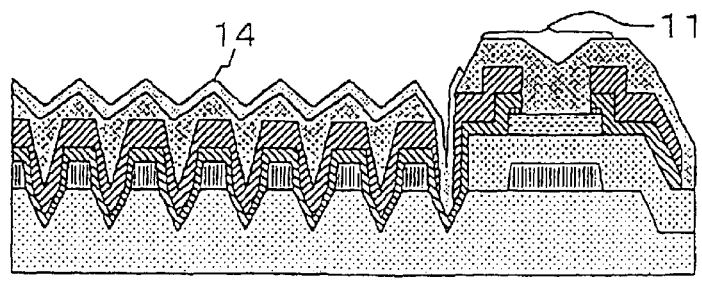
Figure 81A:
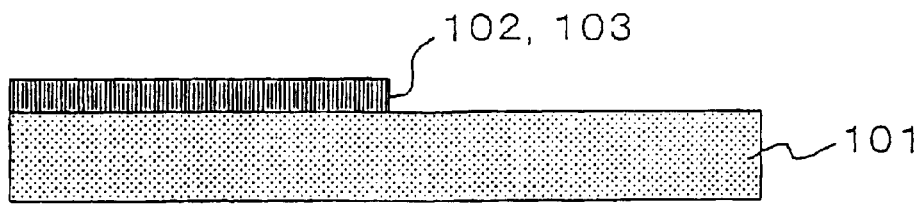
FIGS. 81a–81d are first cross-sectional views schematically showing the production process of an active matrix substrate for a conventional reflection type liquid crystal display apparatus.
Figure 81B:
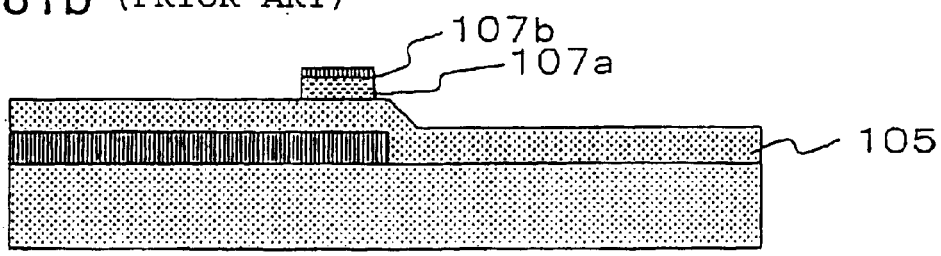
Figure 81C:
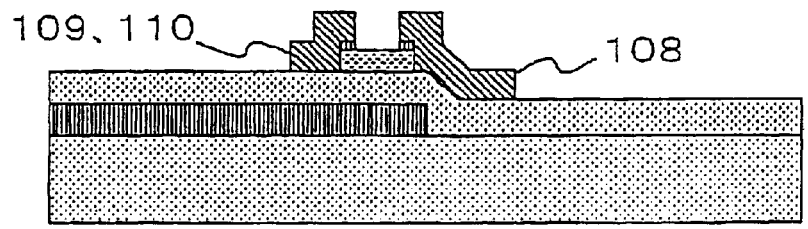
Figure 81D:
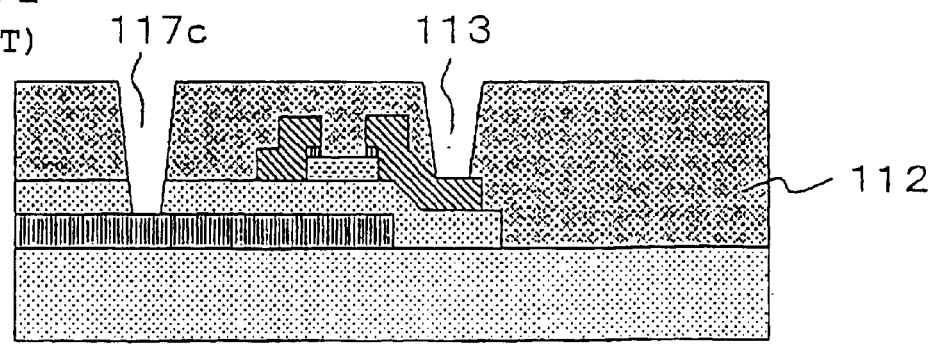
Figure 82E:
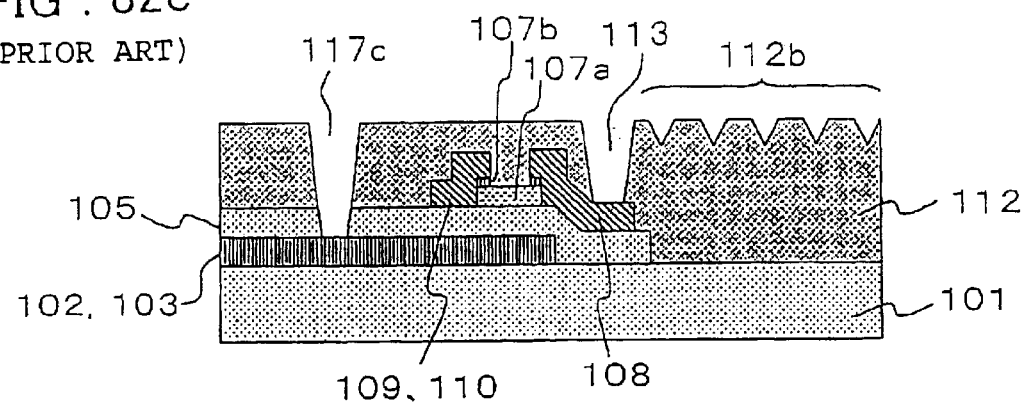
FIGS. 82e–82g are second cross-sectional views schematically showing the production process of an active matrix substrate for the conventional reflection type liquid crystal display apparatus.
Figure 82F:
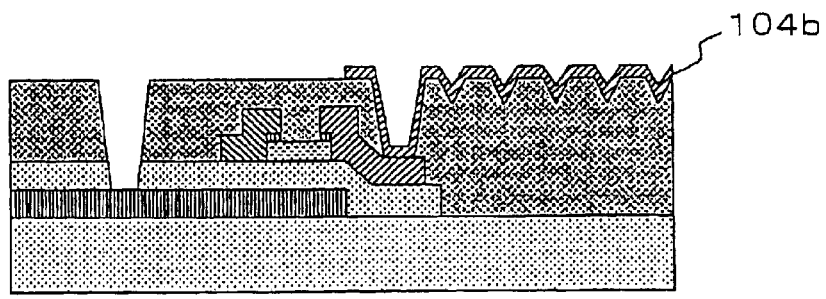
Figure 82G:
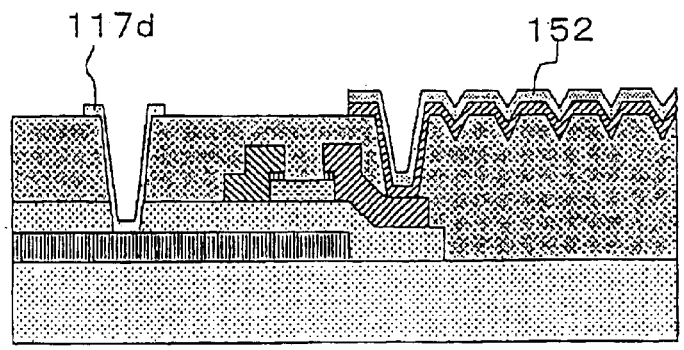

Then, referring to FIG. 80h, the transparent electrode layer 14 of for example ITO is deposited, such as by sputtering, on the entire surface of the substrate, including the passivation film 12.

Referring to FIG. 80h, a sixth mask, not shown, is finally formed, such as by a photolithography technique, on the transparent electrode layer 14, and excess portions of the transparent electrode layers are then removed, such as by wet etching. The sixth electrode then is removed. This forms the transparent electrode 14, which later becomes the pixel electrodes. The transparent electrode 14 is electrically connected through the contact hole 6 to the reflector 4.

The above process enables the active matrix substrate shown in FIG. 80h to be produced. Thus, with the method for the preparation of the active matrix substrate according to the seventh embodiment, a reflection or semi-transmission type active matrix substrate, with an optimum display function, having a reflector presenting a rough surface, may be produced, using only six masks, thus achieving a process simplified by at least one PR step as compared to the conventional manufacturing method.

The meritorious effects of the present invention are summarized as follows.

The present invention make it possible to produce an active matrix substrate having a reflector exhibiting optimum reflection performance, using only five or six masks, thus reducing the cost of the active matrix substrate.

This is made possible by reduction in the number of process steps, in turn made possible by effective utilization of the masks used in etching the gate electrode layer, gate insulating film, a-Si layer or the source/drain electrode layer by for example reflow processing to form plural recesses in the insulating substrate, and by forming excess portions of the metal layers, insulating layers or semiconductor layers as protrusions in the insulating substrate, in addition to the recesses. In this manner, a rough surface having pronounced inundations is produced by the recesses and protrusions to form a reflector exhibiting optimum reflection characteristics, in which the maximum height of the surface roughness is on the order of 1 to 3 µm. Moreover, with the PR used for forming the TFT can be formed not only the recesses and protrusions but also the common terminal unit and the common device unit.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items might fall under the modifications aforementioned.

What is claimed is:

1. A method for producing a liquid crystal display apparatus having a first substrate including a thin film transistor and a reflector on an insulating substrate, a second substrate having a transparent electrode and mounted facing said first substrate, and a liquid crystal layer placed between said first substrate and said second substrate; said method comprising:

a first step of forming an etching mask, patterned to a predetermined shape, on at least one of a metal layer, an insulating layer and a semiconductor layer, formed on said insulating substrate;

a second step of etching at least one of said metal layer, insulating layer and the semiconductor layer, using said etching mask, to expose portions of said insulating substrate and to form on said insulating substrate at least a constituent portion of said thin film transistor and a plurality of protrusions separated from said constituent portion;

a third step of causing only said etching mask to reflow to cover an exposed part of said constituent portion of said thin film transistor and near-by surface portions of said insulating substrate with said etching mask and to cover exposed surfaces of said protrusions and near-by surface portions of said insulating substrate, the reflow of the etching mask leaving exposed the surface portions of said insulating substrate located between neighboring protrusions;

a fourth step of etching said insulating substrate, following said third step, using said etching mask to form one or more recesses in the exposed areas of said insulating substrate, the protrusions and recesses forming a rough surface; and a fifth step of selectively forming a reflector having a rough surface on the rough surface formed at least by said protrusions and recesses.

2. The method as defined in claim 1 in which a metal layer and an insulation layer are formed in this order on said insulating substrate, said method comprising:

etching said insulating layer in said second step, using said etching mask, to expose portions of said metal layer through a contact hole; and said contact hole being stopped up with said etching mask by reflow of said etching mask in said third step.

3. The method as defined in claim 1 further comprising:

a sixth step following said fourth step and previous to said fifth step, said sixth step forming another insulating layer having a rough surface on a rough surface at least formed by said protrusions and recesses.

4. The method as defined in claim 1 wherein said etching mask is a photo resist.

5. The method as defined in claim 1 wherein there is arranged an aperture at a preset area on the rough surface of said reflector.

6. A method for producing a liquid crystal display apparatus having a first substrate including a thin film transistor and a reflector on an insulating substrate, a second substrate having a transparent electrode and mounted facing said first substrate, and a liquid crystal layer placed between said first substrate and said second substrate; said method comprising:

a first step of etching a metal layer, using a first etching mask, following the formation of said metal layer on said insulating substrate, to expose a portion of said insulating substrate and to form a gate electrode;

a second step of forming an insulating layer on said insulating substrate including said gate electrode and subsequently etching said insulating layer, using a second etching mask, to expose portions of said insulating substrate and to form a gate insulating film and a plurality of protrusions separated from said gate insulating film;

a third step of causing only said second etching mask to reflow to cover exposed portions of said gate insulating film and near-by surface portions of said insulating substrate with said etching mask and to cover exposed surfaces of said protrusions and near-by surface portions of said insulating substrate, while leaving exposed the surface portions of said insulating substrate between neighboring protrusions;

a fourth step of etching said insulating substrate, following said third step, using said second etching mask, to form one or more recesses in exposed areas of said insulating substrate; and a fifth step of selectively forming a reflector having a rough surface on a rough surface formed at least by said protrusions and recesses.

7. The method as defined in claim 6 further comprising a sixth step of forming a semiconductor layer on said insulating layer following formation of said insulating layer and prior to using said second etching mask in said second step, and of subsequently etching said semiconductor layer, using a third etching mask, to form an island above said gate electrode.

8. The method as defined in claim 7 wherein,
said reflector is of a laminated structure comprised of a lower Cr layer and an upper Al/Nd layer;
a source electrode and a drain electrode of said laminated structure are selectively formed when said reflector is formed in said fifth step;
a contact hole for partially exposing said Cr layer of said source electrode is formed in an other insulation layer formed on said insulating layer comprised of said reflector, source electrode and the drain electrode, and in said Al/Nd layer, after forming said other insulating layer; and wherein
a transparent electrode layer electrically connecting to said source electrode through said contact hole is selectively formed on said other insulating layer.

9. The method as defined in claim 6 wherein the reflector formed in said fifth step is directly arranged on said rough surface formed by said protrusions and recesses.

10. The method as defined in claim 6 wherein there is arranged an aperture at a preset area on the rough surface of said reflector.

11. A method for producing a liquid crystal display apparatus having a first substrate including a thin film transistor and a reflector on an insulating substrate, a second substrate having a transparent electrode and mounted facing said first substrate, and a liquid crystal layer placed between said first substrate and said second substrate; said method comprising:
a first step of forming a first metal layer on said insulating substrate and subsequently etching said first metal layer, using a first etching mask, to expose a portion of said insulating substrate and to form a gate electrode;
a second step of forming a first insulating layer and a semiconductor layer in this order on said insulating substrate including said gate electrode and of subsequently etching said semiconductor layer using a second etching mask to form an island above said gate electrode;
a third step of forming a second metal layer on said first insulating layer including said island and of subsequently etching said second metal layer using a third etching mask to form a source electrode and a drain electrode;
a fourth step of forming a second insulating layer on said first insulating layer including said source electrode and the drain electrode and of subsequently etching said second insulating layer and the first insulating layer, using a fourth etching mask, to expose a portion of said insulating substrate and to form a plurality of protrusions;
a fifth step of causing only said fourth etching mask to reflow following said fourth step to cover exposed surface portions of said first and second insulating layers and near-by surface portions of said insulating substrate with said fourth etching mask and to cover exposed surface portions of said protrusions and near-by surface portions of said insulating substrate with said fourth etching mask while leaving exposed surface portions of said insulating substrate located between neighboring protrusions;
a sixth step of etching said insulating substrate, using said fourth etching mask, following said fifth step, to selectively form one or more recesses in an exposed area of said insulating substrate; and a seventh step of selectively forming a reflector, having a rough surface on a rough surface formed at least by said protrusions and recesses.

12. The method as defined in claim 11 wherein there is arranged an aperture at a preset area on the rough surface of said reflector.

13. A method for producing a liquid crystal display apparatus having a first substrate including a thin film transistor and a reflector on an insulating substrate, a second substrate having a transparent electrode and mounted facing said first substrate, and a liquid crystal layer placed between said first substrate and said second substrate; said method comprising:
a first step of forming a first metal layer on said insulating substrate and subsequently etching said first metal layer using a first etching mask, to expose a portion of said insulating substrate, and to form a gate electrode, a plurality of protrusions being separated therefrom, and a wiring isolated from said gate electrode and said protrusions;
a second step of causing only said first etching mask to reflow to cover exposed surfaces of said gate electrode and said wiring and near-by surface portions of said insulating substrate with said first etching mask and to cover exposed surfaces of said protrusions and near-by surface portions of said insulating substrate with said first etching mask;
a third step of etching said insulating substrate, using said first etching mask, after said second step, to form one or more recesses in the exposed area of said insulating substrate;
after forming a first insulating film and a semiconductor layer on said insulating substrate, a fourth step of etching said semiconductor layer, using a second etching mask, including said gate electrode, said protrusions and said wiring, to form an island above said gate electrode;
a fifth step of etching said first insulating layer, using a third etching mask, to expose a portion of said wiring to form a first contact hole;
a sixth step of etching a second metal layer, using a fourth etching mask, after forming said second metal layer on said first insulating layer, including said island, to form a source electrode, a drain electrode and a reflector, to electrically connect said source electrode through said first contact hole with said wiring;
a seventh step of forming, after forming a second insulating layer on said first insulating layer including said source electrode, drain electrode and the reflector, a second contact hole in said second insulating layer and in said first insulating layer, using a fifth etching mask, for exposing a portion of said wiring; and
an eighth step of selectively forming a transparent electrode layer on said second insulating layer for electrically connecting to said wiring through said second contact hole.

14. The method as defined in claim 13 wherein there is arranged an aperture at a preset area on the rough surface of said reflector.

15. A method for producing a liquid crystal display apparatus having a first substrate including a thin film transistor and a reflector on an insulating substrate, a second substrate having a transparent electrode and mounted facing said first substrate, and a liquid crystal layer placed between said first substrate and said second substrate; said method comprising:

a first step of forming a first metal layer on said insulating substrate and subsequently etching said first metal layer, using a first etching mask, to expose a portion of said insulating substrate, and to form a gate electrode and a wiring separated from said gate electrode;

a second step of forming a first insulating layer and a semiconductor layer in this order on said insulating substrate including said gate electrode and said wiring, and subsequently etching said semiconductor layer, using a second etching mask, to form an island above said gate electrode;

a third step of etching said first insulating layer, using a third etching mask, to form a first contact hole which exposes a portion of said wiring, of exposing a portion of said insulating substrate and of forming a plurality of protrusions;

a fourth step of causing only said third etching mask to reflow to cover the exposed surface portions of said first insulating layer and near-by surface portions of said insulating substrate with said third etching mask, to stop up said first contact hole with said third etching mask and to cover the exposed surface portions of said protrusions and near-by surface portions of said insulating substrate with said third etching mask, while leaving exposed a part of the surface of said insulating substrate between neighboring protrusions and near-by surface portions of said insulating substrate;

a fifth step of etching said insulating substrate, after said fourth step, using said third etching mask, to form one or more recesses in an exposed area of said insulating substrate;

a sixth step of forming a second metal layer on said first insulating layer including said island, on said protrusions and on said recesses, and subsequently etching said second metal layer, using a fourth etching mask, to form a source electrode, a drain electrode and a reflector, to connect said source electrode electrically to said wiring through said first contact hole;

a seventh step of forming a second insulating layer on said first insulating layer including said source electrode, drain electrode and the reflector, and subsequently forming a second contact hole, which exposes a portion of said wiring to said second insulating layer and the first insulating layer, using a fifth etching mask; and an eighth step of selectively forming a transparent electrode layer on said second insulating layer for electrically connecting to said wiring through said second contact hole.

16. The method as defined in claim 15 wherein there is arranged an aperture at a preset area on the rough surface of said reflector.

* * * * *